(12) United States Patent
Saitoh

(10) Patent No.: US 9,076,394 B2
(45) Date of Patent: Jul. 7, 2015

(54) ACTIVE MATRIX SUBSTRATE, LIQUID CRYSTAL PANEL, LIQUID CRYSTAL DISPLAY DEVICE, TELEVISION RECEIVER

(75) Inventor: Yuhichi Saitoh, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 297 days.

(21) Appl. No.: 13/577,700

(22) PCT Filed: Dec. 8, 2010

(86) PCT No.: PCT/JP2010/072007
§ 371 (c)(1),
(2), (4) Date: Aug. 8, 2012

(87) PCT Pub. No.: WO2011/099217
PCT Pub. Date: Aug. 18, 2011

(65) Prior Publication Data
US 2012/0300133 A1 Nov. 29, 2012

(30) Foreign Application Priority Data

Feb. 15, 2010 (JP) ................................. 2010-030569

(51) Int. Cl.
*G06F 3/038* (2013.01)
*G09G 3/36* (2006.01)

(52) U.S. Cl.
CPC .............. *G09G 3/3607* (2013.01); *G06F 3/038* (2013.01); *G09G 3/3648* (2013.01); *G09G 3/3614* (2013.01); *G09G 3/3655* (2013.01); *G09G 2300/0426* (2013.01); *G09G 2300/0447* (2013.01); *G09G 2300/0876* (2013.01); *G09G 2320/0223* (2013.01); *G09G 2320/028* (2013.01)

(58) Field of Classification Search
USPC ......................................................... 345/100
See application file for complete search history.

(56) References Cited

U.S. PATENT DOCUMENTS

| 6,858,898 | B1* | 2/2005 | Hayakawa et al. ........... 257/347 |
| 2005/0122441 | A1 | 6/2005 | Shimoshikiryoh |
| 2007/0164957 | A1 | 7/2007 | Hsieh et al. |
| 2009/0009449 | A1 | 1/2009 | Uchida et al. |
| 2010/0128009 | A1* | 5/2010 | Okada et al. .................. 345/205 |
| 2010/0245328 | A1 | 9/2010 | Sasaki et al. |
| 2010/0253668 | A1 | 10/2010 | Sugihara et al. |
| 2011/0012815 | A1* | 1/2011 | Tsubata ......................... 345/55 |

FOREIGN PATENT DOCUMENTS

| EP | 1 085 493 A2 | 3/2001 |
| JP | 2005-189804 A | 7/2005 |

(Continued)

OTHER PUBLICATIONS

Official Communication issued in International Patent Application No. PCT/JP2010/072007, mailed on Mar. 15, 2011.

*Primary Examiner* — Linh N Hoffner
(74) *Attorney, Agent, or Firm* — Keating & Bennett, LLP

(57) ABSTRACT

An active matrix substrate of the present invention includes: data signal lines; scanning signal lines (GLi); transistors connected with the data signal lines and the scanning signal lines (GLi); and retention capacitor lines (CSLi). One pixel region includes a plurality of pixel electrodes. A CS driver (46) for outputting a retention capacitor line signal to drive the retention capacitor lines is formed monolithically. In one pixel region, a pixel electrode and a retention capacitor line corresponding to the pixel electrode forms a retention capacitor therebetween. This allows the liquid crystal display device based on a pixel-division system to have a liquid crystal panel with a narrower frame.

24 Claims, 48 Drawing Sheets

(56) References Cited

FOREIGN PATENT DOCUMENTS

| JP | 2006-220947 A | 8/2006 |
| WO | 2007/091365 A1 | 8/2007 |
| WO | 2009/084270 A1 | 7/2009 |
| WO | 2009/084331 A1 | 7/2009 |
| WO | 2011/099218 A1 | 8/2011 |

* cited by examiner

FIG. 29
(a)
<STRESS APPLICATION STATE>
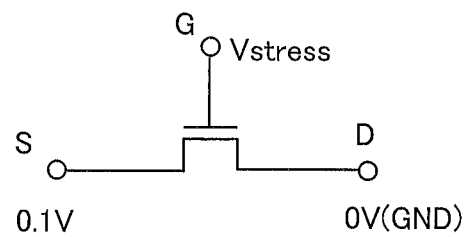
(b)
<CHARACTERISTICS MEASUREMENT STATE>
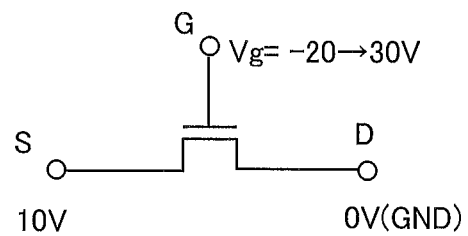

FIG. 32
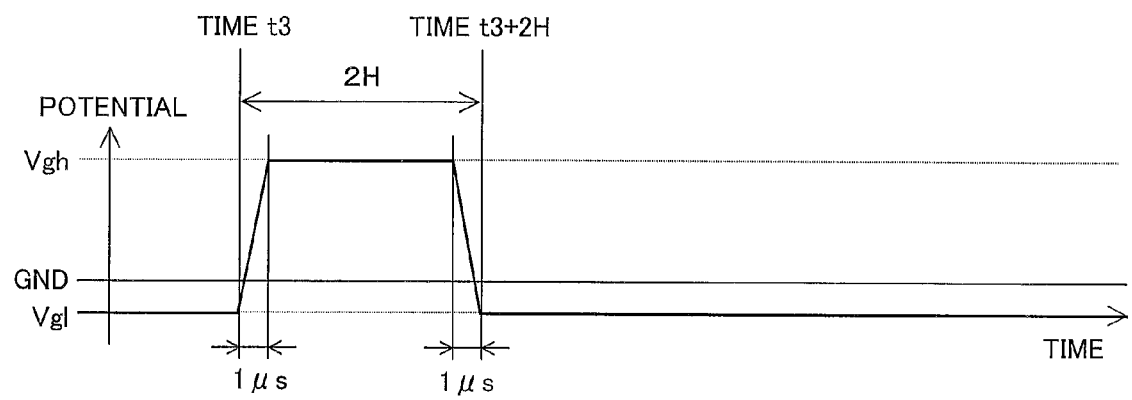
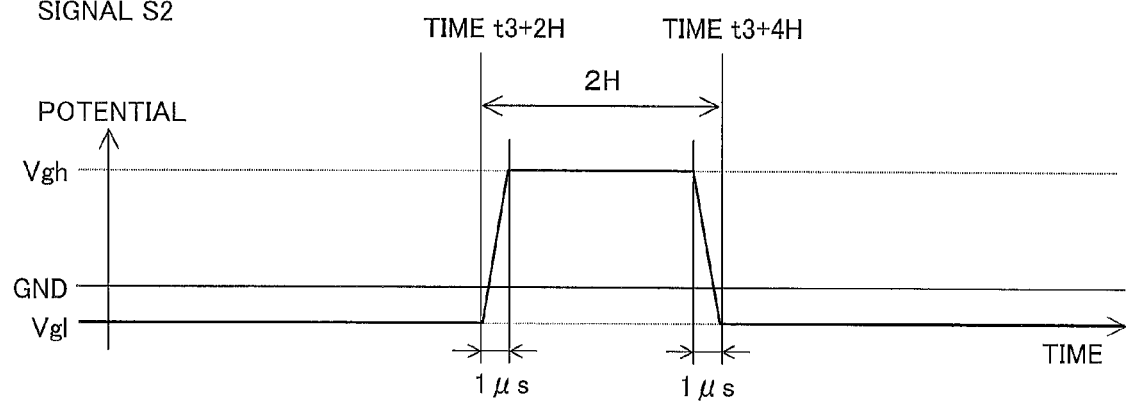

PRIOR ART

ACTIVE MATRIX SUBSTRATE, LIQUID CRYSTAL PANEL, LIQUID CRYSTAL DISPLAY DEVICE, TELEVISION RECEIVER

TECHNICAL FIELD

The present invention relates to an active matrix substrate in which each pixel region includes a plurality of pixel electrodes, and to a liquid crystal display device using the active matrix substrate (pixel-division system).

BACKGROUND ART

In order to improve viewing angle dependency of γ characteristics of a liquid crystal display device (e.g. prevent excess brightness etc. of a screen), there have been proposed liquid crystal display devices (based on a pixel-division system, see Patent Literature 1 for example) for controlling a plurality of sub-pixels in one pixel so that the plurality of sub-pixels have different luminances and displaying a halftone by area coverage modulation of these sub-pixels.

FIG. 49 is a schematic view showing an example of a pixel structure of a liquid crystal display device 1000 of Patent Literature 1. The liquid crystal display device 1000 includes a scanning signal line 1002 and a data signal line 1003 that are provided on a glass substrate 1001 and a pixel 1004 provided in the vicinity of an intersection of the two signal lines. The pixel 1004 consists of two sub-pixels 1005a and 1005b. The two sub-pixels 1005a and 1005b include transistors 1006a and 1006b and pixel electrodes 1007a and 1007b connected with the transistors 1006a and 1006b, respectively, and the pixel electrodes 1007a and 1007b form capacitors (retention capacitors 1009a and 1009b) with retention capacitor lines 1008a and 1008b, respectively. Although not shown, the pixel electrodes 1007a and 1007b are designed such that a liquid crystal material (liquid crystal layer) is sandwiched between the glass substrate 1001 and a common electrode (counter electrode) on a surface of a substrate (color filter substrate).

FIG. 50 is a drawing showing an electrically equivalent circuit corresponding to the pixel structure shown in FIG. 49 of the liquid crystal display device 1000. The pixel electrodes 1007a and 1007b shown in FIG. 49 correspond to points 1010a and 1010b shown in FIG. 50, respectively, and form liquid crystal capacitors 1012a and 1012b, respectively, with a common electrode 1011.

In the above configuration, different signals are supplied to the retention capacitor lines 1008a and 1008b, respectively. This allows differentiating potentials (pixel potentials) of the pixel electrodes 1007a and 1007b from each other.

CITATION LIST

Patent Literatures

[Patent Literature 1]
Japanese Patent Application Publication No. 2005-189804 (published on Jul. 14, 2005)

SUMMARY OF INVENTION

Technical Problem

In the liquid crystal display device of Patent Literature 1, the retention capacitor lines 1008a and 1008b are bundled at the outside of a display region (at a peripheral region of a liquid crystal panel) and connected with the outside. FIG. 51 is an electrically equivalent circuit diagram showing how pixels and retention capacitor lines are connected with each other. Retention capacitor lines CSLj−1 to CSLj+6 are aligned alternately with scanning signal lines GLj to GLj+6, and every four of the retention capacitor lines CSLj−1 to CSLj+6 are sequentially connected with retention capacitor main lines CSML1 to 4. Here, j is an integer of 0 or more. That is, the retention capacitor lines CSLj−1 and CSLj+3 are connected with the retention capacitor main lines CSML1 and CSML1', the retention capacitor lines CSLj and CSLj+4 are connected with the retention capacitor main lines CSML2 and CSML2', the retention capacitor lines CSLj+1 and CSLj+5 are connected with the retention capacitor main lines CSML3 and CSML3', and the retention capacitor lines CSLj+2 and CSLj+6 are connected with the retention capacitor main lines CSML4 and CSML4'. The pixel 1004 shown in FIG. 50 is arranged as in FIG. 51 for example, and the retention capacitor lines 1008a and 1008b correspond to the retention capacitor lines CSLj−1 and CSLj, respectively. Each of the retention capacitor lines 1008a and 1008b shown in FIG. 50 is shared by pixels adjacent to each other upwardly and downwardly (in a column direction) on the sheet of FIG. 50 with the retention capacitor line 1008a or 1008b therebetween.

In FIG. 51, the number (N) of retention capacitor main lines is four (N=4). However, the number (N) is not limited to four, and may be determined within a range of N≥2 depending on display performance to be achieved. Although smaller N allows smaller frame size, liquid crystal display devices designed to have N=12 or so in consideration of display performance are mass-produced.

An electric capacitance (hereinafter merely referred to as "capacitance") loaded on such a retention capacitor main line is the sum of a capacitance between the retention capacitor main line and other electrodes and lines and capacitances between individual retention capacitor lines connected with the retention capacitor main line and other electrodes and lines in the liquid crystal panel. In particular, the capacitance loaded on the retention capacitor main line is greatly influenced by the number of retention capacitor lines connected with the retention capacitor main line. Consequently, as the number of retention capacitor lines connected with one retention capacitor main line is larger, the capacitance loaded on the retention capacitor main line is extremely greater. Furthermore, for the purpose of pixel division, the retention capacitor main line is given a signal potential from the outside instead of a certain potential so as to be AC driven. Furthermore, the retention capacitor main line extends lengthwise in an up and down direction (column direction) of the sheet of FIG. 50. Such a configuration raises a problem that the signal potential from the outside is not transmitted quickly to the retention capacitor main line and the retention capacitor lines, so that in-plane distribution appears in a pixel potential, resulting in drop in display quality. One possible solution for the problem is designing the retention capacitor main line to have a large width to reduce electric resistance (hereinafter merely referred to as "resistance") of the retention capacitor main line. However, such a solution makes the area of the retention capacitor main line at the peripheral region of a liquid crystal panel large, resulting in prevention of designing a liquid crystal display device to have a narrower frame.

The present invention was made in view of the foregoing problems, and an object of the present invention is to design a liquid crystal display device based on a pixel-division system to have a liquid crystal panel with a narrower frame.

Solution to Problem

In order to solve the foregoing problems, an active matrix substrate of the present invention is an active matrix substrate, including: data signal lines; scanning signal lines; transistors connected with the data signal lines and the scanning signal lines; and retention capacitor lines, one pixel region including a plurality of pixel electrodes, the active matrix substrate further comprising a retention capacitor line driving circuit for outputting a retention capacitor line signal to drive the retention capacitor lines, the retention capacitor line driving circuit being formed monolithically, and in one pixel region, at least one pixel electrode of the plurality of pixel electrodes and a retention capacitor line corresponding to said at least one pixel electrode forming a retention capacitor therebetween.

With the arrangement, the retention capacitor line driving circuit is formed monolithically, so that a conventional retention capacitor main line can be omitted. Accordingly, the area of the frame of the liquid crystal panel can be reduced.

Furthermore, with the arrangement, at least one pixel electrode of the plurality of pixel electrodes and a retention capacitor line corresponding to said at least one pixel electrode forms a retention capacitor therebetween. Accordingly, for example, by writing data signals in two pixel electrodes and then supplying different retention capacitor line signals to retention capacitor lines corresponding to the two pixel electrodes respectively to increase or reduce pixel electrode potentials (pixel potentials) by capacitive coupling, it is possible to cause pixel potentials of the pixel electrodes to differ from each other. This enables a sub-pixel including one pixel electrode to serve as a bright sub-pixel and enables a sub-pixel including the other to serve as a dark sub-pixel. Thus, it is possible to realize a liquid crystal display device based on a pixel-division system.

Furthermore, the active matrix substrate of the present invention may be arranged such that the retention capacitor line driving circuit is formed monolithically on a glass substrate.

Furthermore, the active matrix substrate of the present invention may be arranged such that the retention capacitor line driving circuit and a scanning signal line driving circuit are formed monolithically.

Furthermore, the active matrix substrate of the present invention may be arranged such that the retention capacitor line driving circuit supplies the retention capacitor line signal to the retention capacitor line which forms a retention capacitor with the pixel electrode, so that a pixel potential written in the pixel electrode from the data signal line is changed in a direction corresponding to a polarity of the pixel potential.

Furthermore, the active matrix substrate of the present invention may be arranged such that in one pixel region, the plurality of pixel electrodes and retention capacitor lines respectively corresponding to the plurality of pixel electrodes form different retention capacitors therebetween.

Furthermore, the active matrix substrate of the present invention may be arranged such that the retention capacitor line driving circuit includes a plurality of retention capacitor line driving internal circuits each for supplying the retention capacitor line signal to the retention capacitor line, and each of the plurality of retention capacitor line driving internal circuits supplies the retention capacitor line signal to at least one retention capacitor line.

The active matrix substrate of the present invention may be arranged such that the retention capacitor line driving circuit includes a plurality of retention capacitor line driving internal circuits each for supplying the retention capacitor line signal to the retention capacitor line, each of the plurality of retention capacitor line driving internal circuits is provided with respect to every two of all the retention capacitor lines, and one of adjacent two of the plurality of retention capacitor lines receives the retention capacitor line signal from the retention capacitor line driving internal circuit, and the other receives a signal from an external signal source.

The above arrangement provides a smaller number of retention capacitor line driving internal circuits compared with the arrangement in which one retention capacitor line driving internal circuit is provided for one retention capacitor line. Accordingly, the above arrangement enables the frame of the liquid crystal panel to have further smaller area.

Furthermore, the active matrix substrate of the present invention may be arranged such that one pixel region includes a first pixel electrode, a second pixel electrode, a first transistor, and a second transistor, the first transistor and the second transistor being connected with the scanning signal line, and the first pixel electrode is connected with the data signal line via the first transistor and forms a first retention capacitor with the retention capacitor line, and the second pixel electrode is connected with the data signal line via the second transistor and forms a second retention capacitor with the retention capacitor line.

Furthermore, the active matrix substrate of the present invention may be arranged such that a first pixel region and a second pixel region are aligned in this order in a column direction which is a direction in which the data signal lines are extended, and in each of the first pixel region and the second pixel region, a first pixel electrode and a second pixel electrode are aligned in this order in the column direction, and the second pixel electrode in the first pixel region and the first pixel electrode in the second pixel region are adjacent to each other, and form retention capacitors with a same retention capacitor line.

Furthermore, the active matrix substrate of the present invention may be arranged such that the retention capacitor line driving circuit includes a plurality of retention capacitor line driving internal circuits each for supplying the retention capacitor line signal to the retention capacitor line, each of the retention capacitor line driving internal circuits receives a retention target signal, a retention capacitor line driving internal circuit corresponding to a certain pixel receives and retains the retention target signal when a scanning signal supplied to a scanning signal line corresponding to a pixel positioned posterior to the certain pixel gets active, and an output from the retention capacitor line driving internal circuit corresponding to the certain pixel is supplied as the retention capacitor line signal to a retention capacitor line corresponding to the certain pixel.

Furthermore, the active matrix substrate of the present invention may be arranged such that the retention capacitor line driving circuit includes a plurality of retention capacitor line driving internal circuits each for supplying the retention capacitor line signal to the retention capacitor line, each of the retention capacitor line driving internal circuits receives a retention target signal, a retention capacitor line driving internal circuit corresponding to a certain pixel receives and retains the retention target signal when a scanning signal supplied to a scanning signal line corresponding to a pixel positioned posterior to the certain pixel gets active, and an output from the retention capacitor line driving internal circuit corresponding to the certain pixel is supplied as the retention capacitor line signal to a retention capacitor line corresponding to the certain pixel and a retention capacitor line corresponding to a pixel positioned anterior to the certain pixel.

Furthermore, the active matrix substrate of the present invention may be arranged such that the retention capacitor line driving circuit includes a plurality of retention capacitor line driving internal circuits each for supplying the retention capacitor line signal to the retention capacitor line, each of the retention capacitor line driving internal circuits receives a retention target signal, a retention capacitor line driving internal circuit corresponding to a certain pixel includes a first input section to which a scanning signal to be supplied to a scanning signal line corresponding to a pixel positioned posterior to the certain pixel is inputted, a second input section to which the retention target signal is inputted, a third input section to which the retention target signal is inputted, and an output section for outputting the retention capacitor line signal, in a case where a potential of the retention target signal inputted to the second input section is in a high level when the scanning signal inputted to the first input section gets active, the retention capacitor line signal with a high level potential is outputted, in a case where a potential of the retention target signal inputted to the third input section is in a high level when the scanning signal inputted to the first input section gets active, the retention capacitor line signal with a low level potential is outputted, and while the scanning signal inputted to the first input section is not active, the potential of the retention target signal inputted to the second input section and/or the third input section is retained.

Furthermore, the active matrix substrate of the present invention may be arranged such that the retention capacitor line driving circuit includes a plurality of retention capacitor line driving internal circuits each for supplying the retention capacitor line signal to the retention capacitor line, each of the retention capacitor line driving internal circuits receives a retention target signal, a retention capacitor line driving internal circuit corresponding to a certain pixel includes a first input section to which a scanning signal to be supplied to a scanning signal line corresponding to a pixel positioned posterior to the certain pixel is inputted, a second input section to which the retention target signal is inputted, a third input section to which the retention target signal is inputted, and an output section for outputting the retention capacitor line signal, in a case where a potential of the retention target signal inputted to the second input section is in a high level when the scanning signal inputted to the first input section gets active, the retention capacitor line signal with a high level potential is outputted, in a case where a potential of the retention target signal inputted to the third input section is in a high level when the scanning signal inputted to the first input section gets active, the retention capacitor line signal with a low level potential is outputted, and when the scanning signal inputted to the first input section gets inactive and when a scanning signal supplied to a scanning signal line corresponding to a pixel positioned posterior to the pixel positioned posterior to the certain pixel gets active, the potential of the retention target signal inputted to and retained in the second input section and/or the third input section is reduced.

The active matrix substrate of the present invention may be arranged so as to further include a fourth input section and a fifth input section to each of which a second retention target signal is inputted, in a case where a potential of the retention target signal inputted to the second input section is in a high level when the scanning signal inputted to the first input section gets active, the retention capacitor line signal with a high level potential being outputted, in a case where a potential of the retention target signal inputted to the third input section is in a high level when the scanning signal inputted to the first input section gets active, the retention capacitor line signal with a low level potential being outputted, and when the scanning signal inputted to the first input section gets inactive and when a scanning signal supplied to a scanning signal line corresponding to a pixel positioned posterior to the pixel positioned posterior to the certain pixel gets active, the second retention target signal is inputted to the fourth input section and/or the fifth input section, so that the potential of the retention target signal inputted to and retained in the second input section and/or the third input section is reduced.

The active matrix substrate of the present invention may be arranged such that pixel regions each including a plurality of pixel electrodes are aligned in a column direction which is a direction in which the data signal lines are extended and in a row direction, a first data signal line and a second data signal line are provided for each column of the pixel regions and one scanning signal line is provided for each row of the pixel regions, and a data signal line connected via a transistor with the plurality of pixel electrodes in one of two pixel regions adjacent in the column direction is different from a data signal line connected via a transistor with the plurality of pixel electrodes in the other of the two pixel regions.

The active matrix substrate of the present invention may be arranged such that adjacent two scanning signal lines are selected simultaneously.

Furthermore, the active matrix substrate of the present invention may be arranged such that data signals with opposite polarities are supplied to the first data signal line and the second data signal line, respectively.

Furthermore, the active matrix substrate of the present invention may be arranged such that one pixel region includes two pixel electrodes, and one of the two pixel electrodes surrounds the other of the two pixel electrodes.

The active matrix substrate of the present invention may be arranged such that one pixel region includes two sub-pixels, and a sub-pixel including said one of the two pixel electrodes serves as a dark sub-pixel with relatively low luminance, and a sub-pixel including said the other of the two pixel electrodes serves as a bright sub-pixel with relatively high luminance.

Furthermore, the active matrix substrate of the present invention may be arranged such that the retention capacitor lines include a first retention capacitor line group that is driven in response to a first retention capacitor line signal from the retention capacitor line driving circuit and a second retention capacitor line group that is driven in response to a second retention capacitor line signal from an external signal source.

The active matrix substrate of the present invention may be arranged such that a retention capacitor line signal from a retention capacitor line driving internal circuit at k-stage is supplied to a retention capacitor line in (k−2)-th row and a retention capacitor line in k-th row, a signal from an external signal source is supplied to a retention capacitor line in (k−3)-th row and a retention capacitor line in (k−1)-th row, and a scanning signal to be supplied to a scanning signal line in (k+3)-th row is inputted to the retention capacitor line driving internal circuit at k-stage.

Furthermore, the active matrix substrate of the present invention may be arranged such that the signal from the external signal source is a common electrode potential.

The active matrix substrate of the present invention may be arranged such that the second retention capacitor line signal is a common electrode potential.

A liquid crystal display device of the present invention is a liquid crystal display device, including any of the aforementioned active matrix substrates, the retention capacitor line driving circuit supplying the retention capacitor line signal to the retention capacitor lines which form retention capacitors with the pixel electrodes, so as to create display while pixel potentials written in the pixel electrodes from the data signal lines are changed in directions corresponding to polarities of the pixel potentials.

A liquid crystal panel of the present invention includes the aforementioned active matrix substrate. A television receiver of the present invention includes the aforementioned liquid crystal display device and a tuner section for receiving television broadcasting.

Advantageous Effects of Invention

As described above, the liquid crystal display device including the active matrix substrate of the present invention is configured such that the retention capacitor line driving circuit is formed monolithically, and in one pixel region, at least one pixel electrode and a retention capacitor line corresponding to the pixel forms a retention capacitor therebetween. This configuration allows the liquid crystal display device based on a pixel-division system to have a liquid crystal panel with a narrower frame.

BRIEF DESCRIPTION OF DRAWINGS

FIG. 29 (a) and (b) of FIG. 29 are views for explaining how to evaluate operation reliability of an amorphous silicon TFT (a-Si TFT) used in the present embodiment.

FIG. 32 is a view showing a waveform of a signal inputted to a simulation circuit.

DESCRIPTION OF EMBODIMENTS

Figure 1:
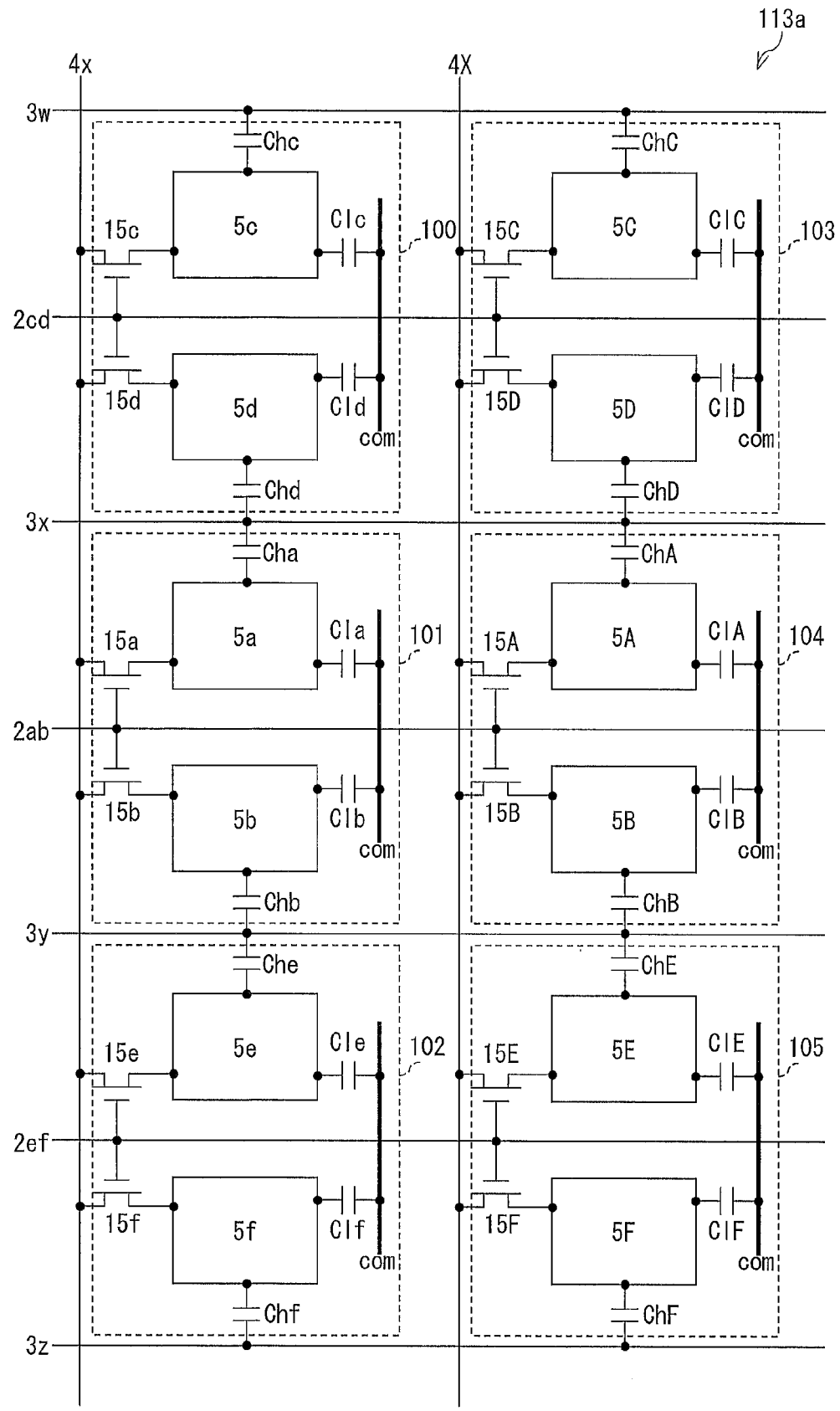
FIG. 1 is an equivalent circuit diagram showing a part of a liquid crystal panel 113a of Configuration Example 1 of a liquid crystal panel of the present invention.

The following explains an embodiment of the present invention with reference to drawings. Hereinafter, for convenience of explanation, a direction in which scanning signal lines extend is referred to as a row direction, and a direction in which data signal lines extend is referred to as a column direction. Needless to say, the scanning signal lines may extend in a horizontal direction or in a longitudinal direction depending on how a liquid crystal display device including a liquid crystal panel of the present invention (or an active matrix substrate used therefor) is used (viewed). In the drawings showing a liquid crystal panel, an alignment controlling structure is not shown if unnecessary.

Figure 8:
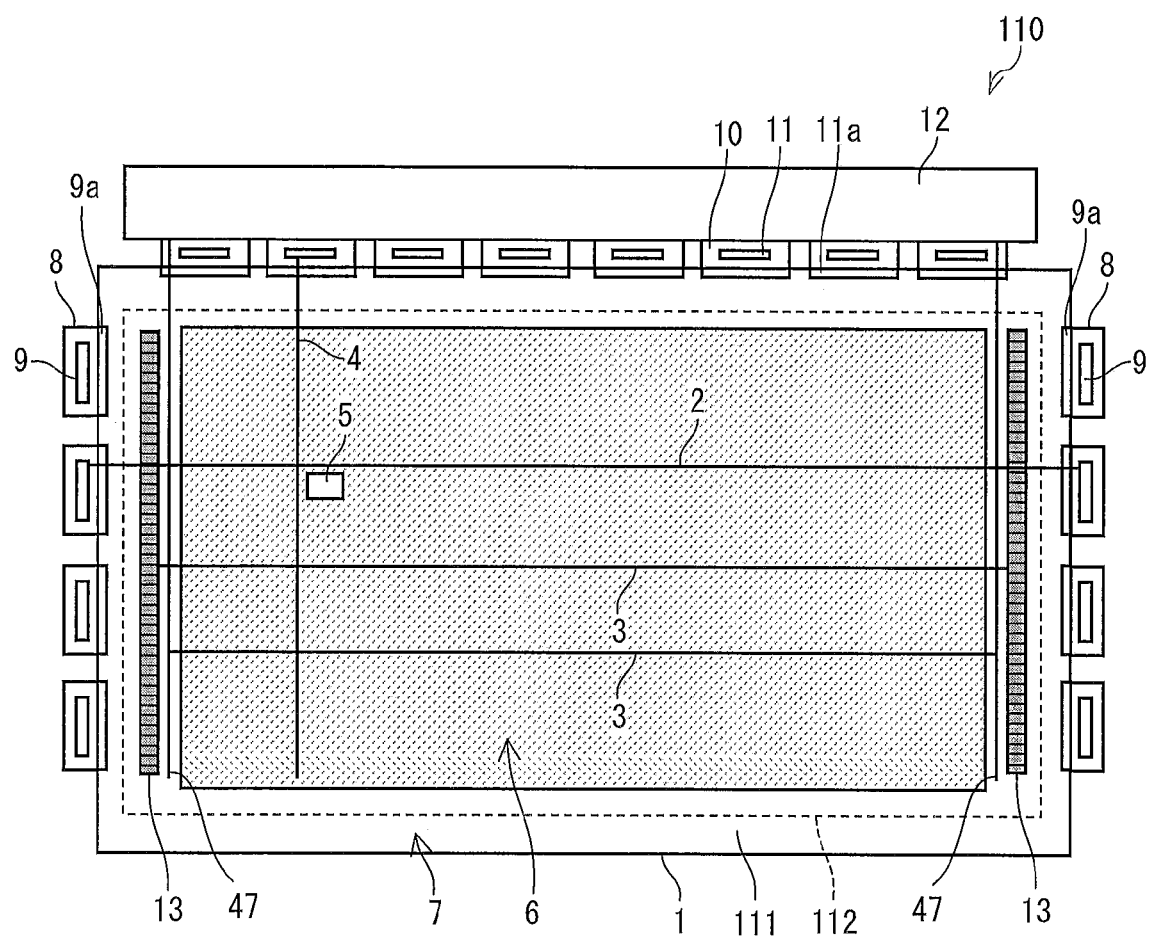
FIG. 8 is a plan view schematically showing a liquid crystal display device in accordance with an embodiment of the present invention.

FIG. 8 is a plan view schematically showing a liquid crystal display device 110 in accordance with an embodiment of the present invention. The liquid crystal display device 110 mainly includes an active matrix substrate 111, a counter substrate (color filter substrate) 112 attached to the active matrix substrate 111 via a sealing material (not shown), polyimide films 8 and 10 on which gate drivers 9 and source drivers 11 are mounted, respectively, by an SOF (System On Film) technique, and an external substrate 12. The counter substrate 112 is indicated by dotted lines in FIG. 8. Between the active matrix substrate 111 and the counter substrate 112, an orientation film, an orientation controlling structure, and a liquid crystal material are positioned, but they are not shown in FIG. 8. In addition to the aforementioned members, the liquid crystal display device 110 includes an optical film such as a polarizing film, a backlight, other optical members, circuit members, bezels for fixing these members to predetermined positions etc., which are not shown in FIG. 8.

The active matrix substrate 111 shown in FIG. 8 includes a glass substrate 1, and scanning signal lines 2, retention capacitor lines 3, data signal lines 4, and pixel electrodes 5, which are positioned on the glass substrate 1. The region on the active matrix substrate 111 can be classified into a display region 6 including a plurality of pixels and a peripheral region 7 surrounding the display region 6. At the peripheral region 7, gate terminals 9a and source terminals 11a are positioned, and outputs from the gate drivers 9 and the source drivers 11 etc. are supplied to each of the gate terminals 9a and the source terminals 11a via lines in the polyimide films 8 and 10. Furthermore, the external substrate 12 is mounted on the polyimide film 10. Furthermore, at the peripheral region 7, CS drivers (retention capacitor line driving circuit) 13 are provided on the glass substrate 1. Control signals and powers for driving the gate drivers 9, the source drivers 11, and the CS drivers 13 are supplied from the external substrate 12 etc. via lines (not shown) on the polyimide films 8 and 10 and the glass substrate 1.

In FIG. 8, the gate drivers 9 and the CS drivers 13 are aligned at both ends (right and left ends on the sheet) of the liquid crystal display device 110. However, the present invention is not limited to this. Alternatively, the gate drivers 9 and the CS drivers 13 may be provided only at one end (right end or left end in FIG. 8) of the liquid crystal display device 110.

Configuration Example 1 of Liquid Crystal Panel

FIG. 1 is an equivalent circuit diagram showing a part of a liquid crystal panel 113a of Configuration Example 1 of the liquid crystal panel of the present invention. As shown in FIG. 1, the liquid crystal panel 113a includes data signal lines 4x and 4X extending in a column direction (up and down direction of the sheet), scanning signal lines 2cd, 2ab, and 2ef extending in a row direction (right and left direction of the sheet), pixels (pixel regions) 100 to 105 aligned in the row direction and the column direction, retention capacitor lines 3w, 3x, 3y, and 3z, and a common electrode (counter electrode) com, and each pixel has the same structure. Furthermore, as shown in FIG. 1, a pixel column including the pixels 100 to 102 is adjacent to a pixel column including the pixels 103 to 105.

In the liquid crystal panel 113a, one data signal line and one scanning signal line are provided for one pixel, and a retention capacitor line is provided between pixels adjacent to each other in the column direction so that the retention capacitor line is shared by the adjacent pixels. Two pixel electrodes 5c and 5d provided in the pixel 100, two pixel electrodes 5a and 5b provided in the pixel 101, and two pixel electrodes 5e and 5f provided in the pixel 102 are aligned in a column, and two pixel electrodes 5C and 5D provided in the pixel 103, two pixel electrodes 5A and 5B provided in the pixel 104, and two pixel electrodes 5E and 5F provided in the pixel 105 are aligned in a column. Furthermore, the pixel electrodes 5c and 5C are adjacent to each other, the pixel electrodes 5d and 5D are adjacent to each other, the pixel electrodes 5a and 5A are adjacent to each other, the pixel electrodes 5b and 5B are adjacent to each other, the pixel electrodes 5e and 5E are adjacent to each other, and the pixel electrodes 5f and 5F are adjacent to each other.

Since each pixel has the same structure, explanations will be made below mainly using the pixel 101 as an example.

In the pixel 101, the pixel electrode 5a (first pixel electrode) is connected with the data signal line 4x via a transistor 15a (first transistor) connected with the scanning signal line 2ab, the pixel electrode 5b (second pixel electrode) is connected with the data signal line 4x via a transistor 15b (second transistor) connected with the scanning signal line 2ab, a retention capacitor Cha is formed between the pixel electrode 5a and the retention capacitor line 3x, a retention capacitor Chb is formed between the pixel electrode 5b and the retention capacitor line 3y, a liquid crystal capacitor Cla is formed between the pixel electrode 5a and the common electrode com, and a liquid crystal capacitor Clb is formed between the pixel electrode 5b and the common electrode com.

As described above, the pixel electrodes 5a and 5b are connected with the same data signal line 4x respectively via the transistors 15a and 15b connected with the same scanning signal line 2ab. Accordingly, the same signal potential (data signal) can be directly supplied to the pixel electrodes 5a and 5b via the transistors 15a and 15b, respectively. Furthermore, the pixel electrodes 5a and 5b form retention capacitors Cha and Chb with different retention capacitor lines 3x and 3y, respectively. Accordingly, by writing a data signal in the pixel electrodes 5*a* and 5*b* while the potential of the scanning signal line 2*ab* is in a selected state (High level) and then supplying different retention capacitor line signals to the retention capacitor lines 3*x* and 3*y* respectively so that pixel electrode potentials (pixel potentials) rise or fall by capacitor coupling, it is possible to differentiate pixel potentials of the pixel electrodes 5*a* and 5*b*. This method allows a sub-pixel including the pixel electrode 5*a* to serve as a bright sub-pixel (pixel with relatively high luminance) and allows a sub-pixel including the pixel electrode 5*b* to serve as a dark sub-pixel (pixel with relatively low luminance). This can realize a liquid crystal display device based on a pixel-division system.

Figure 2:
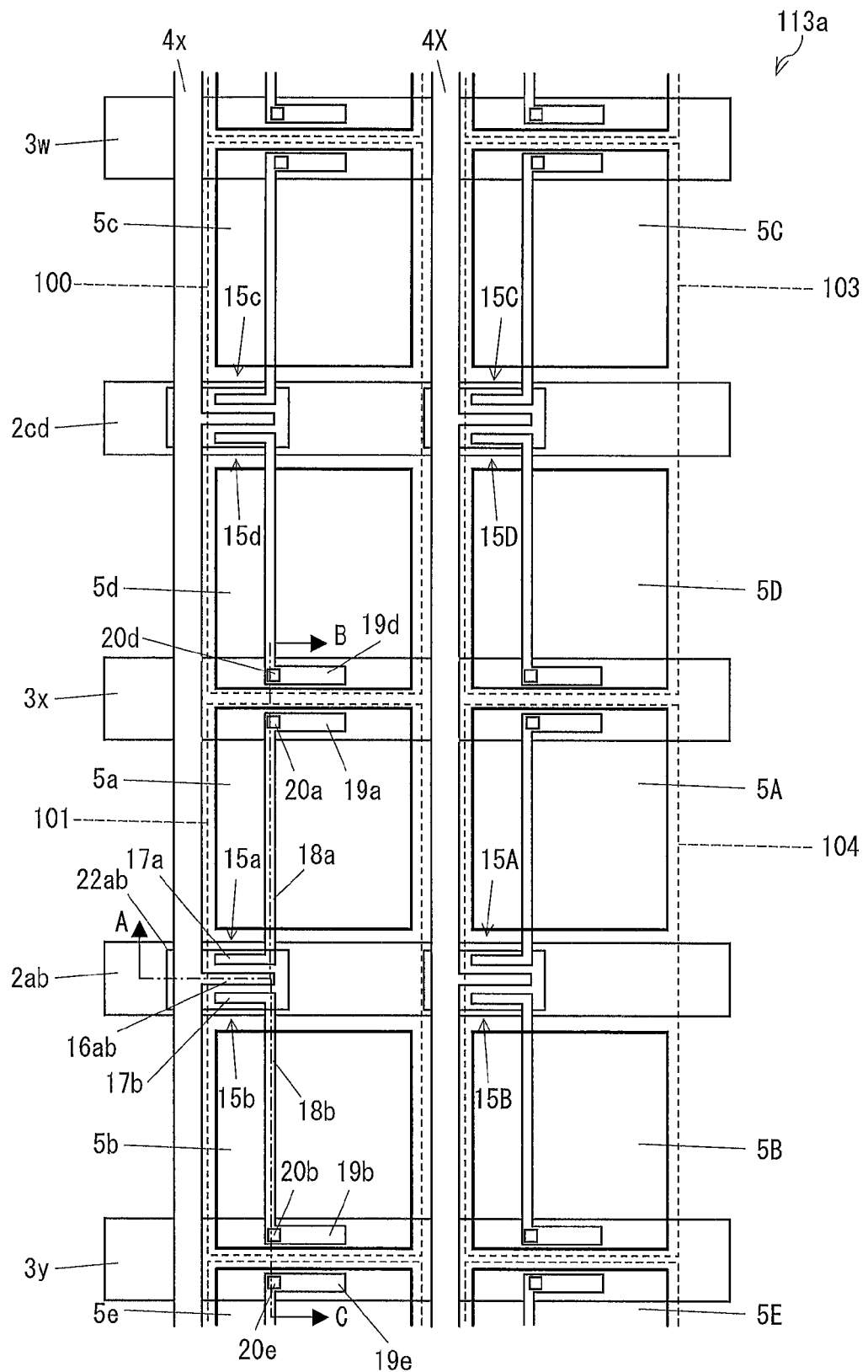
FIG. 2 is a plan view showing Configuration Example 1 of a liquid crystal panel of the present invention.

A specific configuration of the liquid crystal panel 113*a* of Configuration Example 1 of the present invention is shown in FIG. 2. FIG. 2 is a plan view showing the Configuration Example 1 of the liquid crystal panel 113*a*. In the liquid crystal panel 113*a* shown in FIG. 2, the data signal line 4*x* is positioned to be along the pixels 100 and 101, the data signal line 4X is positioned to be along the pixels 103 and 104, the retention capacitor line 3*w* is positioned to overlap one of edges of the pixel 100 and one of edges of the pixel 103, the retention capacitor line 3*x* is positioned to overlap the other of the edges of the pixel 100, the other of the edges of the pixel 103, one of edges of the pixel 101, and one of edges of the pixel 104, and the retention capacitor line 3*y* is positioned to overlap the other of the edges of the pixel 101 and the other of the edges of the pixel 104. Furthermore, the scanning signal line 2*cd* is positioned to cross central portions of the pixels 100 and 103, and the scanning signal line 2*ab* is positioned to cross central portions of the pixels 101 and 104.

Furthermore, on a plan view, in the pixel 100, the pixel electrodes 5*c* and 5*d* are aligned in the column direction between the retention capacitor lines 3*w* and 3*x*. In the pixel 101, the pixel electrodes 5*a* and 5*b* are aligned in the column direction between the retention capacitor lines 3*x* and 3*y*. In the pixel 103, the pixel electrodes 5C and 5D are aligned in the column direction between the retention capacitor lines 3*w* and 3*x*. In the pixel 104, the pixel electrodes 5A and 5B are aligned in the column direction between the retention capacitor lines 3*x* and 3*y*.

In the pixel 101, a source electrode 16*ab* and a drain electrode 17*a* of the transistor 15*a* and the source electrode 16*ab* and a drain electrode 17*b* of the transistor 15*b* are provided on the scanning signal line 2*ab*. As described above, the source electrode 16*ab* serves as both of the source electrodes of the transistors 15*a* and 15*b* and is connected with the data signal line 4*x*. The drain electrode 17*a* is connected with a drain drawing wiring 18*a*, the drain drawing wiring 18*a* is connected with a capacitor electrode 19*a*, and the capacitor electrode 19*a* is connected with the pixel electrode 5*a* via a contact hole 20*a*. The drain electrode 17*b* is connected with a drain drawing wiring 18*b*, the drain drawing wiring 18*b* is connected with a capacitor electrode 19*b*, and the capacitor electrode 19*b* is connected with the pixel electrode 5*b* via a contact hole 20*b*.

The capacitor electrode 19*a* overlaps the retention capacitor line 3*x* via a gate insulating film and the pixel electrode 5*a* overlaps the retention capacitor line 3*x* via a gate insulating film and an interlayer insulating film, and these overlappings form the retention capacitor Cha (see FIG. 1). Similarly, the capacitor electrode 19*b* overlaps the retention capacitor line 3*y* via a gate insulating film and the pixel electrode 5*b* overlaps the retention capacitor line 3*y* via a gate insulating film and an interlayer insulating film, and these overlappings form the retention capacitor Chb (see FIG. 1).

Configurations of other pixels (shapes, positions, and connections of members of other pixels) are the same as the configuration of the pixel 101.

Figure 3:
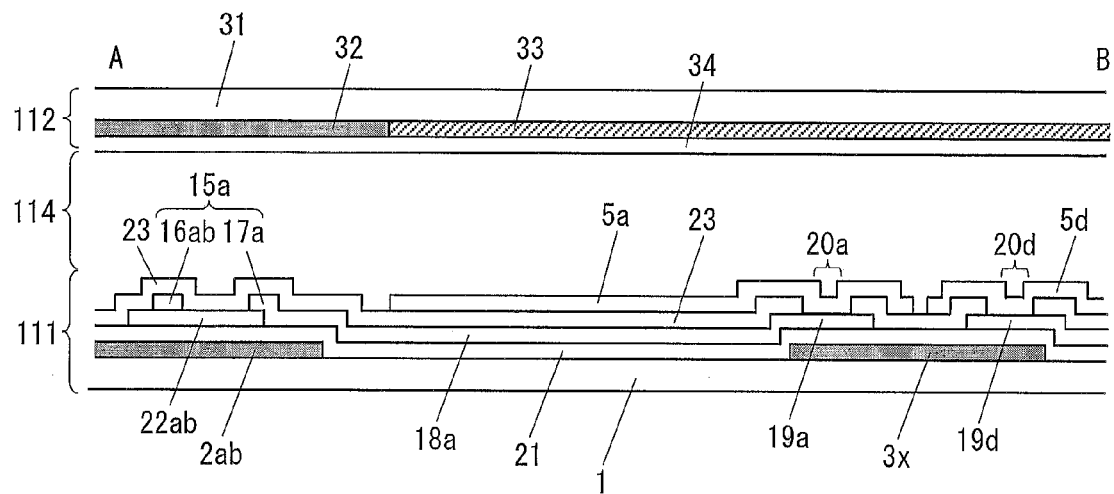
FIG. 3 is a cross sectional view showing a specific example taken along a line A-B of FIG. 2.
Figure 4:
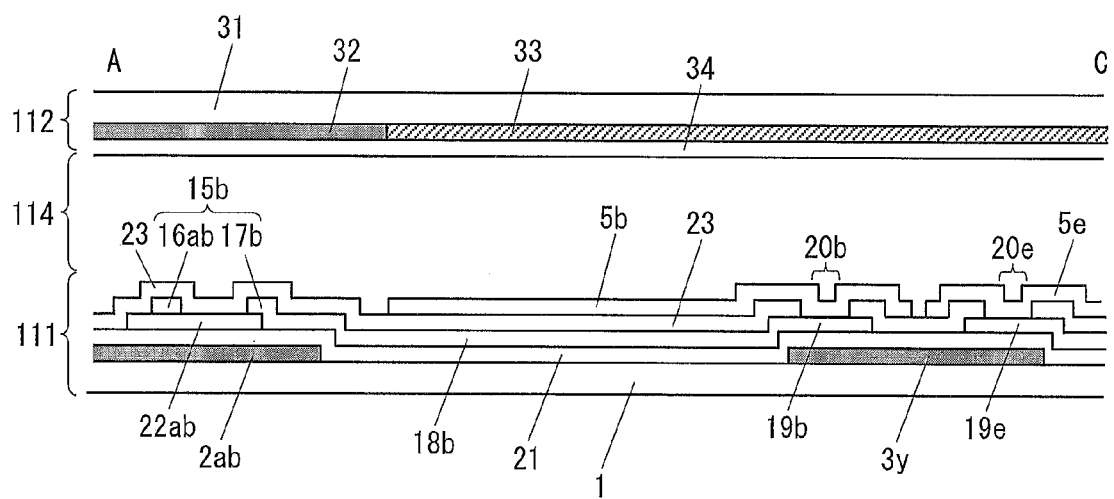
FIG. 4 is a cross sectional view showing a specific example taken along a line A-C of FIG. 2.

FIG. 3 is a cross sectional view taken along a line A-B of FIG. 2. FIG. 4 is a cross sectional view taken along a line A-C of FIG. 2. As shown in FIGS. 3 and 4, the liquid crystal panel 113*a* includes an active matrix substrate 111, a color filter substrate (counter substrate) 112 facing the active matrix substrate 111, and a liquid crystal layer 114 between the active matrix substrate 111 and the color filter substrate 112.

In the active matrix substrate 111, the scanning signal line 2*ab* and the retention capacitor lines 3*x* and 3*y* are formed on the glass substrate 1, and a gate insulating film 21 made of silicon nitride which is an inorganic material is formed to cover the scanning signal line 2*ab* and the retention capacitor lines 3*x* and 3*y*. In the transistors 15*a* and 15*b*, the gate electrode of the transistor is formed monolithically with the scanning signal line 2*ab*, and a part of the scanning signal line 2*ab* on the glass substrate 1 serves as the gate electrodes of the transistors 15*a* and 15*b*. On a portion of the gate insulating film 21 which portion corresponds to the transistor 15*a*, there are provided a semiconductor layer 22*ab*, the source electrode 16*ab* contacting the semiconductor layer 22*ab*, the drain electrode 17*a*, the drain drawing wiring 18*a*, and the capacitor electrode 19*a*, which are covered by an interlayer insulating film 23. On a portion of the gate insulating film 21 which portion corresponds to the transistor 15*b*, there are provided the semiconductor layer 22*ab*, the source electrode 16*ab* contacting the semiconductor layer 22*ab*, the drain electrode 17*b*, the drain drawing wiring 18*b*, and the capacitor electrode 19*b*, which are covered by the interlayer insulating film 23. Although not shown, the semiconductor layer 22*ab* includes an intrinsic amorphous silicon layer (i layer) and an n+ amorphous silicon layer (n+ layer) doped with phosphorous. The n+ amorphous silicon layer serves as a contact layer for electrically connecting the semiconductor material such as the i layer and the metal material such as the source electrode 16*ab* and the drain electrodes 17*a* and 17*b*. Portions of the semiconductor layer 22*ab* (typically, a channel section of the transistor) which portions do not overlap the source electrode 16*ab* and the drain electrodes 17*a* and 17*b* include only the i layer because the n+ layer was removed by etching etc. The interlayer insulating film 23 is made of silicon nitride which is an inorganic material. On the interlayer insulating film 23, there are provided the pixel electrodes 5*a* and 5*b* made of ITO (indium tin oxide), and the pixel electrodes 5*a* and 5*b* are covered by an orientation film (not shown). In the contact holes 20*a* and 20*b*, the interlayer insulating film 23 is hollowed so that the pixel electrode 5*a* is electrically connected with the capacitor electrode 19*a* and the pixel electrode 5*b* is electrically connected with the capacitor electrode 19*b*.

On the other hand, on the color filter substrate 112, a black matrix 32 and a coloring layer 33 are formed on the glass substrate 31, and a common electrode (com) 34 is formed thereon, and an orientation film (not shown) is formed to cover the common electrode 34.

The following explains an example of a process of manufacturing the active matrix substrate 111. This process is similar to a process for manufacturing a general active matrix substrate including an amorphous silicon transistor.

Initially, titanium (Ti), aluminum (Al), and titanium (Ti) are laminated in this order on a transparent insulating substrate such as glass and plastic (glass substrate 1 in FIG. 3) by sputtering using argon (Ar) gas to form a gate metal film (not shown) which is a Ti/Al/Ti laminate film. The thickness of titanium is 100 nm (for both upper layer and lower layer) for example, and the thickness of aluminum is 300 nm for example. The temperature of the glass substrate 1 when forming the gate metal film is between 200 and 300° C.

Subsequently, the gate metal film is subjected to photolithography to form the scanning signal line 2ab also serving as gate electrodes of individual transistors, the retention capacitor lines 3x and 3y etc. The photolithography is a process of forming a resist pattern film made of a photoresist material on a target film and patterning the target film using the resist pattern film as a mask. Etching of the gate metal film is carried out by, for example, dry etching mainly using chlorine ($Cl_2$) gas. After the etching, the resist pattern film is removed by using a strip solution containing organic alkaline.

Examples of the material of the gate metal film include, in addition to aluminum and titanium, indium tin oxide (ITO), elemental metals such as tungsten (W), copper (Cu), chromium (Cr), molybdenum (Mo), aluminum (Al), and titanium (Ti) and materials obtained by incorporating nitrogen, oxygen, or other metals into the elemental metals. The gate metal film may be a single layer made of the material, or may have a laminate structure. For example, the scanning signal lines may be a Ti/Cu/Ti laminate film made of titanium and copper or may be a Mo/Cu/Mo laminate film made of copper and molybdenum.

The gate metal film may be made by evaporation etc. as well as by sputtering. The thickness of the gate metal film is not particularly limited. Etching of the gate metal film is not limited to dry etching mentioned above, and may be wet etching etc. using etchant such as acid etc.

Subsequently, a silicon nitride (SiNx) film for the gate insulating film 21, an amorphous silicon film for the intrinsic amorphous silicon layer (i layer), and an n+ amorphous silicon film for the n+ amorphous silicon layer (n+ layer) are consecutively formed by plasma CVD (Chemical Vapor Deposition) etc. At that time, the thickness of the silicon nitride film is 400 nm for example, the thickness of the amorphous silicon film is 200 nm for example, and the thickness of the n+ amorphous silicon film is 50 nm for example. The temperature of the glass substrate 1 when these films are formed is between 200 and 300° C. Gas for film formation is a suitable mixture of silane ($SiH_4$), ammonium ($NH_3$), hydrogen ($H_2$), nitrogen ($N_2$) etc.

Subsequently, the silicon nitride film, the amorphous silicon film, and the n+ amorphous silicon film are patterned by photolithography to have predetermined shapes so as to form the gate insulating film 21, a primarily processed amorphous silicon film, and a primarily processed n+ amorphous silicon film. Etching here may be made by dry etching using a suitable mixture of a chlorine ($Cl_2$) gas, a carbon tetrachloride ($CF_4$) gas, and oxygen ($O_2$) gas. After the etching, the resist pattern film is removed by using a strip solution containing organic alkaline.

Subsequently, similarly with the case of the gate metal film, titanium (Ti), aluminum (Al), and titanium (Ti) are laminated in this order to form a source metal film (not shown) which is a Ti/Al/Ti laminate film. At that time, the thickness of titanium is 100 nm (for both of upper layer and lower layer) for example, and the thickness of aluminum is 300 nm for example. Similarly with the case of the gate metal film, the source metal film is subjected to photolithography to form the data signal line 4x, the source electrode 16ab, the drain electrodes 17a and 17b, the drain drawing wirings 18a and 18b, the capacitor electrodes 19a and 19b etc. The resist pattern film used in the photolithography (not shown) is not removed here because it will be used in the next step. The materials of the source metal film may be those other than mentioned above, similarly with the case of the gate metal film.

Subsequently, the amorphous silicon film and the n+ amorphous silicon film are subjected to etching again (channel etching) to form the intrinsic amorphous silicon layer (i layer) and the n+ amorphous silicon layer (n+ layer), thereby forming the semiconductor layer 22ab. That is, using as a mask the resist pattern film used in forming the patterns of the data signal line 4x, the source electrode 16ab, the drain electrodes 17a and 17b etc., the n+ amorphous silicon film and a partial surface of the amorphous silicon film are etched by dry etching. This separates the source electrode 16ab and the drain electrodes 17a and 17b. The reason why a partial surface of the amorphous silicon film is etched is to surely remove the n+ amorphous silicon film by over etching etc.

Subsequently, a silicon nitride film for the interlayer insulating film 23 is formed to cover the data signal line 4x, the source electrode 16ab, the drain electrodes 17a and 17b, the drain drawing wirings 18a and 18b, and the capacitor electrodes 19a and 19b. This step is carried out using plasma CVD. The temperature of the glass substrate 1 when forming the silicon nitride film is between 200 and 300° C., and gas for film formation is a suitable mixture of silane ($SiH_4$), ammonium ($NH_3$), hydrogen ($H_2$), nitrogen ($N_2$) etc. The thickness of the silicon nitride film is 300 nm for example.

Subsequently, the silicon nitride film for the interlayer insulating film 23 is etched by photolithography to have a predetermined pattern, thereby forming the interlayer insulating film 23 and the contact holes 20a and 20b. Here, there may be employed the same method as the method for etching silicon nitride for the gate insulating film 21.

Subsequently, on the interlayer insulating film 23, an ITO (indium tin oxide) film for example is formed by sputtering etc. to have a thickness of approximately 100 nm, and patterned by photolithography to have a required shape, thereby forming the pixel electrodes 5a and 5b in a pixel region. Etching of the ITO film may be made with oxalic acid (HOOC—COOH), a ferric chloride solution etc.

Subsequently, a solution containing an orientation film material is applied by an inkjet method etc. to cover the pixel electrodes 5a and 5b, thereby forming an orientation film (not shown).

The method for manufacturing the active matrix substrate 111 is applicable to a liquid crystal panel mentioned later. For convenience of explanation, an explanation thereof is omitted.

Figure 5:
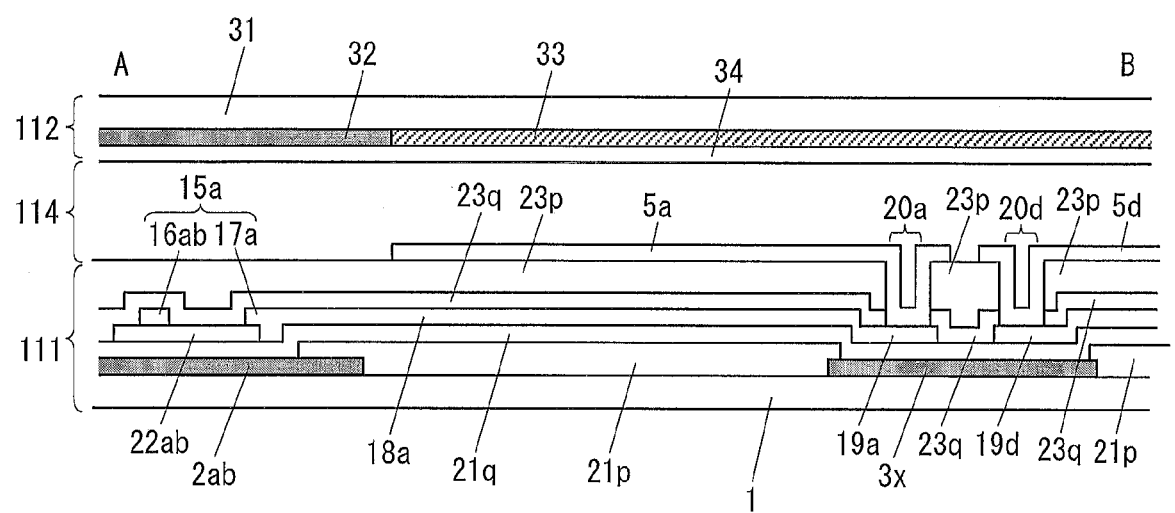
FIG. 5 is a cross sectional view showing another specific example taken along a line A-B of FIG. 2.

The cross section taken along the line A-B of FIG. 2 may be configured as shown in FIG. 5. FIG. 5 is a cross sectional view taken along a line A-B of another configuration of the liquid crystal panel 113 shown in FIG. 2. In the liquid crystal panel shown in FIG. 5, a thick gate insulating film 21p and a thin gate insulating film 21q are provided on the glass substrate 1, and a thick interlayer insulating film 23p and a thin interlayer insulating film 23q are provided below the pixel electrode 5a. The gate insulating film 21p is partially removed in the vicinity of the transistor 15a and the capacitor electrode 19a. Furthermore, the interlayer insulating film 23p and the interlayer insulating film 23q have substantially the same flat shape, and are removed at the contact holes 20a and 20b. This yields effects such as reduction of parasitic capacitance and prevention of a short-circuit between wires. The thickness of the gate insulating film 21p may be 1000 nm for example, the thickness of the gate insulating film 21q may be 400 nm for example, the thickness of the interlayer insulating film 23p is between 2500 and 3000 nm for example, and the thickness of the interlayer insulating film 23q is 300 nm for example. The interlayer insulating film 23p is made of an organic material, and the thickness has a distribution by reflecting concavities and convexities of the underlying layer. The interlayer insulating film 23q and the gate insulating film 21q are silicon nitride films formed by plasma CVD.

The gate insulating film 21p shown in FIG. 5 may be a silicon nitride film formed by plasma CVD similarly with the gate insulating film 21q or a silicon oxide film, or may be an insulating film made of a SOG (Spin On Glass) material.

The interlayer insulating films 23p and 23q and the contact holes 20a and 20b shown in FIG. 5 may be formed as follows for example. Specifically, the process of forming the transistor 15a and then forming the silicon nitride film for the interlayer insulating film 23q by the plasma CVD is the same as those in FIGS. 3 and 4. Subsequently, a photosensitive acrylic resin film is formed by photolithography using a resist material including photosensitive acrylic resin, and the silicon nitride film is etched using the photosensitive acrylic resin film as a mask, thereby obtaining the interlayer insulating films 23p and 23q and the contact holes 20a and 20b. It should be noted that the photosensitive acrylic resin is not removed but subjected to a thermal treatment etc. to serve as the interlayer insulating film 23p. Etching of the silicon nitride film here may be made similarly with the cases of FIGS. 3 and 4.

The gate insulating film 21p shown in FIG. 5 is an insulating film made of an SOG (Spin On Glass) material, and is obtained by applying an SOG material solution, subjecting the applied solution to a thermal treatment etc. to form a film, and patterning the film by photolithography.

Similarly, the interlayer insulating film 23p may be an insulating film made of an SOG (Spin On Glass) material for example. Furthermore, the gate insulating film 21p or the interlayer insulating film 23p may include at least one of acrylic resin, epoxy resin, polyimide resin, polyurethane resin, novolak resin, and siloxane resin.

Configuration Example 2 of Liquid Crystal Panel

Figure 6:
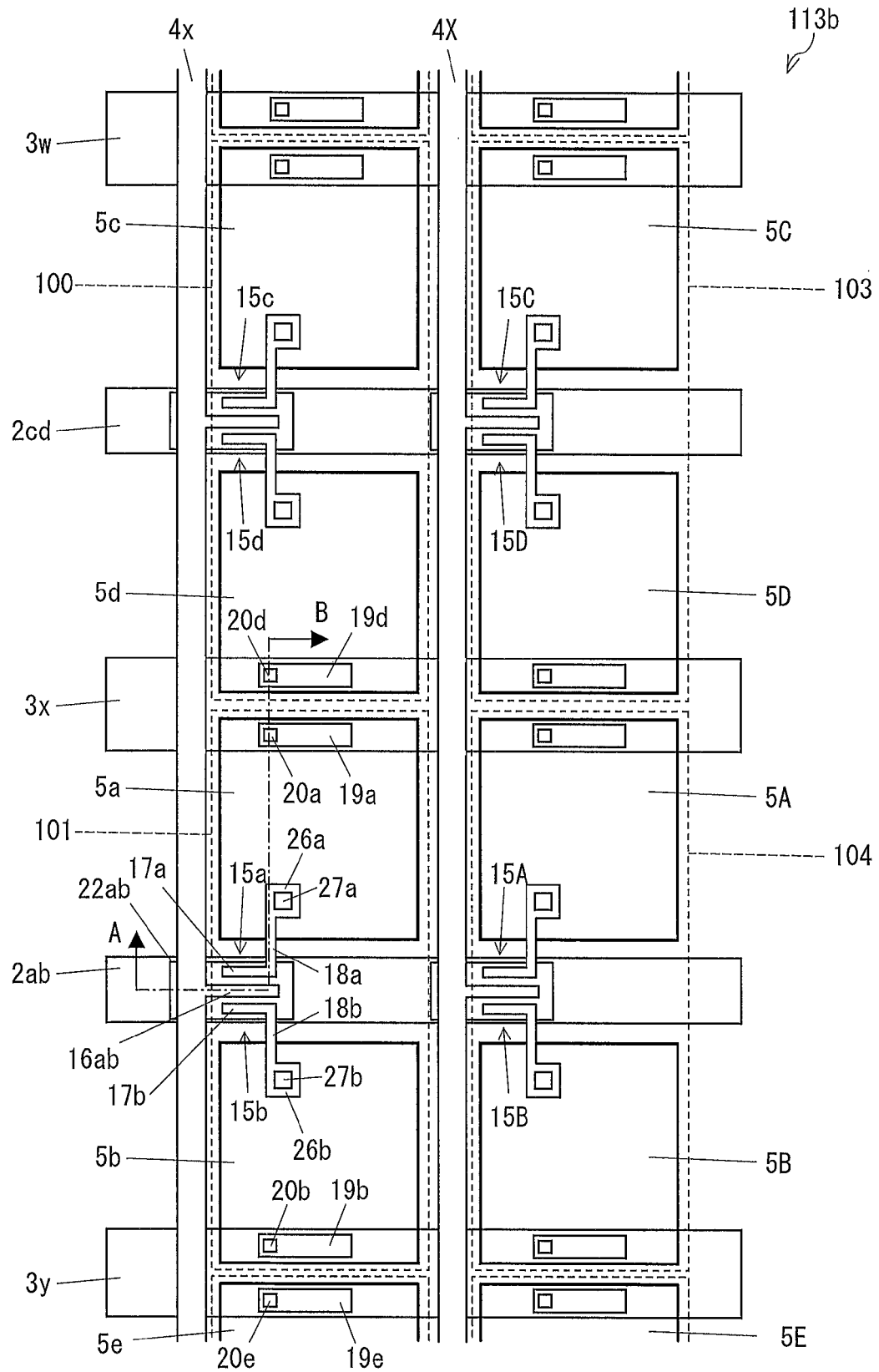
FIG. 6 is a plan view showing Configuration Example 2 of a liquid crystal panel of the present invention.

The retention capacitors Cha and Chb may be configured as shown in FIG. 6. FIG. 6 is a plan view showing Configuration Example 2 of the liquid crystal panel of the present invention. A liquid crystal panel 113b shown in FIG. 6 is different from the liquid crystal panel 113a of Configuration Example 1 in FIG. 2 in that in the liquid crystal panel 113b, a pixel 101 further includes contact electrodes 26a and 26b and contact holes 27a and 27b. The contact electrodes 26a and 26b are formed on the same layer where the drain drawing wirings 18a and 18b are provided. The drain electrode 17a of the transistor 15a is connected with the pixel electrode 5a via the drain drawing wiring 18a and the contact hole 27a, and the pixel electrode 5a is connected with the capacitor electrode 19a via the contact hole 20a. The capacitor electrode 19a overlaps the retention capacitor line 3x via the gate insulating film, and the pixel electrode 5a overlaps the retention capacitor line 3x via the gate insulating film and the interlayer insulating film. Both of these overlappings form the retention capacitor Cha (see FIG. 1).

Similarly, the drain electrode 17b of the transistor 15b is connected with the pixel electrode 5b via the drain drawing wiring 18b and the contact hole 27b, and the pixel electrode 5b is connected with the capacitor electrode 19b via the contact hole 20b. The capacitor electrode 19b overlaps the retention capacitor line 3y via the gate insulating film, and the pixel electrode 5b overlaps the retention capacitor line 3y via the gate insulating film and the interlayer insulating film. Both of these overlappings form the retention capacitor Chb (see FIG. 1).

Figure 7:
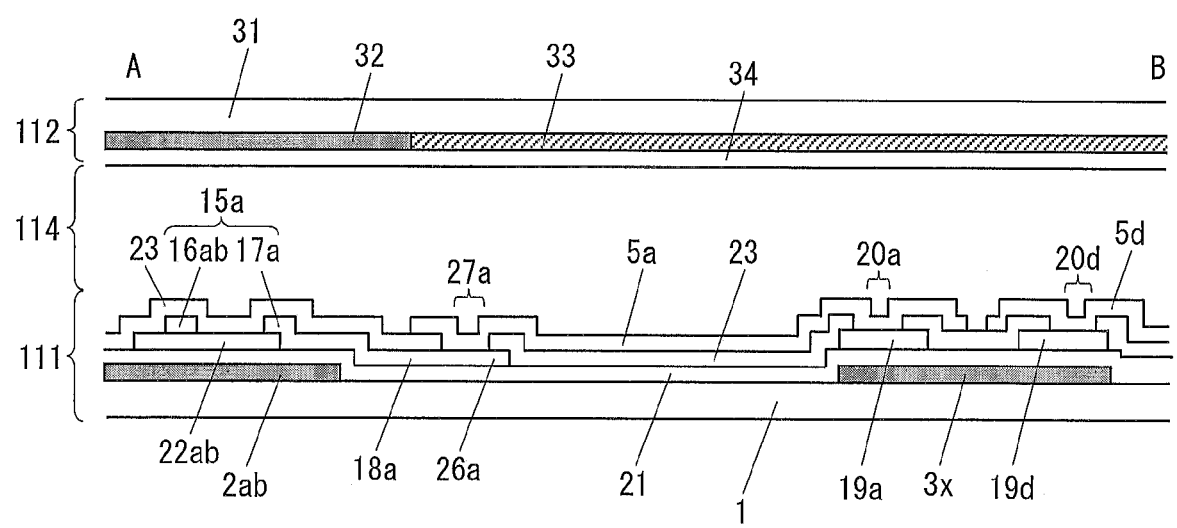
FIG. 7 is a cross sectional view showing a specific example taken along a line A-B of FIG. 6.

FIG. 7 is a cross sectional view taken along a line A-B of FIG. 6. As shown in FIG. 7, the capacitor electrode 19a is formed on the same layer where the drain drawing wiring 18a and the contact electrode 26a are formed, overlaps the retention capacitor line 3x via the gate insulating film 21, and is connected with the pixel electrode 5a via the contact hole 20a. Similarly, the capacitor electrode 19d of the pixel 100 overlaps the retention capacitor line 3x via the gate insulating film 21 and is connected with the pixel electrode 5d via the contact hole 20d. Consequently, the retention capacitor Cha (see FIG. 1) is formed between the capacitor electrode 19a and the retention capacitor line 3x, and a retention capacitor Chd (see FIG. 1) is formed between the capacitor electrode 19d and the retention capacitor line 3x. In this configuration, the drain drawing wirings 18a, 18b etc. do not cross the whole of the pixel electrodes 5a and 5b unlike Configuration Example 1 shown in FIG. 2, so that this configuration can increase an open area ratio of the liquid crystal display device and therefore particularly preferable.

Figure 9:
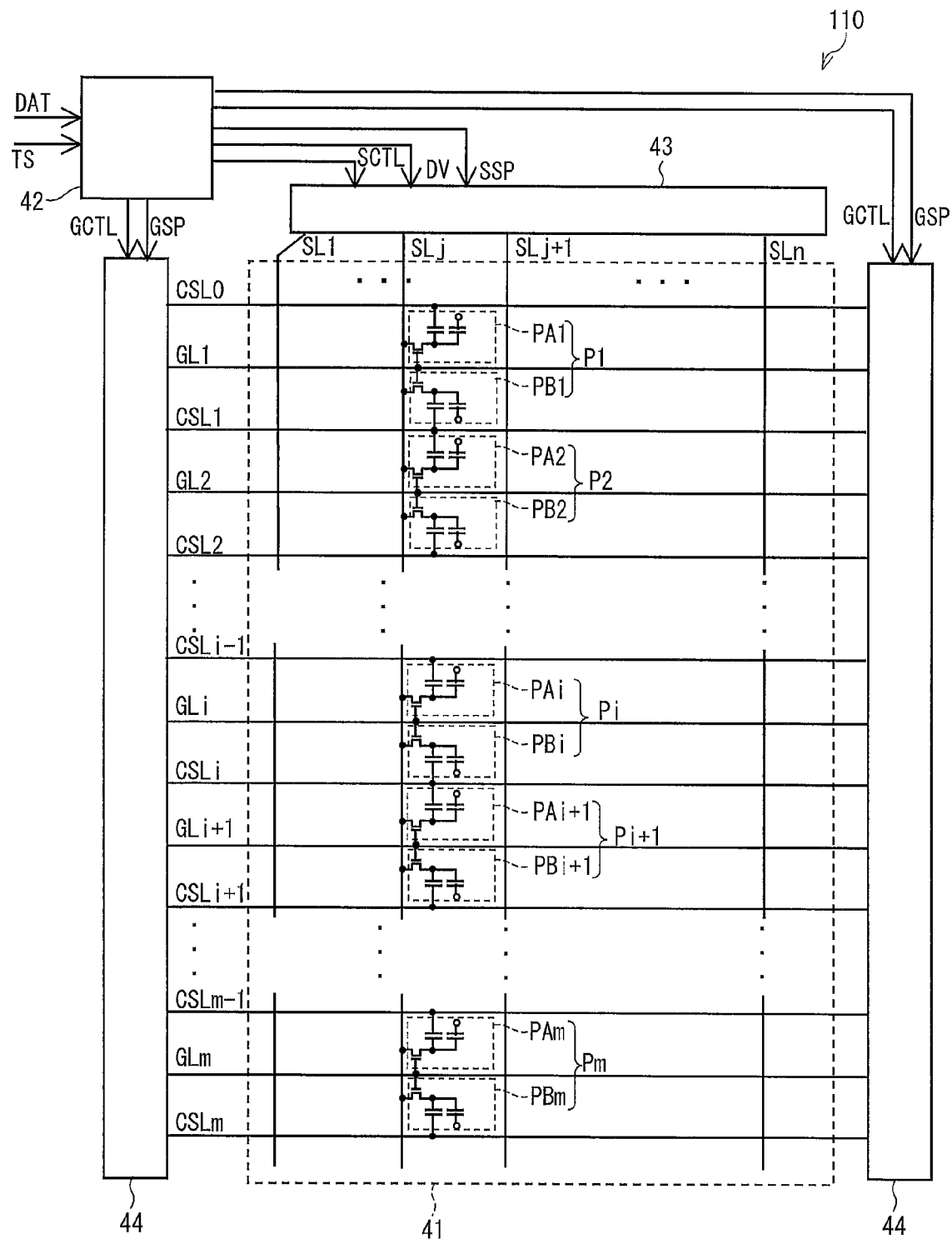
FIG. 9 is a view for explaining a basic method for electrically driving a liquid crystal display device of the present invention.

The following explains a method for driving the liquid crystal display device 110 of the present invention. FIG. 9 is a view for explaining a basic method for electrically driving the liquid crystal display device 110 shown in FIG. 8. The liquid crystal display device 110 includes a display section 41, a display control circuit 42, a source driver (data signal line driving circuit) 43, gate/CS drivers (scanning signal line/retention capacitor line driving circuit) 44. The display section 41 includes n source lines (data signal lines), m gate lines (scanning signal lines), m+1 CS lines (retention capacitor lines), and m×n pixels. FIG. 9 shows, as representatives, source lines SL1, SLj (j is an integer not less than 1 and not more than n, SLj+1, and SLn, gate lines GL1, GL2, GLi (i is an integer not less than 1 and not more than m), GLi+1, and GLm, and pixels P1, P2, Pi, Pi+1, and Pm that are arranged in such a manner as to correspond to intersections of the source lines and the gate lines, and CS lines CSL0, CSL1, CSLi−1, CSLi, CSLi+1, CSLm−1, CSLm etc. Furthermore, as shown in FIG. 9, the pixel Pi includes two sub-pixels; a sub-pixel PAi and a sub-pixel PBi. The same is applied to the pixels P1, P2, Pi+1, and Pm. In the liquid crystal display device 110, m=1080 and n=5760. However, the present invention is not limited to these values. Furthermore, the liquid crystal display device 110 may include a capacitor main line 47 (mentioned later), which is not shown.

The display control circuit 42 receives a data signal DAT and a timing control signal TS from the outside, and outputs a digital video signal DV, a source start pulse signal SSP for controlling timing with which the display section 41 displays an image, a source control signal SCTL such as a source clock signal, a gate start pulse signal GSP, and a gate control signal GCTL such as a gate clock signal.

The source driver 43 receives, from the display control circuit 42, the digital video signal DV, the source start pulse signal SSP for controlling timing with which the display section 41 displays an image, and the source control signal SCTL such as a source clock signal, and supplies data signals for driving to the source lines SL1 to SLn in order to charge liquid crystal capacitors in individual pixels in the display section 41.

The gate/CS drivers 44 receive the gate start pulse signal GSP and the gate control signal GCTL from the display control circuit 42, and supply gate signals (scanning signals) to the gate lines and supply CS signals (retention capacitor line signals) to the CS lines. Herein, the gate lines and the CS lines are driven sequentially and interlaced scanning is not carried out. That is, the gate lines are driven sequentially from GL1 to GLm.

In the present embodiment, the gate/CS drivers 44 are aligned at both ends of the liquid crystal display device 110 (right and left ends on the sheet of FIG. 9). In the liquid crystal display device 110 of the present invention, the gate/CS driver 44 may be provided at one end of the liquid crystal display device 110 (one of right and left ends of the sheet of FIG. 9). The same is applicable to gate/CS drivers mentioned later.

FIG. 9 schematically shows driving of the liquid crystal display device 110 by the source driver 43, the gate/CS drivers 44, and the display control circuit 42 included in the liquid crystal display device 110, and accordingly power sources, lines etc. for driving the source driver 43, the gate/CS drivers 44 etc. and other control signals etc. are not shown. Furthermore, lines etc. for supplying a signal potential to a common electrode (com) is not shown, too.

Configuration Example 1 of CS Driver

Figure 10:
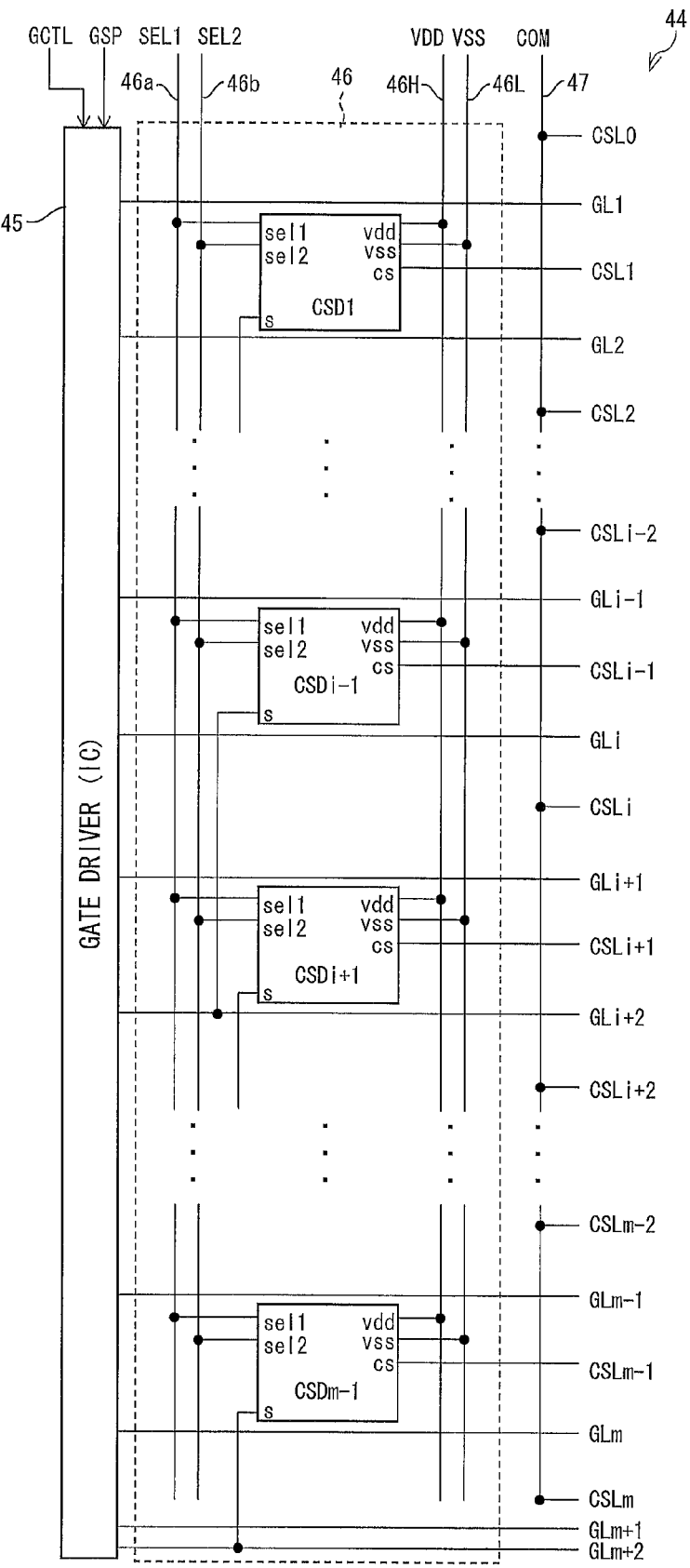
FIG. 10 is a circuit diagram showing Configuration Example 1 of a gate/CS driver of a liquid crystal display device of the present invention.

Since the two gate/CS drivers 44 shown in FIG. 9 have the same configuration, an explanation is made below as to one of the two gate/CS drivers 44. FIG. 10 is a circuit diagram showing Configuration Example 1 of the gate/CS driver 44 in the liquid crystal display device 110 of the present invention. A gate driver 45 is mounted on a polyimide film (not shown) by an SOF (System On Film) technique. The polyimide film is connected with the glass substrate 1 (see FIG. 8) via an ACF (anisotropic conductive film), and wiring (not shown) in the polyimide film is connected with a gate terminal (not shown) on the glass substrate 1. The gate driver 45 includes a gate driver IC (not shown), and can consist of a plurality of gate drivers mounted on respective polyimide films as shown in FIG. 8. A CS driver 46 is formed integrally (monolithically) on the glass substrate 1. That is, the CS driver 46 is formed monolithically on the active matrix substrate 111 (see FIG. 8) where amorphous silicon is used for transistors.

In FIG. 10, i and m are even numbers. The gate driver 45 receives the gate start pulse signal GSP and the gate control signal GCTL from the display control circuit 42, and outputs driving voltage signals (gate signal) to the gate lines GL1 to GLm+2. The gate lines GLm+1 and GLm+2 are gate lines that are not directly relevant to control of charging of pixels (dummy gate lines), and the gate line GLm+2 transmits a signal necessary for the CS driver 46. Furthermore, in the drawing, m is an even number. That is, in Configuration Example 1, the number of gate lines other than the dummy gate lines is even. However, the present invention is not limited to this, and the number of gate lines other than the dummy gate lines may be odd. In that case, the number of gate lines and dummy gate lines may be adjusted according to necessity in the configuration shown in FIG. 10.

To the even-numbered CS lines (second retention capacitor line group) such as CSL0, CSL2, CSLi−2, CSLi, CSLi+2, CSLm−2, and CSLm, a signal COM (second retention capacitor line signal) supplied to the capacitor line group 47 is supplied via branched lines. To the odd-numbered CS lines (first retention capacitor line group) such as CSL1, CSL3, CSLi−1, CSLi+1, and CSLm−1, output signals (first retention capacitor line signal) from internal circuits (retention capacitor line driving internal circuit, which may be hereinafter "retention circuit") which constitute the CS driver 46 and which are represented by CSD1, CSD3, CSDi−1, CSDi+1, CSDm-1 etc. are supplied. That is, the retention circuits are provided with respect to every two lines (each odd line) of all the CS lines. Alternatively, the retention circuits may be provided with respect to every two lines (each even line) of all the CS lines. In the configurations of CS drivers below, the output signal from the retention circuit is referred to as a "first retention capacitor line signal", a CS line to which the first retention capacitor line signal is inputted is referred to as a "first retention capacitor line group", a signal outputted from an external signal source and supplied to a capacitor main line 47 is referred to as a "second retention capacitor line signal", and a CS line to which the second retention capacitor line signal is inputted is referred to as a "second retention capacitor line group". In the following explanation, the retention circuit CSDi−1 etc. is used as a representative example of the retention circuit of the present invention. The explanation is applicable to retention circuits in other stages.

As shown in FIG. 10, the CS driver 46 includes a plurality of retention circuits. Each of the plurality of retention circuits includes terminals for receiving external signals SEL1, SEL2, VDD, and VSS, respectively, and receives these signals via a selection line 46a, a selection line 46b, a high-potential-side power line 46H, and a low-potential-side power line 46L, respectively, and receives the output from the gate driver 45 (gate signal). Here, the retention circuit CSDi−1 is explained as an example. The retention circuit CSDi−1 includes terminals sel1, sel2, vdd, and vss for receiving external signals SEL1, SEL2, VDD, and VSS, respectively, and receives these signals via the selection line 46a, the selection line 46b, the high-potential-side power line 46H, and the low-potential-side power line 46L, respectively. Furthermore, the retention circuit CSDi−1 includes an input terminal s, which is connected with the gate line GLi+2 and receives the output from the gate driver 45 (gate signal). The output from the retention circuit CSDi−1 (CS signal) is supplied to the CS line CSLi−1 via an output terminal cs. The terminal herein indicates a point on a circuit. In an actual device, a corresponding terminal for connection may be shaped or may not be shaped. The terminal herein may indicate merely a corresponding point on a line. Throughout the specification, the term "terminal" is used in a similar manner.

Figure 11:
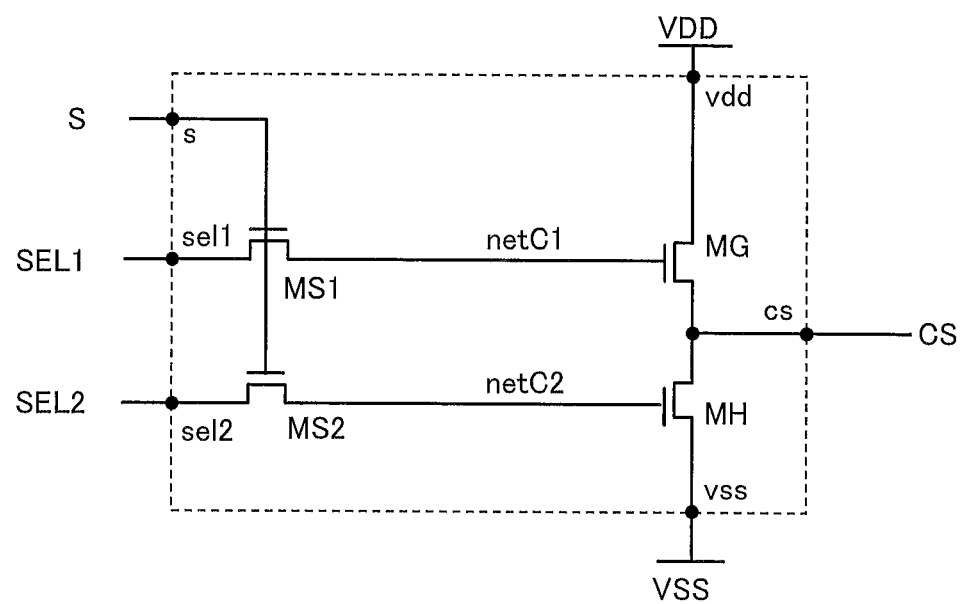
FIG. 11 is a circuit diagram showing a specific example of a retention circuit constituting a CS driver shown in FIG. 10.

FIG. 11 is a circuit diagram showing a specific example of a retention circuit constituting the CS driver 46. The retention circuit CSDi−1 is explained as an example. The retention circuit CSDi−1 includes four transistors MS1, MS2, MG, and MH. These transistors are amorphous silicon TFTs formed on a glass substrate.

The external signals S, SEL1 (retention target signal), SEL2 (retention target signal), VDD, and VSS are inputted to the terminals s (first input section), sel1 (second input section), sel2 (third input section), vdd, and vss of the retention circuit CSDi−1, respectively, and a CS signal is outputted from the terminal cs.

The transistor MS1 is designed such that a gate electrode is connected with the terminal s of the retention circuit CSDi−1, a source electrode is connected with the terminal sel1 of the retention circuit CSDi−1, and a drain electrode is connected with a node netC1. The transistor MG is designed such that a gate electrode is connected with the node netC1, a source electrode is connected with the terminal vdd, and a drain electrode is connected with the output terminal cs.

The transistor MS2 is designed such that a gate electrode is connected with the terminal s of the retention circuit CSDi−1, a source electrode is connected with the terminal sel2 of the retention circuit CSDi−1, and a drain electrode is connected with a node netC2. The transistor MH is designed such that a gate electrode is connected with the node netC2, a source electrode is connected with the output terminal cs, and a drain electrode is connected with the terminal vss.

Figure 12:
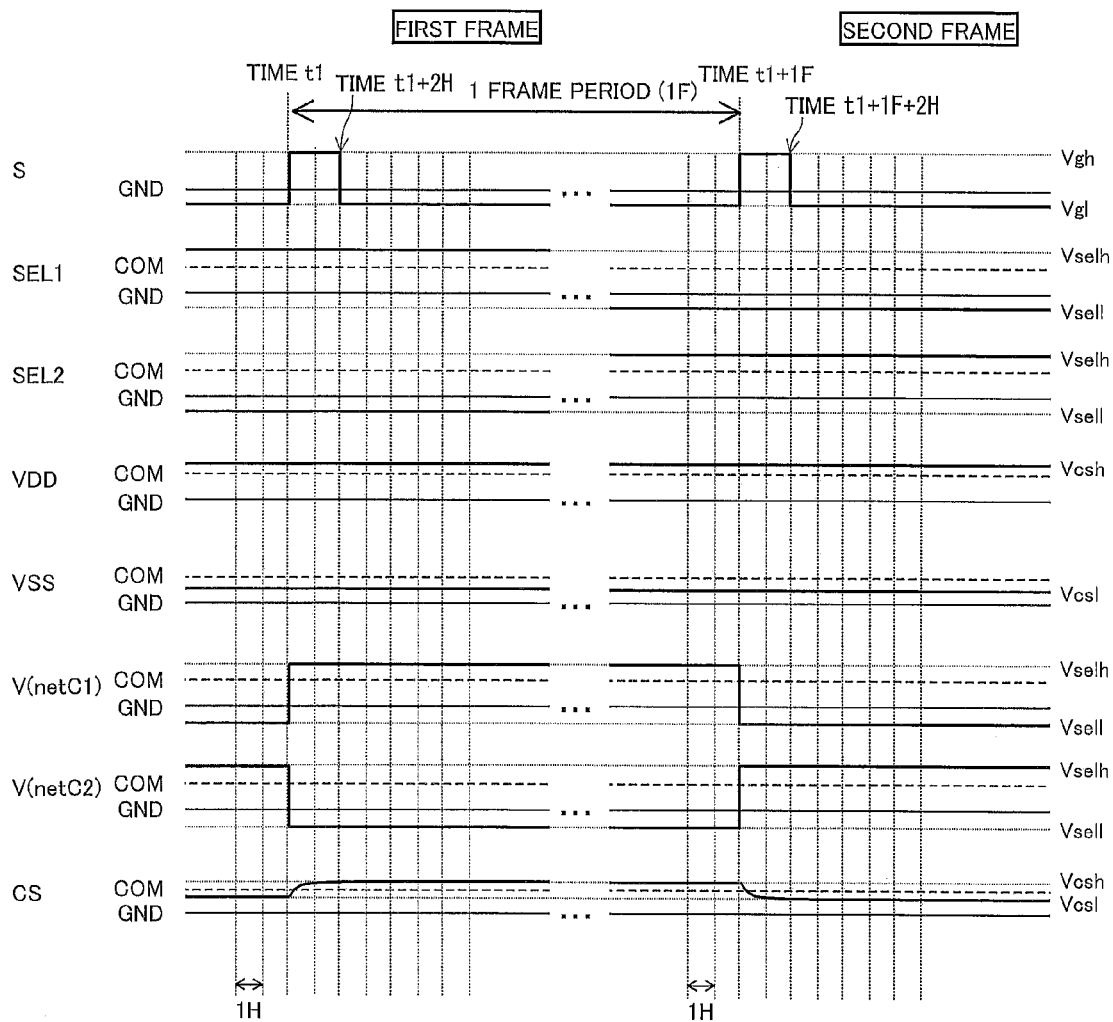
FIG. 12 is a timing chart showing signals inputted to and outputted from a retention circuit CSDi-1 shown in FIG. 10.

FIG. 12 is a timing chart showing signals inputted to and outputted from the retention circuit CSDi−1. Here, the retention circuit CSDi−1 shown in FIG. 10 is used as an example. In FIG. 12, a lateral axis indicates a time and a longitudinal axis indicates a potential, and an upper direction of the sheet is regarded as a forward direction. In particular, the lateral axis indicating a time is lined vertically with respect to each 1H (horizontal scanning period) so as to provide indications for showing timing. The longitudinal axis indicating a potential also indicates a GND level serving as a reference potential, and a COM which is the potential of a common electrode (com). The same is applied to later-mentioned timing charts. The liquid crystal display device 110 in accordance with the present embodiment is driven, for example, with the frame rate of 120 Hz, 1H (horizontal scanning period) is 7.4 µs, 2H is 14.8 µs, and 1F (frame, vertical scanning period) is 8.3 ms. However, the present invention is not limited to this.

FIG. 12 shows waveforms of signals S, SEL1, SEL2, VDD, VSS, netC1, netC2, and CS. In the drawing, V(netC1) and V(netC2) indicate potentials of the nodes netC1 and netC2, respectively, and CS indicates a CS signal outputted from the terminal cs of the retention circuit CSDi−1. The signal S indicates a signal branched from the gate line GLi+2 and inputted into the terminal s. In the following explanation as well as in the cases of netC1 and netC2, in order to indicate signals and potentials of specific portions such as lines and nodes, the name of the line or the node may be shown with the name of the line or the node parenthesized and "V" added in front of the name.

The waveform of the signal S varies with respect to one frame (vertical scanning period). In this case, the waveform of the signal S is in a high potential state during 2H (horizontal scanning period) once per frame. During other periods, the waveform of the signal S is in a low potential state. The high potential is indicated by Vgh and the low potential is indicated by Vgl. Signal waveforms of SEL1 and SEL2 alternately repeat the high potential state and the low potential state with respect to each frame. The high potential of SEL1 and SEL2 is indicated by Vselh and the low potential of SEL1 and SEL2 is indicated by Vsell. The phases of SEL1 and SEL2 are shifted from each other by 180 degrees. Although not shown, it is desirable that change of the potentials of SEL1 and SEL2 is made during a blanking period in which no potential is written in a pixel electrode, so that display is not influenced. Potentials of VDD and VSS are constant and indicated by Vcsh and Vcsl, respectively. As shown in FIG. 12, the CS signal varies between Vcsh and Vcsl.

Here, the operation of the retention circuit CSDi−1 is explained below with reference to FIG. 11. S serves as a start pulse for the retention circuit CSDi−1. When the signal potential (gate signal) of the gate line GLi+2 corresponding to a pixel in a stage subsequent to a pixel including the retention circuit CSDi−1 gets active (in a selected state), the potential of the signal S rises from Vgl to Vgh, the transistors MS1 and MS2 are in an on-state, and the potentials of the nodes netC1 and netC2 get closer to the potentials of SEL1 and SEL2, respectively. After 2H has elapsed from when S became Vgh, the potential of S drops to Vgl again, the transistors MS1 and MS2 get in an off-state, and the potentials of the nodes netC1 and netC2 are retained at potentials when the transistors MS1 and MS2 are made off, regardless of the potentials of SEL1 and SEL2.

Since the potentials of SEL1 and SEL2 are shifted from each other by 180 degrees, one of the potentials of the nodes netC1 and netC2 is high (in a selected state) and the other is low (in a non-selected state). In accordance with this, one of the transistors MG and MH is in a selected state and the other is in a non-selected state. The potential of the outputted CS signal varies according to the potentials of the nodes netC1 and netC2. Since the terminal cs is connected with the CS line of the display section and so takes time to charge, the change in the potential of the outputted CS signal is more gradual than changes in the nodes netC1 and netC2. In accordance with the selected state/non-selected state of the transistors MG and MH, the potential of the CS signal becomes substantially stable in the vicinity of the potential of Vcsh or Vcsl after a predetermined time. Since the nodes netC1 and netC2 serve as retaining sections, even if the potentials of SEL1 and SEL2 change, the potentials of the nodes netC1 and netC2 are retained until the next time the potential of S changes, i.e. during substantially 1 frame period, so that the potential of the CS signal is retained.

Specifically, in a first frame of consecutive first and second frames, when S gets Vgh at a time t1, the transistors MS1 and MS2 get in an on-state, the terminal sel1 and the node netC1 get conductive, the potential of the node netC1 rises, the terminal sel2 and the node netC2 get conductive, and the potential of the node netC2 drops. The high potential of the node netC1 puts the transistor MG in an on-state and the low potential of the node netC2 puts the transistor MH in an off-state, so that the potential of the CS signal is closer to the potential Vcsh of VDD.

In the second frame, when S gets Vgh at a time t1+1F, the transistors MS1 and MS2 get in an on-state, the terminal sel1 and the node netC1 get conductive, the potential of the node netC1 drops, the terminal sel2 and the node netC2 get conductive, and the potential of the node netC2 rises. The low potential of the node netC1 puts the transistor MG in an off-state and the high potential of the node netC2 puts the transistor MH in an on-state, so that the potential of the CS signal is closer to the potential Vcsl of VSS.

The retention circuit CSDi−1 alternately repeats the operations of the first and second frames.

To be more precise, the potentials of the nodes netC1 and netC2 are within the range between Vselh and Vsell, but there is a case where the potentials of the nodes netC1 and netC2 do not completely reach Vselh or Vsell due to circuit configuration or characteristics of a transistor. In particular, when the transistor is an amorphous silicon TFT, there is a case where charging ability is insufficient due to low mobility etc. and the potentials of the nodes netC1 and netC2 do not reach Vselh or Vsell sufficiently.

Figure 13:
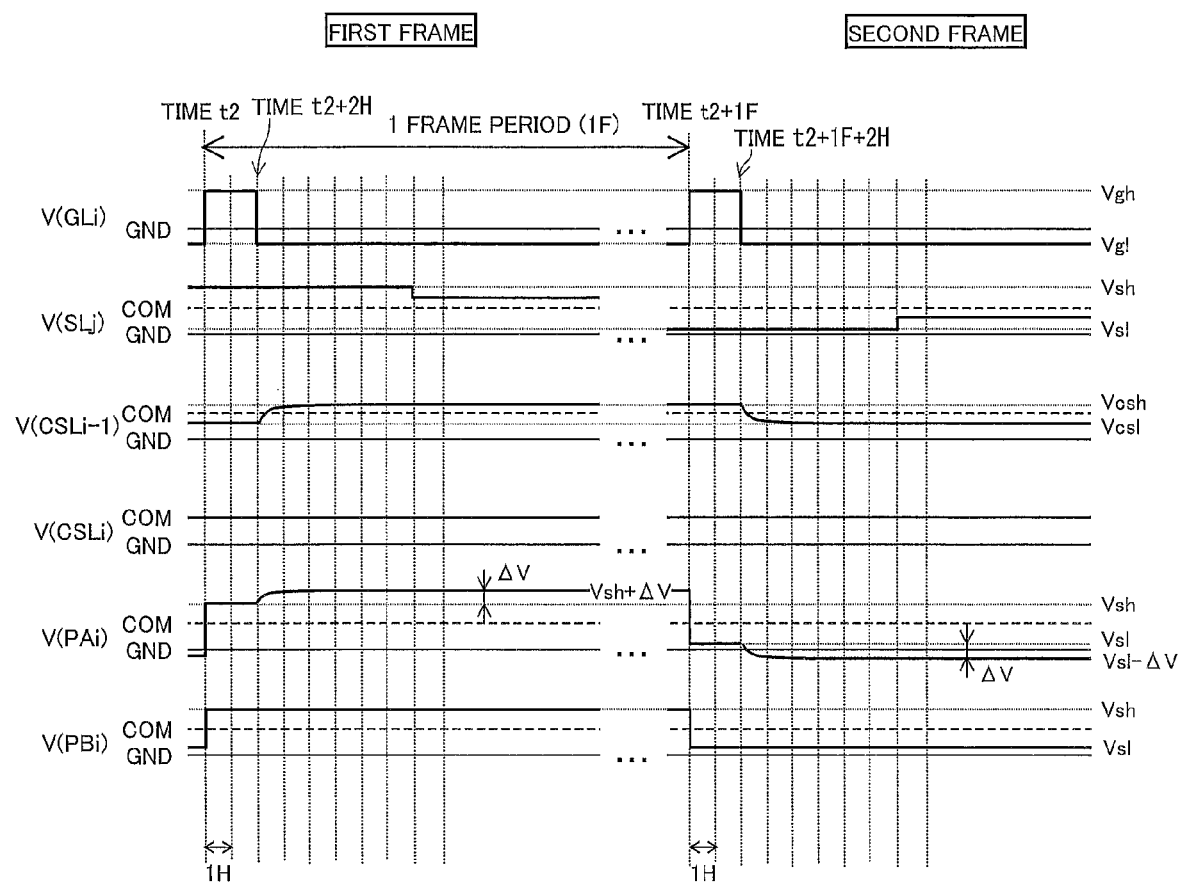
FIG. 13 is a timing chart showing signal waveforms in a pixel Pi shown in FIG. 9.
Figure 14:
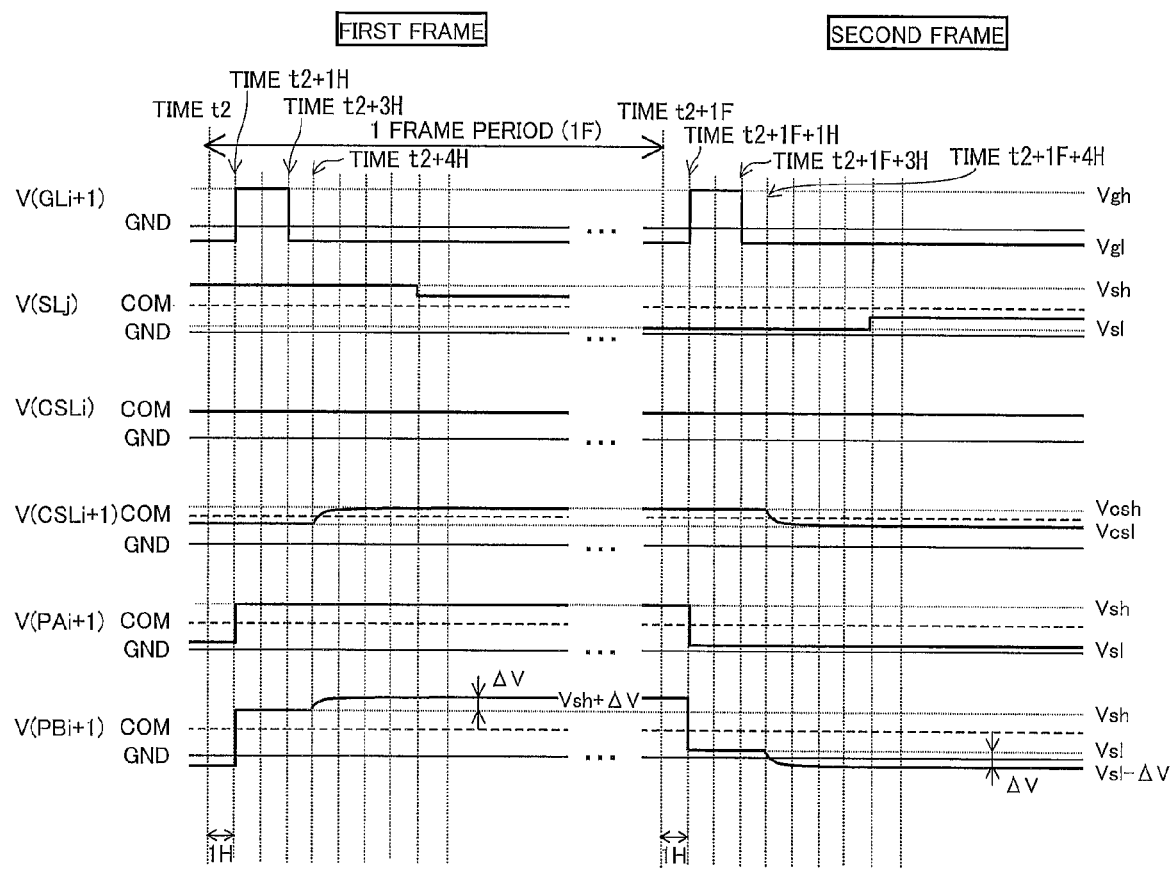
FIG. 14 is a timing chart showing signal waveforms in a pixel Pi+1 shown in FIG. 9.

FIG. 13 is a timing chart showing signal waveforms in the pixel Pi shown in FIG. 9, and corresponds to the gate line GLi at an even stage. FIG. 14 is a timing chart showing signal waveforms in the pixel Pi+1, and corresponds to the gate line GLi+1 at an odd stage. i is an even number. In FIGS. 13 and 14 as well as in FIG. 12, the lateral axis indicating a time is lined vertically with respect to each 1H (horizontal scanning period) so as to provide indications for showing timing. The longitudinal axis indicating a potential also indicates a GND level serving as a reference potential, and a COM which is the potential of a common electrode (com). The same is applied to subsequent timing charts. First and second frames in each of FIGS. 13 and 14 correspond to the first and second frames in FIG. 12, respectively, and a time t2 is prior by 2H to the time t1. That is, (time t2)=(time t1−2H). The following provides examples of changes in signals at and around the pixels Pi and Pi+1. The same is applicable to changes in signals at and around pixels in other stages except for a timing shift as a whole due to sequential scanning of individual stages.

In FIG. 13, V(GLi) indicates the potential of the gate line GLi, V(SLj) indicates the potential of the source line SLj, V(CSLi−1) indicates the potential of the CS line CSLi−1, V(CSLi) indicates the potential of the CS line CSLi. V(PAi) and V(PBi) indicate pixel potentials of sub-pixels PAi and PBi, respectively. As shown in FIG. 9, the pixel Pi including the sub-pixels PAi and PBi is charge-controlled by the gate line GLi, the source line SLj, and the CS lines CSLi−1 and CSLi. The source line SLj may be any line and j may be any number not less than 1 and not more than n.

Initially, an explanation is made as to the first frame in FIG. 13. Assume that the potential of the gate line GLi (gate signal) rises at the time t2. The potential of the source line SLj (data signal) gets alternately higher and lower than the potential COM of the common electrode (com) with respect to each frame. The exact potential varies according to an image signal to be displayed. In the first frame, the potential of the source line SLj is positive with respect to COM (has a plus polarity with respect to COM). Since the retention circuit CSDLi−1 starts to operate with timing when the gate line GLi+2 gets active (is put in a selected state) (see FIG. 12), the potential of the CS line CSLi−1 starts to change at the time t2+2H (=time t1). As shown in FIG. 12, since the potential of SEL1 inputted to the retention circuit CSDLi−1 is high, the potential of the CS line CSLi−1 gets positive with respect to COM.

As shown in FIG. 10, the CS line CSLi is connected with the capacitor main line 47 and receives a certain potential (COM), so that the potential of the CS line CSLi does not change.

In the sub-pixel PAi, the potential of the gate line GLi is high (Vgh) from the time t2 to the time t2+2H, so that the potential of the source line SLj (data signal) is written directly. After the time t2+2H, the potential of the gate line GLi is low (Vgl), so that the corresponding transistor is in an off-state and the sub-pixel PAi is not charged or discharged. That is, the sub-pixel PAi is in a floating state. Here, as shown in FIG. 9, in the sub-pixel PAi, a retention capacitor is formed between the pixel electrode and the CS line CSLi−1 (capacitor coupling), so that the potential of the sub-pixel PAi is influenced by the change in potential of the CS line CSLi−1 (low potential→high potential) after the transistor is put in an off-state, and consequently rises in a positive direction. The change $\Delta V$ in pixel potential due to such capacitor coupling driving is obtained by $\Delta V=(Vcsh-Vcsl)\times K$. Here, $K=CCS/(CCS+CLC)$. CCS represents a retention capacitor substantially formed between a pixel electrode of a corresponding sub-pixel (here, PAi) and a CS line (here, CSLi−1), and CLC represents a liquid crystal capacitor substantially formed between a pixel electrode of the corresponding sub-pixel (here, PAi) and a common electrode (com). The wording "capacitor substantially formed" is used because the CS line may include a capacitor electrode so that a retention capacitor is formed between a pixel electrode and the CS line via the capacitor electrode. The same can be said about K in a later-mentioned equation.

In the sub-pixel PBi, a retention capacitor is formed between the pixel electrode and the CS line CSLi. Since the potential of the CS line CSLi is constant, the pixel electrode does not change in a floating state after the time t2+2H (after a transistor is put in an off-state).

Next, an explanation is made as to the second frame. The potential of the gate line GLi rises at the time t2+1F. In the second frame, the potential of the source line SLj is negative with respect to COM (has a minus polarity with respect to COM). Furthermore, as shown in FIG. 12, since the potential of SEL2 inputted to the retention circuit CSDLi−1 is high, the potential of the CS line CSLi−1 changes in a negative direction.

As shown in FIG. 10, the CS line CSLi is connected with the capacitor main line 47 and receives a certain potential (COM), so that the potential of the CS line CSLi does not change.

Since the potential of the gate line GLi is high (Vgh) from the time t2+1F to the time t2+1F+2H, the potential of the source line SLj (data signal) is directly written in the sub-pixels PAi and PBi. After the time t2+1F+2H, the potential of the gate line GLi is low (Vgl), so that the corresponding transistors are put in an off-state and the sub-pixels are not charged or discharged. That is, the sub-pixel PAi is put in a floating state. Here, as shown in FIG. 9, in the sub-pixel PAi, a retention capacitor is formed between the pixel electrode and the CS line CSLi−1 (capacitor coupling), so that the potential of the sub-pixel PAi is influenced by the change in potential of the CS line CSLi−1 (high potential→low potential) after the transistor is put in an off-state, and consequently falls in a negative direction. The change $\Delta V$ in potential of the sub-pixel PAi is obtained by $(Vcsh-Vcsl)\times K$ similarly with the first frame.

In the sub-pixel PBi, a retention capacitor is formed between the pixel electrode and the CS line CSLi. Since the potential of the CS line CSLi is constant, the pixel electrode does not change in a floating state after the time t2+1F+2H (after a transistor is put in an off-state).

Writing (charging) of the data signal potential in the pixel Pi is made by repeating the operations of the first and second frames.

Notwithstanding supply of a data signal to the sub-pixels PAi and PBi from the same source line SLj with the same timing, the aforementioned operation enables the potentials of the sub-pixels PAi and PBi to differ from each other. Accordingly, in a case where the liquid crystal display device employs a normally black display mode, the potential difference between the potential of the sub-pixels and the potential COM of the common electrode (com) enables the sub-pixels PAi and PBi to serve as a bright sub-pixel and a dark sub-pixel, respectively. Thus, it is possible to realize a liquid crystal display device based on a pixel-division system.

Next, with reference to FIG. 14, an explanation is made as to a change in potential of the pixel Pi+1 corresponding to the gate line GLi+1 at an odd stage.

In FIG. 14, V(GLi+1) indicates the potential of the gate line GLi+1, V(SLj) indicates the potential of the source line SLj, V(CSLi) indicates the potential of the CS line CSLi, V(CSLi+1) indicates the potential of the CS line CSLi+1. V(PAi+1) and V(PBi+1) indicate pixel potentials of sub-pixels PAi+1 and PBi+1, respectively.

As shown in FIG. 9, the pixel Pi+1 including the sub-pixels PAi+1 and PBi+1 is charged by the gate line GLi+1, the source line SLj, and the CS lines CSLi and CSLi+1. j may be any number not less than 1 and not more than n.

In the first frame, the potential of the source line SLj (data signal) is positive with respect to COM (has a plus polarity with respect to COM).

Since the retention circuit CSDLi+1 starts to operate with timing when the gate line GLi+4 gets active (is put in a selected state), the potential of the CS line CSLi+1 starts to change at the time t2+4H. As shown in FIG. 12, since the potential of SEL1 inputted to the retention circuit CSDLi+1 is high, the potential of the CS line CSLi+1 changes in a positive direction.

As described above, the CS line CSLi is connected with the capacitor main line 47 and receives a certain potential (COM), so that the potential of the CS line CSLi does not change.

The potential of the gate line GLi+1 is high (Vgh) from the time t2+1H to the time t2+3H, so that the potential of the source line SLj (data signal) is written directly in the sub-pixels PAi+1 and PBi+1. After the time t2+3H, the potential of the gate line GLi+1 is low (Vgl), so that the corresponding transistors are put in an off-state and the sub-pixels are not charged or discharged. That is, the sub-pixel PBi+1 is put in a floating state. Here, as shown in FIG. 9, in the sub-pixel PBi+1, a retention capacitor is formed between the pixel electrode and the CS line CSLi+1 (capacitor coupling), so that the potential of the sub-pixel PBi+1 is influenced by the change in potential of the CS line CSLi+1 (low potential→high potential) at a time t2+4H after the transistor is put in an off-state, and consequently rises in a positive direction. The change ΔV in potential of the sub-pixel PBi+1 at that time is obtained by ΔV=(Vcsh−Vcsl)×K.

In the sub-pixel PAi+1, a retention capacitor is formed between the pixel electrode and the CS line CSLi. Since the potential of the CS line CSLi is constant, the pixel electrode does not change in a floating state after the time t2+3H (after a transistor is put in an off-state). Next, an explanation is made as to the second frame. The potential of the gate line GLi+1 rises at the time t2+1F+1H. In the second frame, the potential of the source line SLj is negative with respect to COM (has a minus polarity with respect to COM). As shown in FIG. 12, since the potential of SEL2 inputted to the retention circuit CSDLi+1 is high, the potential of the CS line CSLi+1 changes in a negative direction.

As described above, the CS line CSLi is connected with the capacitor main line 47 and receives a certain potential (COM), so that the potential of the CS line CSLi does not change.

Since the potential of the gate line GLi+1 is high (Vgh) from the time t2+1F+1H to the time t2+1F+3H, the potential of the source line SLj (data signal) is written directly in the sub-pixels PAi+1 and PBi+1. After the time t2+1F+3H, the potential of the gate line GLi+1 is low (Vgl), so that the corresponding transistors are put in an off-state and the sub-pixels are not charged or discharged. That is, the sub-pixel PBi+1 is put in a floating state. Here, as shown in FIG. 9, in the sub-pixel PBi+1, a retention capacitor is formed between the pixel electrode and the CS line CSLi+1 (capacitor coupling), so that the potential of the sub-pixel PBi+1 is influenced by the change in potential of the CS line CSLi+1 (high potential→low potential) after the transistor is put in an off-state, and consequently falls in a negative direction. The change ΔV in potential of the sub-pixel PBi+1 is obtained by (Vcsh−Vcsl)×K similarly with the first frame.

In the sub-pixel PAi+1, a retention capacitor is formed between the pixel electrode and the CS line CSLi+1. Since the potential of the CS line CSLi+1 is constant, the pixel electrode does not change in a floating state after the time t2+1F+3H (after a transistor is put in an off-state).

Writing (charging) of the data signal potential in the pixel Pi+1 is made by repeating the operations of the first and second frames.

Notwithstanding supply of a data signal to the sub-pixels PAi+1 and PBi+1 from the same source line SLj with the same timing, the aforementioned operation enables the potentials of the sub-pixels PAi+1 and PBi+1 to differ from each other. Accordingly, in a case where the liquid crystal display device employs a normally black display mode, the potential difference between the potential of the sub-pixels and the potential COM of the common electrode (com) enables the sub-pixels PAi+1 and PBi+1 to serve as a dark sub-pixel and a bright sub-pixel, respectively. Thus, it is possible to realize a liquid crystal display device based on a pixel-division system.

Figure 51:
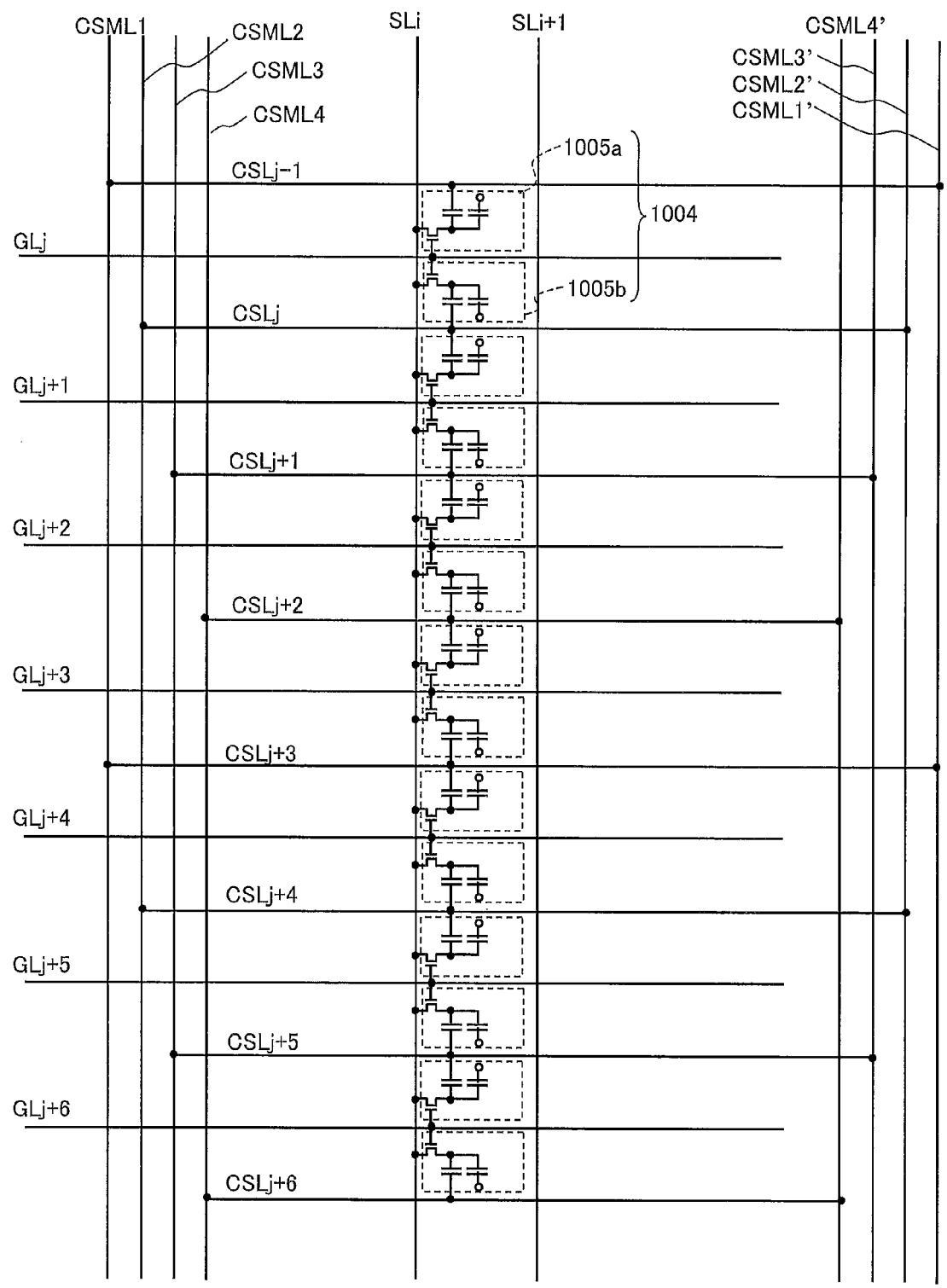
FIG. 51 is an electrically equivalent circuit diagram showing how pixels and retention capacitor lines are connected with each other in FIG. 49.

As described above, in the liquid crystal display device 110 of the present invention, the liquid crystal panel 113a includes, on the glass substrate 1, a CS driver (retention capacitor line driving circuit) including a plurality of retention circuits (retention capacitor line driving internal circuits) and a retention capacitor main line, and an output from the retention circuit or an output obtained by dividing a signal supplied to the retention capacitor main line is inputted as a CS signal (retention capacitor line signal) to a CS line (retention capacitor line). Here, the retention capacitor main line is DC driven by supply of a certain potential (e.g. COM) from the outside, and is not AC driven. Accordingly, the width of the retention capacitor main line can be reduced greatly compared with the conventional configuration shown in FIG. 51. This is because signal delay in the retention capacitor main line and the retention capacitor lines is less likely to influence display. Furthermore, since the retention circuit can be made of four TFTs as shown in FIG. 11, the circuit configuration of the CS driver can be simplified. Furthermore, since lines for transmitting the signals SEL1, SEL2, VDD, and VSS for driving the retention circuit can be thin, the area occupied by the CS driver on the active matrix substrate can be small. The reason why these lines can be thin is that the circuit configuration enables line capacitances of the selection lines 46a and 46b for transmitting the signals SEL1 and SEL2 respectively to be small and the signals SEL1 and SEL2 change their potentials only during a blanking period and VDD and VSS may be constant.

Therefore, with the arrangement, the circuit and the lines for supplying a CS signal to a CS line can be produced while the circuit and the lines occupy only small areas, so that narrowing of the frame of the liquid crystal panel and the liquid crystal display device including the liquid crystal panel is not disturbed. That is, a liquid crystal display device based on a capacitive-coupling pixel-division system can have a narrower frame.

Modification Example 1

Figure 15:
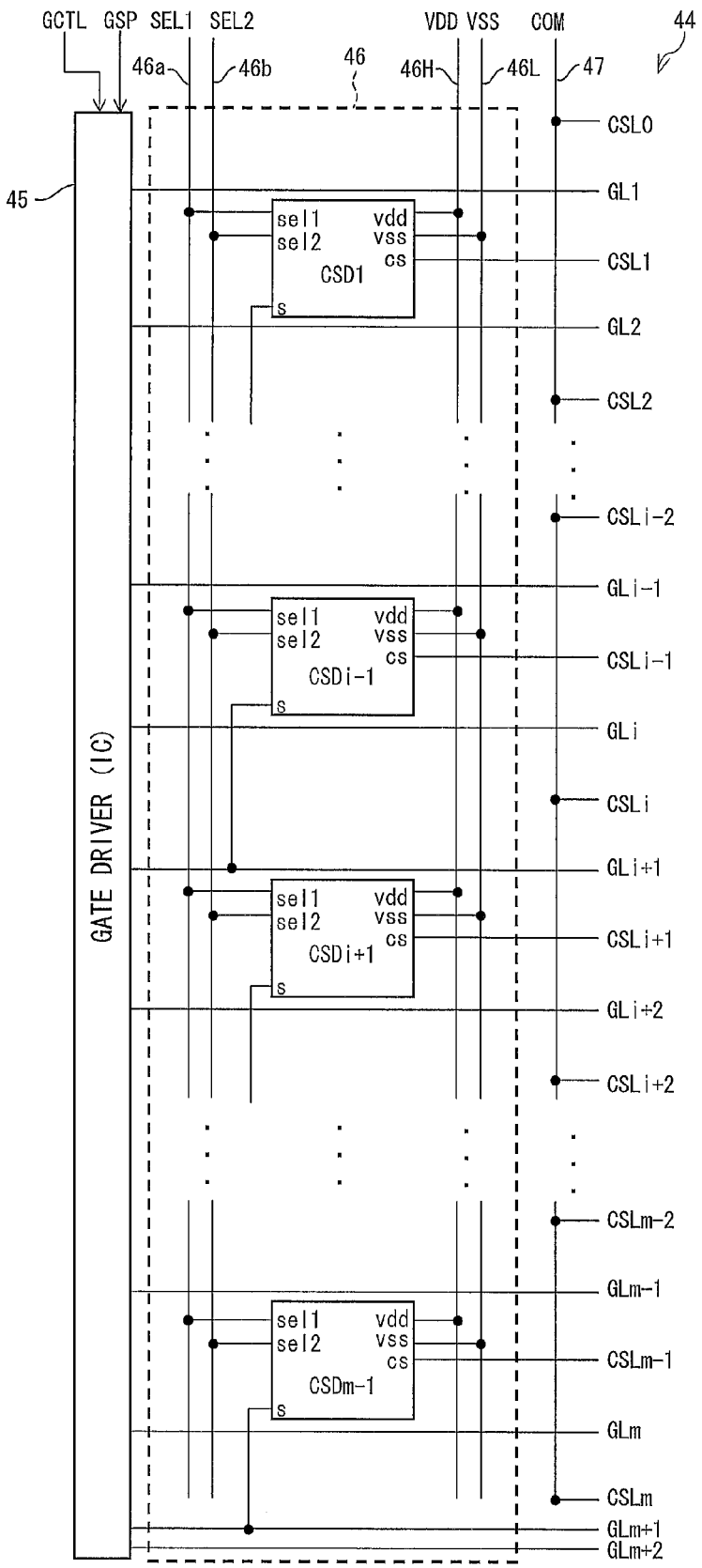
FIG. 15 is a circuit diagram showing a gate/CS driver in Modification Example 1.
Figure 16:
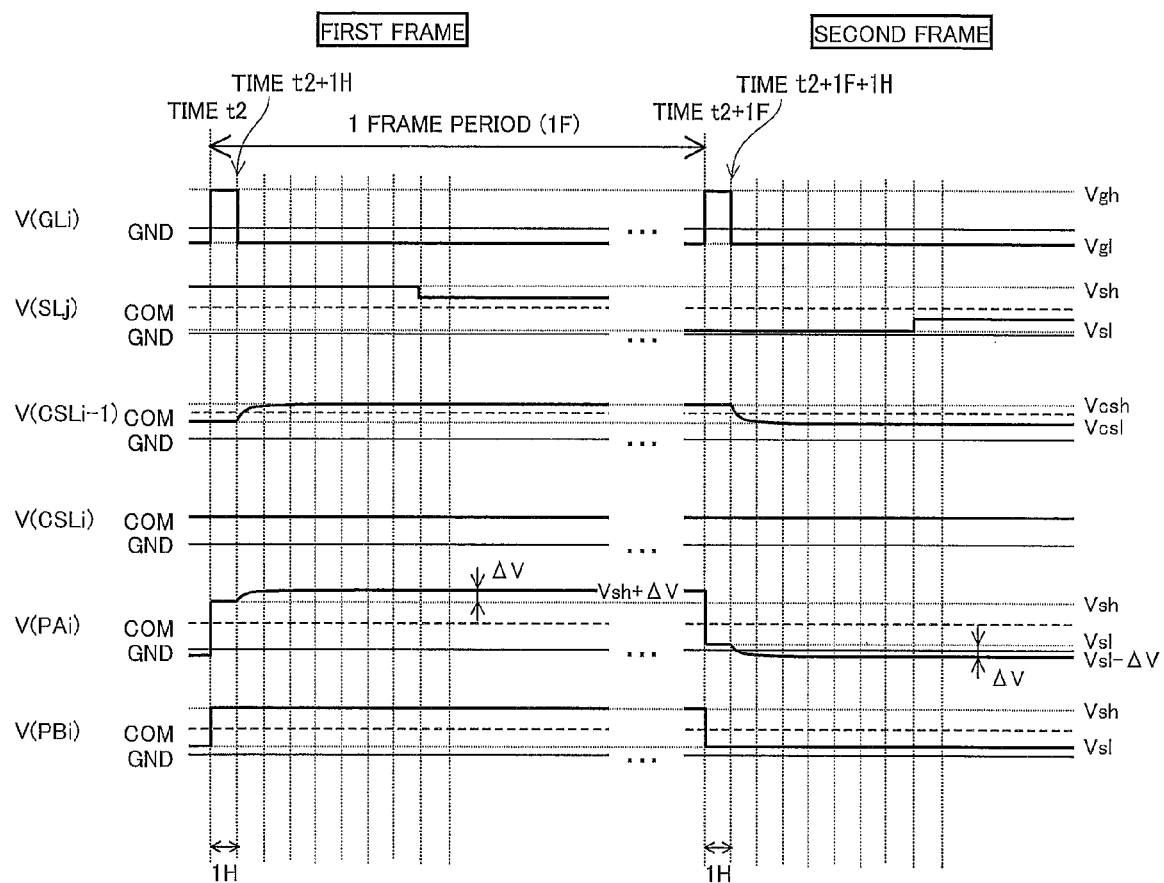
FIG. 16 is a timing chart showing signal waveforms in a pixel Pi in Modification Example 1.
Figure 17:
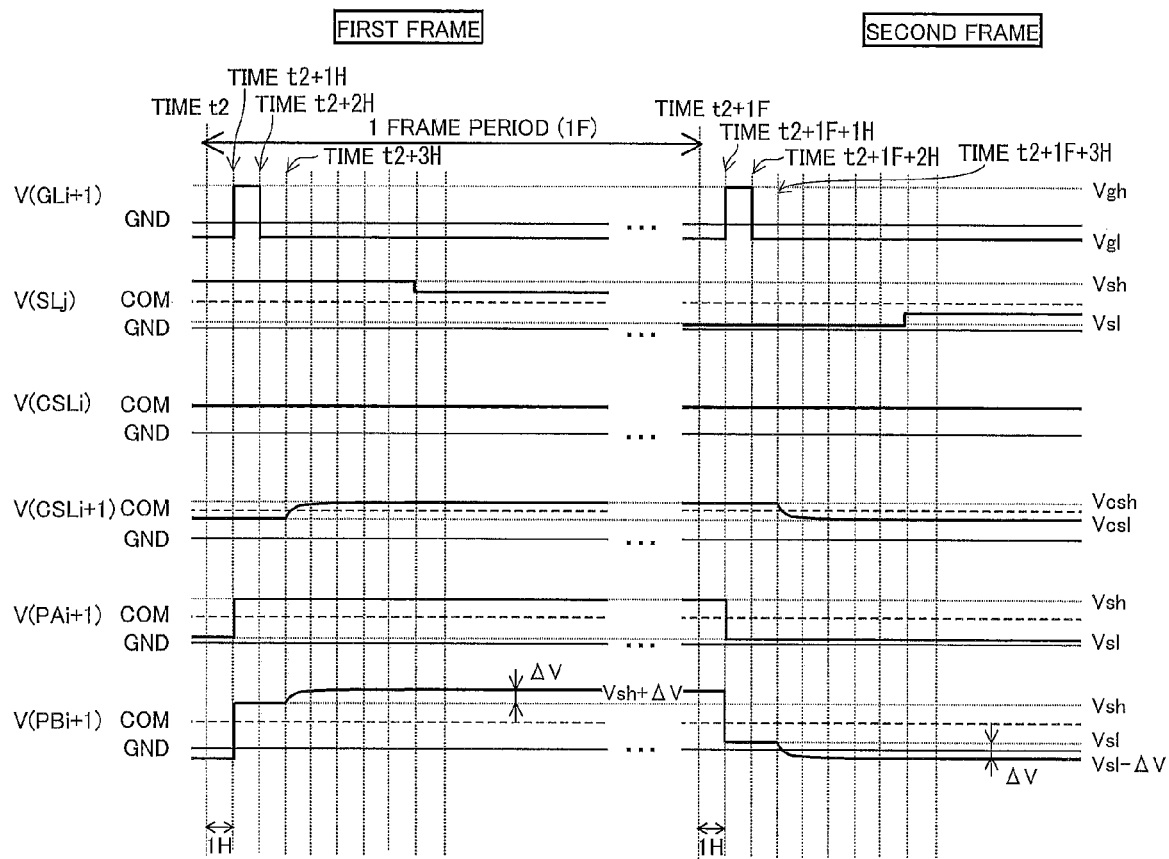
FIG. 17 is a timing chart showing signal waveforms in a pixel Pi+1 in Modification Example 1.

Next, an explanation is made as to Modification Example 1 of the gate/CS driver 44 of Configuration Example 1. In Configuration Example 1, the potential of the gate line GLi (scanning signal) is made high (Vgh) only during 2H (horizontal scanning period) so that data signals are supplied to corresponding pixels. However, the present invention is not limited to this. The high potential period during which the potential is high may be, for example, 1H or not less than 3H depending on standards of the size of the liquid crystal display device to be achieved, such as size, resolution, and frame rate. In a case where the high potential period is 1H, even when the gate signal inputted to the retention circuit CSDi−1 is GLi+1, a liquid crystal display device based on a pixel-division system can be realized. FIG. 15 is a circuit diagram showing a gate/CS driver having this configuration. FIGS. 16 and 17 are timing charts showing signal waveforms in pixels Pi and Pi+1, respectively, to each of which the gate/CS driver shown in FIG. 15 is applied.

With the configuration of Modification Example 1, in the pixel Pi, as shown in FIG. 16, in the first frame, the potential of the sub-pixel PAi is influenced by a change in potential of the CS line CSLi−1 (low potential→high potential) at the time t2+1H and rises in a positive direction by ΔV, and in the second frame, the potential of the sub-pixel PAi is influenced by a change in potential of the CS line CSLi−1 (high potential→low potential) at the time t2+1F+1H and falls in a negative direction by ΔV. The potential of the sub-pixel PBi does not change in a floating state after a transistor is put in an off-state, as in the case of FIG. 13. This configuration enables the sub-pixels PAi and PBi to serve as a bright sub-pixel and a dark sub-pixel, respectively.

In the pixel Pi+1, as shown in FIG. 17, in the first frame, the potential of the sub-pixel PBi+1 is influenced by a change in potential of the CS line CSLi+1 (low potential→high potential) at the time t2+3H and rises in a positive direction by ΔV, and in the second frame, the potential of the sub-pixel PBi+1 is influenced by a change in potential of the CS line CSLi+1 (high potential→low potential) at the time t2+1F+3H and falls in a negative direction by ΔV. The potential of the sub-pixel PAi+1 does not change in a floating state after a transistor is put in an off-state, as in the case of FIG. 13. This configuration enables the sub-pixels PAi+1 and PBi+1 to serve as a dark sub-pixel and a bright sub-pixel, respectively.

Modification Example 2

Figure 18:
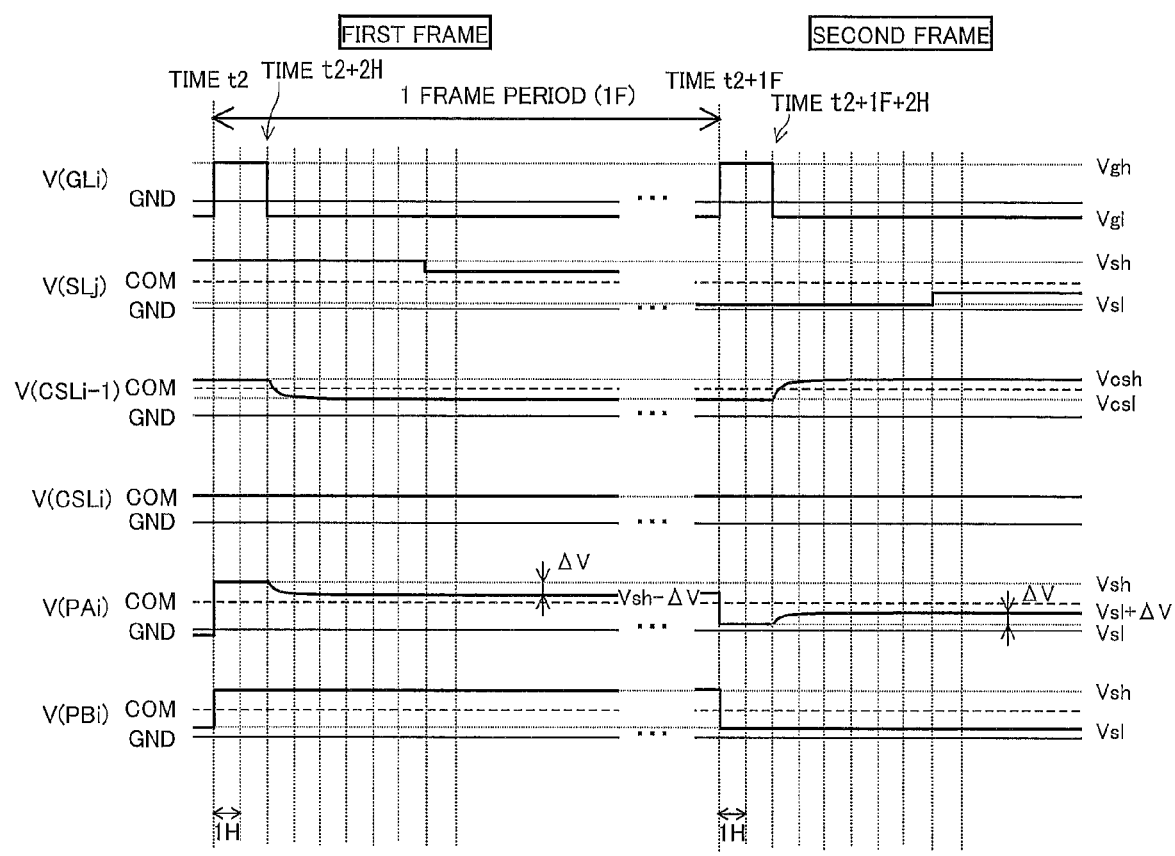
FIG. 18 is a timing chart showing signal waveforms in a pixel Pi in Modification Example 2.
Figure 19:
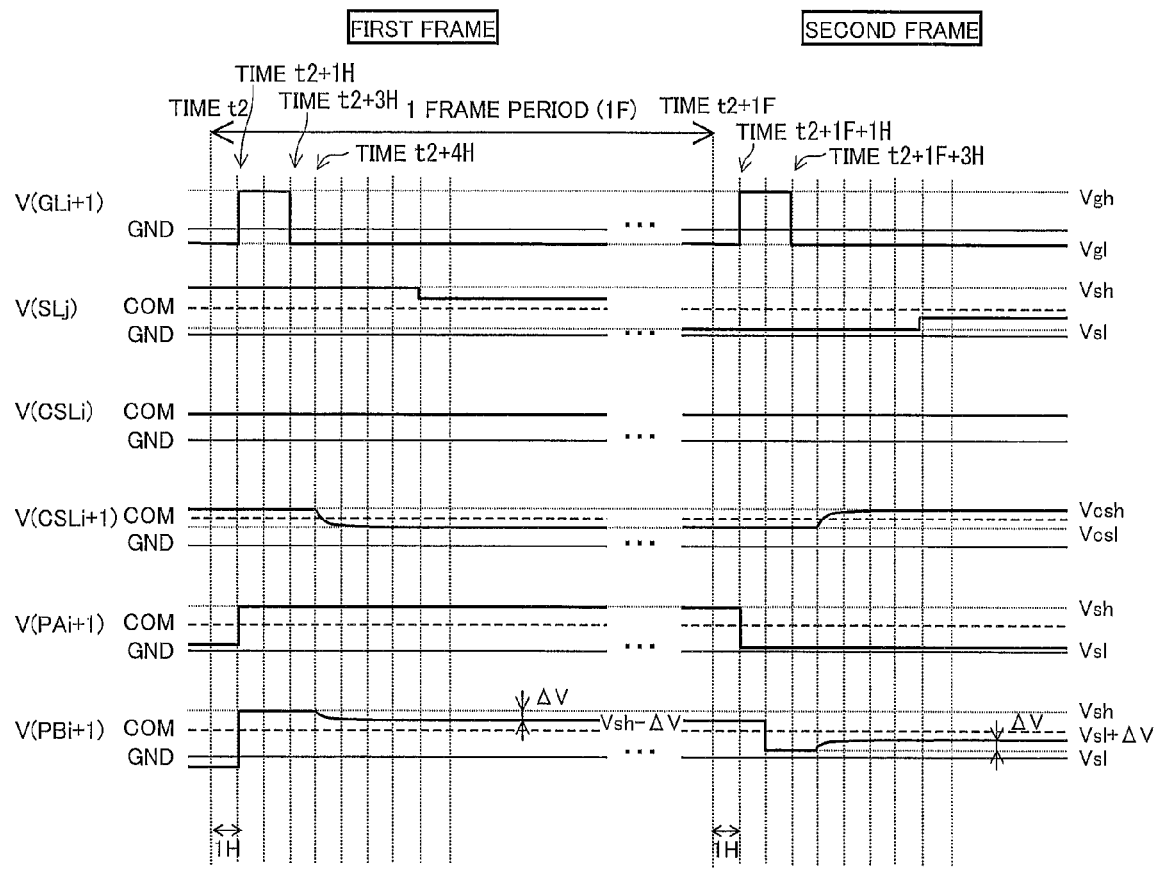
FIG. 19 is a timing chart showing signal waveforms in a pixel Pi+1 in Modification Example 2.

Next, an explanation is made as to Modification Example 2 of the gate/CS driver 44 of Configuration Example 1. In the Modification Example 2, the potentials of the signals SEL1 (retention target signal) and SEL2 (retention target signal) shown in FIG. 12 are inverted. That is, SEL1 has low potential (Vsell) and SEL2 has high potential (Vselh) in the first frame, and SEL1 has high potential (Vselh) and SEL2 has low potential (Vsell) in the second frame. Consequently, although not shown in the drawing, the change in potential of the CS signal shown in FIG. 12 is inverted. FIGS. 18 and 19 are timing charts showing signal waveforms in each of Pi and Pi+1, using the CS signal.

As shown in FIG. 18, in the pixel Pi in the first frame, the potential of the gate line GLi is high (Vgh) from the time t2 to the time t2+2H, so that the potential of the source line SLj (data signal) is written directly in the sub-pixels PAi and PBi, and after the time t2+2H, the potential of the gate line GLi is low (Vgl), so that the corresponding transistors are put in an off-state, and the sub-pixels are not charged or discharged and are put in a floating state. While the sub-pixel PAi is in a floating state, the potential of the sub-pixel PAi is influenced by a change in potential of the CS line CSLi−1 (high potential→low potential) and falls in a negative direction by ΔV. In the sub-pixel PBi, a retention capacitor is formed between the pixel electrode and the CS line CSLi. Since the potential of the CS line CSLi is constant, the pixel potential does not change in a floating state after the time t2+2H (after the transistor is made off).

In the second frame, the relation in potential between the source line SLj and the CS line CSLi−1 is inverted from the first frame, so that the potential of the sub-pixel PAi is influenced by a change in potential of the CS line CSLi−1 (low potential→high potential) after the transistor is made off, and rises in a positive direction by ΔV. In the sub-pixel PBi, since the potential of the CS line CSLi is constant, the pixel potential does not change as in the first frame.

Writing (charging) of a data signal potential in the pixel Pi is made by repeating the operations of the first and second frames.

The above operation enables the sub-pixels PAi and PBi to serve as a dark sub-pixel and a bright sub-pixel, respectively.

As shown in FIG. 19, in the pixel Pi+1 in the first frame, the potential of the gate line GLi+1 is high (Vgh) from the time t2+1H to the time t2+3H, so that the potential of the source line SLj (data signal) is written directly in the sub-pixels PAi+1 and PBi+1, and after the time t2+3H, the potential of the gate line GLi+1 is low (Vgl), so that the corresponding transistors are put in an off-state, and the sub-pixels are not charged or discharged and are put in a floating state. While the sub-pixel PBi+1 is in a floating state, the potential of the sub-pixel PBi+1 is influenced by a change in potential of the CS line CSLi+1 (high potential→low potential) and falls in a negative direction by ΔV. In the sub-pixel PAi+1, a retention capacitor is formed between the pixel electrode and the CS line CSLi. Since the potential of the CS line CSLi is constant, the pixel potential does not change in a floating state after the time t2+3H (after the transistor is made off).

In the second frame, the relation in potential between the source line SLj and the CS line CSLi+1 is inverted from the first frame, so that the potential of the sub-pixel PBi+1 is influenced by a change in potential of the CS line CSLi+1 (low potential→high potential) after the transistor is made off, and rises in a positive direction by ΔV. In the sub-pixel PAi+1, since the potential of the CS line CSLi is constant, the pixel potential does not change as in the first frame.

Writing (charging) of a data signal potential in the pixel Pi+1 is made by repeating the operations of the first and second frames.

The above operation enables the sub-pixels PAi+1 and PBi+1 to serve as a bright sub-pixel and a dark sub-pixel, respectively.

In the above configuration, in order that the pixel potentials of the bright sub-pixel and the dark sub-pixel are in the same levels as the pixel potentials of the bright sub-pixel and the dark sub-pixel that are achieved by driving shown in FIGS. 13 and 14, it is necessary to enlarge average amplitudes of potentials of the source line SLj (data signal) in FIGS. 13 and 14, which may result in an increase in heat emission from the source driver. The increase in heat emission from the source driver requires higher heat resistance, which is disadvantageous in manufacturing a large liquid crystal display device, and besides power consumption of the liquid crystal display device increases. Accordingly, in consideration of narrowing the frame of a liquid crystal display device and realizing heat resistance and low power consumption of the liquid crystal display device, the configurations shown in FIGS. 13 and 14 are preferable.

With the Modification Examples 1 and 2, the circuit and the lines for supplying a signal to a CS line can be produced while the circuit and the lines occupy only small areas, so that narrowing of the frame of a liquid crystal display device is not disturbed. That is, a liquid crystal display device based on a capacitive-coupling pixel-division system can have a narrower frame.

Modification Example 3

In the Configuration Example 1 and its Modification Examples 1 and 2, the transistors 15a and 15b and transistors constituting the CS driver 13, each on the glass substrate 1, include a semiconductor layer made of amorphous silicon. However, the present invention is not limited to this, and the semiconductor layer may include a microcrystalline silicon film, a polycrystalline silicon film, and a metal oxide semiconductor film. The semiconductor layer may have a two-layered structure or a multi-layered structure consisting of an intrinsic layer and a contact layer with low resistance, as in the case of an amorphous silicon TFT.

The microcrystalline silicon film is a silicon film containing a mixture of crystalline phases made of microcrystal grains and amorphous phases. The polycrystalline silicon film is a film consisting of crystalline phases and a slight amount of crystal grain boundaries therebetween, and has a very high crystallization ratio. Specific examples of the metal oxide semiconductor film include a Zn—O series semiconductor (ZnO) film, an In—Ga—Zn—O series semiconductor (IGZO) film, an In—Zn—O series semiconductor (IZO) film, and a Zn—Ti—O series semiconductor (ZTO) film. The metal oxide semiconductor film often contains, as a main component, metallic elements such as zinc (Zn), indium (In), and gallium (Ga).

Use of these materials allows formation of a transistor having higher mobility than an amorphous silicon transistor. Accordingly, use of these materials in formation of the CS driver of the present invention on a glass substrate allows further downsizing the frame of a liquid crystal display device and is useful. In particular, it is desirable for the present invention to use a high-mobility TFT having saturation mobility of 1 cm$^2$/V·s or more.

The CS driver 46 of the Configuration Example 1 and its Modification Examples 1 and 2 may be arranged to be integrally (monolithically) formed with a gate driver on the glass substrate 1. Particularly in the Modification Example 3, it is desirable to form a gate/CS driver made of a high-mobility TFT having saturation mobility of 1 cm$^2$/V·s or more. In that case, the gate driver and the CS driver share signal lines, internal circuits, and internal nodes necessary for driving in common, and terminals for mounting the gate driver on a polyimide film are not required, so that the frame of the liquid crystal display device can be further narrowed.

These merits are also applicable to Configuration Examples and their Modification Examples below.

CONFIGURATION EXAMPLE 2 OF CS DRIVER

Figure 20:
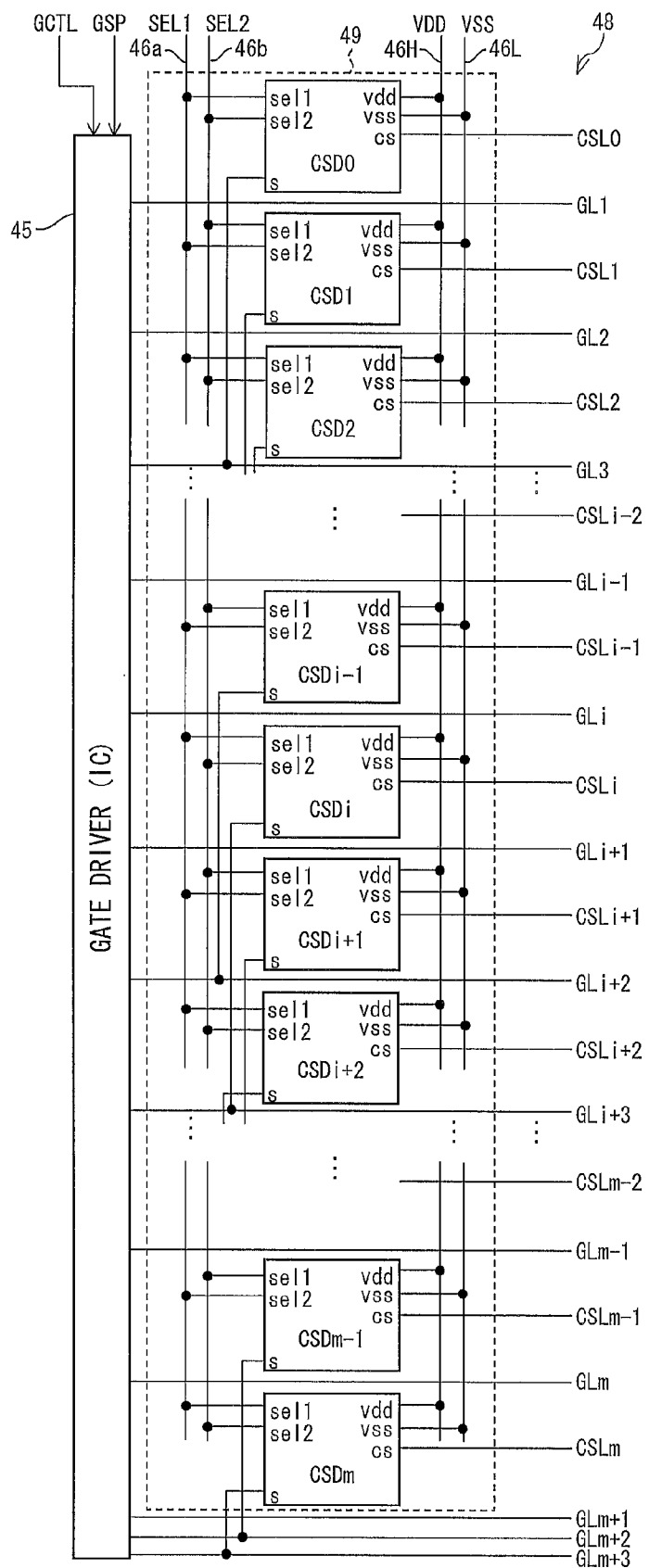
FIG. 20 is a circuit diagram showing Configuration Example 2 of a gate/CS driver of a liquid crystal display device of the present invention.

FIG. 20 is a circuit diagram showing Configuration Example 2 of a gate/CS driver 48 in the liquid crystal display device 110 of the present invention. For convenience of explanation, the same members as those in the Configuration Example 1 are given the same reference signs and explanations thereof are omitted. A gate driver 45 is mounted on a polyimide film by an SOF (System On Film) technique. The polyimide film is connected with a glass substrate 1 (see FIG. 8) via an ACF (anisotropic conductive film), and wiring (not shown) in the polyimide film is connected with a gate terminal (not shown) on the glass substrate 1. The gate driver 45 includes a gate driver IC (not shown), and can consist of a plurality of gate drivers mounted on respective polyimide films as shown in FIG. 8. A CS driver 49 is formed integrally (monolithically) on the glass substrate 1. That is, the CS driver 49 is formed monolithically on an active matrix substrate 111 (see FIG. 8) where amorphous silicon is used for transistors. The gate/CS driver 48 of the Configuration Example 2 is different from the Configuration Example 1 in that it does not include a capacitor main line. In FIG. 20, i is an even number.

Unlike the gate/CS driver 44 of the Configuration Example 1 shown in FIG. 10, the CS driver 49 includes a plurality of retention circuits CSD0-CSDm which correspond to all CS lines CSL0-CSLm, respectively. The following explains a retention circuit of the present invention by using a retention circuit CSDi−1 etc. as a representative example. It should be noted that the explanation is applicable to retention circuits in other stages.

The CS driver 49 includes terminals for receiving external signals SEL1, SEL2, VDD, and VSS, and receives these signals via a selection line 46a, a selection line 46b, a high-potential-side power line 46H, and a low-potential-side power line 46L, respectively, and receives an output from a gate driver 45 (gate signal). An explanation is made using the retention circuit CSDi−1 as an example. The retention circuit CSDi−1 includes terminals sel1, se12, vdd, and vss for receiving external signals SEL1, SEL2, VDD, and VSS, and receives these signals via the selection line 46a, the selection line 46b, the high-potential-side power line 46H, and the low-potential-side power line 46L. Furthermore, the retention circuit CSDi−1 includes an input terminal s, which is connected with a gate line GLi+2 and receives an output from the gate driver 45 (gate signal). An output from the retention circuit CSDi−1 (CS signal) is inputted to a CS line CSLi−1 via an output terminal cs.

A retention circuit at an even stage receives SEL1 and SEL2 in an alternate manner from a retention circuit at an odd stage. For example, in FIG. 20, i is an even number, and the retention circuit CSDi−1 at an odd stage receives a signal SEL2 via a terminal sel1 and receives a signal SEL1 via a terminal se12. A retention circuit CSDi at an even stage receives a signal SEL1 via a terminal sel1 and receives a signal SEL2 via a terminal se12. Other aspects of the circuit configuration such as the size of a transistor constituting the retention circuit and connection are the same as those in the Configuration Example 1.

Figure 21:
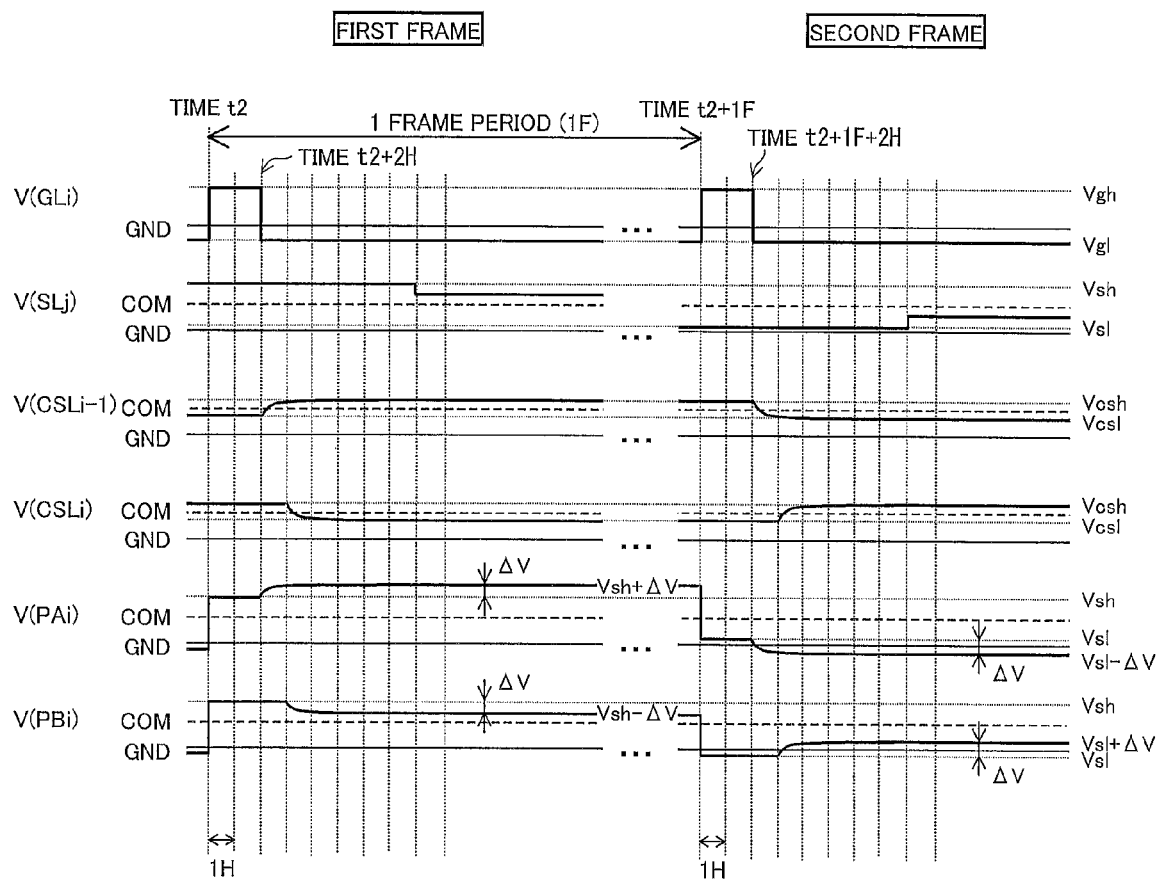
FIG. 21 is a timing chart showing signal waveforms in a pixel Pi in Configuration Example 2 shown in FIG. 20.
Figure 22:
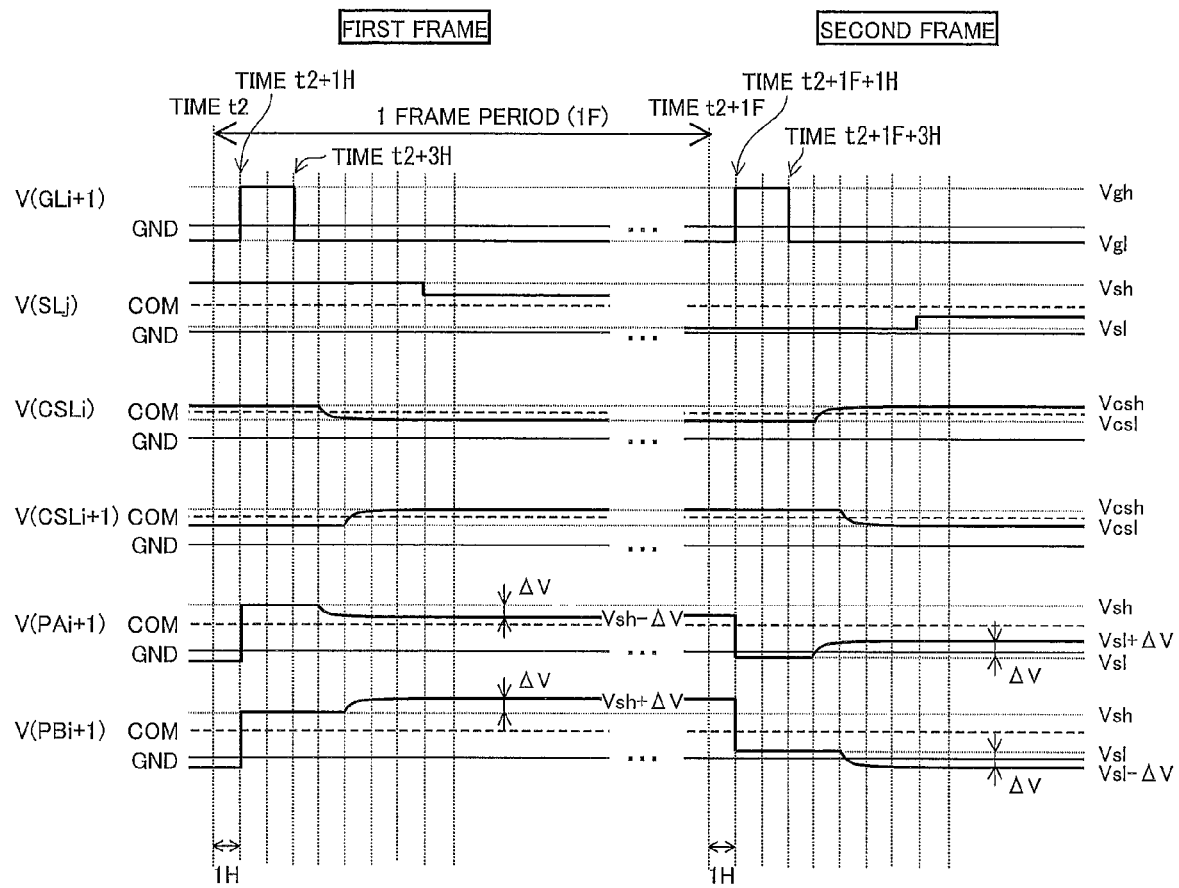
FIG. 22 is a timing chart showing signal waveforms in a pixel Pi+1 in Configuration Example 2 shown in FIG. 20.

FIGS. 21 and 22 are timing charts showing signal waveforms in pixels Pi and Pi+1 in a case where the above CS signal is used.

As shown in FIG. 21, in the pixel Pi in the first frame, the potential of the gate line GLi is high (Vgh) from the time t2 to the time t2+2H, so that the potential of the source line SLj (data signal) is written directly in the sub-pixels PAi and PBi, and after the time t2+2H, the potential of the gate line GLi is low (Vgl), so that the corresponding transistors are put in an off-state, and the sub-pixels are not charged or discharged and are put in a floating state. While the sub-pixel PAi is in a floating state, the potential of the sub-pixel PAi is influenced by a change in potential of the CS line CSLi−1 (low potential→high potential) and rises in a positive direction by ΔV. In contrast, while the sub-pixel PBi is in a floating state, the potential of the sub-pixel PBi is influenced by a change in potential of the CS line CSLi (high potential→low potential) and falls in a negative direction by ΔV.

In the second frame, the relations in potential between the source line SLj and the CS lines CSLi−1 and CSLi are inverted from the first frame, so that the potential of the sub-pixel PAi is influenced by a change in potential of the CS line CSLi−1 (high potential→low potential) after a transistor is made off, and falls in a negative direction by ΔV. On the other hand, the potential of the sub-pixel PBi is influenced by a change in potential of the CS line CSLi (low potential→high potential) after a transistor is made off, and rises in a positive direction by ΔV.

Writing (charging) of data signal potentials in the pixel Pi is made by repeating the operations in the first and second frames.

The above operations enable the sub-pixels PAi and PBi to serve as a bright sub-pixel and a dark sub-pixel, respectively.

As shown in FIG. 22, in the pixel Pi+1 in the first frame, the potential of the gate line GLi is high (Vgh) from the time t2+1H to the time t2+3H, so that the potential of the source line SLj (data signal) is written directly in the sub-pixels PAi+1 and PBi+1, and after the time t2+3H, the potential of the gate line GLi is low (Vgl), so that the corresponding transistors are put in an off-state, and the sub-pixels are not charged or discharged and are put in a floating state. While the sub-pixel PAi+1 is in a floating state, the potential of the sub-pixel PAi+1 is influenced by a change in potential of the CS line CSLi (high potential→low potential) and falls in a negative direction by ΔV. In contrast, while the sub-pixel PBi+1 is in a floating state, the potential of the sub-pixel PBi+1 is influenced by a change in potential of the CS line CSLi+1 (low potential→high potential) and rises in a positive direction by ΔV.

In the second frame, the relations in potential between the source line SLj and the CS lines CSLi and CSLi+1 are inverted from the first frame, so that the potential of the sub-pixel PAi+1 is influenced by a change in potential of the CS line CSLi (low potential→high potential) after a transistor is made off, and rises in a positive direction by ΔV. On the other hand, the potential of the sub-pixel PBi+1 is influenced by a change in potential of the CS line CSLi+1 (high potential→low potential) after a transistor is made off, and falls in a negative direction by ΔV.

Writing (charging) of data signal potentials in the pixel Pi+1 is made by repeating the operations in the first and second frames.

The above operations enable the sub-pixels PAi+1 and PBi+1 to serve as a dark sub-pixel and a bright sub-pixel, respectively.

With the Configuration Example 2, the liquid crystal panel 113a includes a CS driver (retention capacitor line driving circuit) including a plurality of retention circuits (retention capacitor line driving internal circuits) on a glass substrate 1, and outputs from the retention circuits are inputted as CS signals (retention capacitor line signal) to CS lines (retention capacitor line). Furthermore, since the retention circuit can be made of four TFTs as shown in FIG. 11, the circuit configuration can be simplified. Furthermore, since lines for transmitting the signals SEL1, SEL2, VDD, and VSS for driving the retention circuit may be thin, the area occupied by the retention circuits on the substrate can be small. The reason why these lines may be thin is that the circuit configuration enables line capacitances of the selection lines 46a and 46b for transmitting the signals SEL1 and SEL2 to be small and the signals SEL1 and SEL2 change their potentials only during a blanking period and VDD and VSS may be constant.

With the Configuration Example 2, the circuit and the lines for supplying a CS signal to a CS line can be produced while the circuit and the lines occupy only small areas, so that narrowing of the frame of a liquid crystal display device is not disturbed. That is, a liquid crystal display device based on a capacitive-coupling pixel-division system can have a narrower frame.

The CS driver 49 of the Configuration Example 2 and the CS driver 46 of the Configuration Example 1 are formed integrally (monolithically) on the glass substrate 1. In such a case, the retention circuit (e.g. CSDi–1) constituting the CS driver includes a transistor with a large channel width, which is likely to have deficiencies such as a remaining film compared with a transistor in a pixel. This is likely to influence the yield in the production process. In this regard, the CS driver 46 of the Configuration Example 1 has a smaller number of retention circuits than the CS driver 49 of the Configuration Example 2, and therefore can prevent reduction in the yield in the production process due to mounting of the CS driver, and can reduce the area occupied by the CS driver. Therefore, the liquid crystal display device 110 of the present invention is more advantageous for narrowing the frame when including the CS driver 46 of the Configuration Example 1 than when including the CS driver 49 of the Configuration Example 2.

On the other hand, the CS driver 49 of the Configuration Example 2 and the CS driver 46 of the Configuration Example 1 may be arranged so as to be formed integrally with a gate driver on a semiconductor substrate etc. on which the gate driver is to be formed, so that the integrated gate/CS driver is mounted on a polyimide film. With this configuration, the yield of the gate/CS driver is hardly influenced by the number of retention circuits in the CS driver, and the yield of a liquid crystal panel can be increased compared with a case of forming a CS driver on a glass substrate. Therefore, the aforementioned configuration is preferable in consideration of increase in the yield of a liquid crystal panel as well as narrowing the frame of a liquid crystal display device. The aforementioned configuration is particularly preferable for the CS driver 49 of the Configuration Example 2 which has a large number of retention circuits.

Configuration Example 3 of CS Driver

Figure 23:
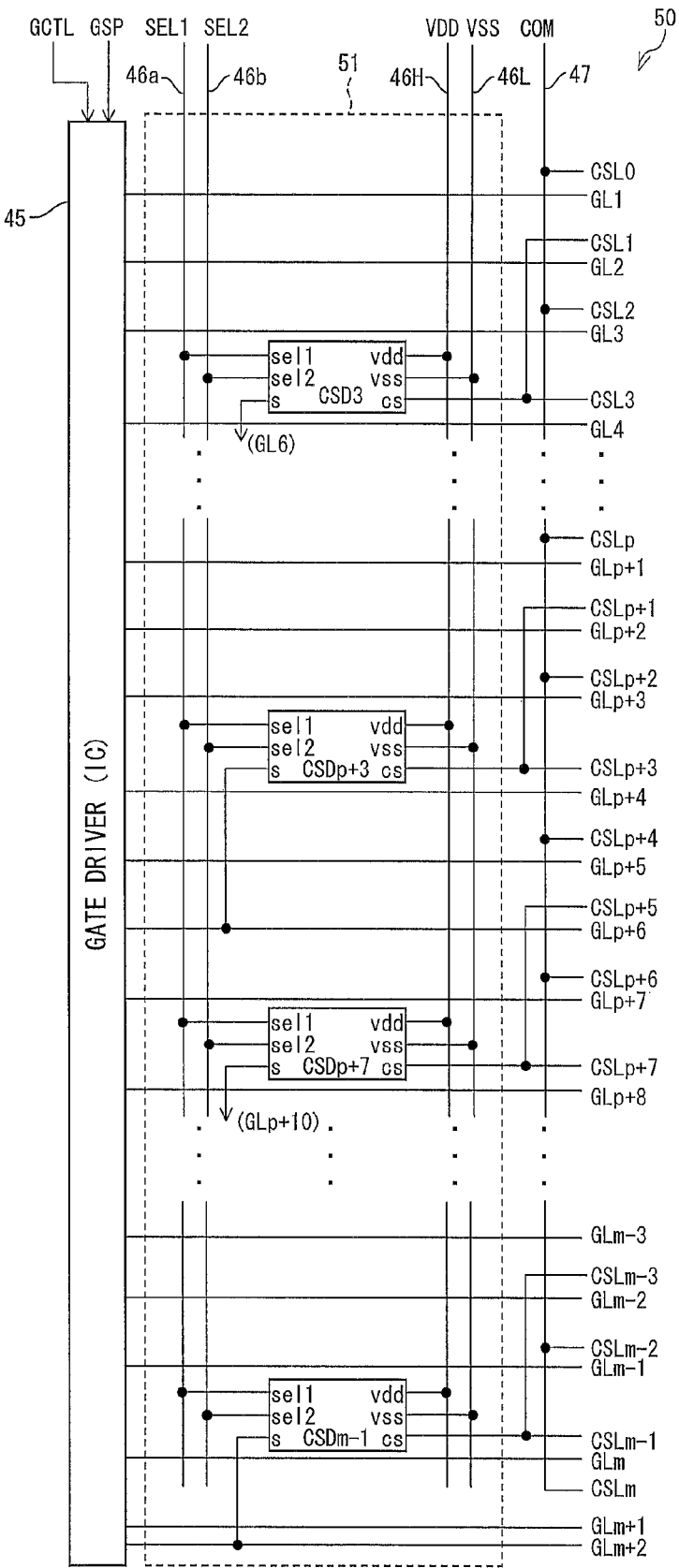
FIG. 23 is a circuit diagram showing Configuration Example 3 of a gate/CS driver of a liquid crystal display device of the present invention.

FIG. 23 is a circuit diagram showing Configuration Example 3 of a gate/CS driver 50 in the liquid crystal display device 110 of the present invention. For convenience of explanation, the same members as those in the Configuration Example 1 are given the same reference signs and explanations thereof are omitted. A gate driver 45 is mounted on a polyimide film by an SOF (System On Film) technique. The polyimide film is connected with a glass substrate 1 (see FIG. 8) via an ACF (anisotropic conductive film), and wiring (not shown) in the polyimide film is connected with a gate terminal (not shown) on the glass substrate 1. The gate driver 45 includes a gate driver IC (not shown), and can consist of a plurality of gate drivers mounted on respective polyimide films as shown in FIG. 8. A CS driver 51 is formed integrally (monolithically) on the glass substrate 1. That is, the CS driver 51 is formed monolithically on an active matrix substrate 111 (see FIG. 8) where amorphous silicon is used for transistors.

The CS driver 51 of the Configuration Example 3 includes a plurality of retention circuits provided with respect to every four CS lines, and one retention circuit is connected with two CS lines. Furthermore, alternating ones of the CS lines are connected with the capacitor main line 47. Specifically, as shown in FIG. 23, a CS line CSLp is connected with the capacitor main line 47, a CS line CSLp+1 is connected with a retention circuit CSDp+3, a CS line CSLp+2 is connected with the capacitor main line 47, a CS line CSLp+3 is connected with a retention circuit CSDp+3, a CS line CSLp+4 is connected with the capacitor main line 47, a CS line CSLp+5 is connected with a retention circuit CSDp+7, and a CS line CSLp+6 is connected with the capacitor main line 47, and a CS line CSLp+7 is connected with a retention circuit CSDp+7.

The following explains the retention circuit of the present invention by using the retention circuit CSDp+3 etc. as a representative example. It should be noted that the explanation is applicable to retention circuits in other stages.

Figure 24:
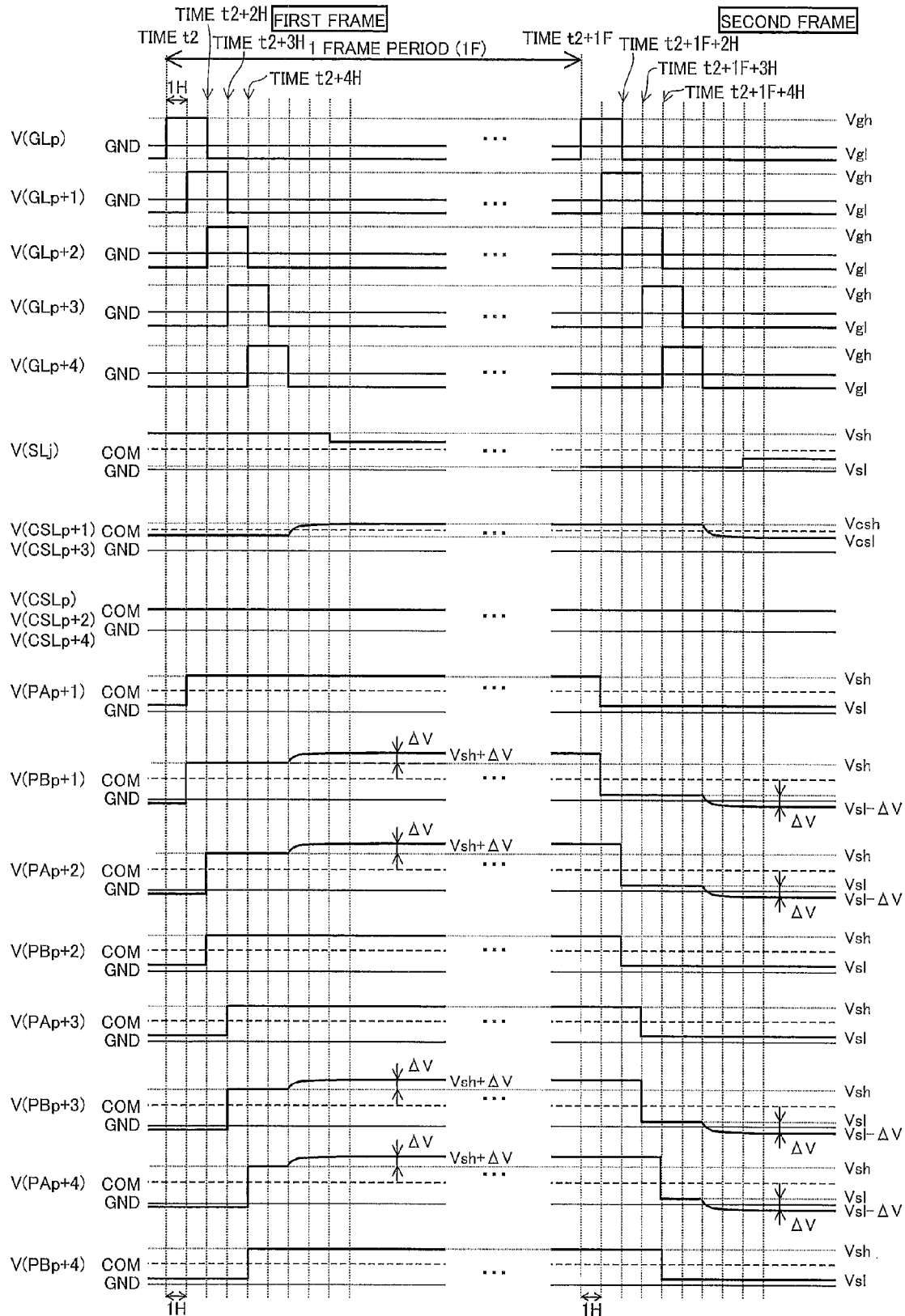
FIG. 24 is a timing chart showing signal waveforms in pixels Pp+1, Pp+2, Pp+3, and Pp+4 in Configuration Example 3 shown in FIG. 23.

FIG. 24 is a timing chart showing signal waveforms in pixels Pp+1, Pp+2, Pp+3, and Pp+4. An explanation is made below as to changes in pixel potentials in a first frame. In FIG. 24, p is a multiple of 4.

In a sub-pixel PAp+1 in the pixel Pp+1, the potential of the CS line CSLp with which the sub-pixel PAp+1 is capacitor-coupled is constant (COM), the potential written during an active period of a gate line GLp+1 is retained. In a sub-pixel PBp+1, when the potential of the gate line GLp+1 rises at a time t2+1H, a data signal at a positive side (having a plus polarity with respect to COM) is supplied, so that the potential of the sub-pixel PAp+1 has a plus polarity. When the potential of the gate line GLp+1 falls at a time t2+3H, the sub-pixel PBp+1 is put in a floating state, and thereafter the potential of a gate line GLp+6 rises and the potential of the CS line CSLp+1 changes to a high potential Vcsh, so that the potential of the sub-pixel PBp+1 rises in a positive direction. Consequently, the sub-pixel PAp+1 serves as a dark sub-pixel and the sub-pixel PBp+1 serves as a bright sub-pixel.

In a sub-pixel PAp+2 in the pixel Pp+2, when the potential of the gate line GLp+2 rises at a time t2+2H, a data signal at a positive side (with a plus polarity) is supplied via a source line SLj, so that the potential of the sub-pixel PAp+2 has a plus polarity. When the potential of the gate line GLp+2 falls at a time t2+4H, the sub-pixel PAp+2 is put in a floating state, and thereafter the potential of the gate line GLp+6 rises at a time t2+6H and the potential of the CS line CSLp+1 changes to a high potential Vcsh, so that the potential of the sub-pixel PAp+2 rises in a positive direction. In a sub-pixel PBp+2, the potential of the CS line CSLp+2 is constant, so that the potential of the sub-pixel PBp+2 written during an active period of the gate line GLp+2 is retained. Consequently, the sub-pixel PAp+2 serves as a bright sub-pixel and the sub-pixel PBp+2 serves as a dark sub-pixel.

In a sub-pixel PAp+3 in the pixel Pp+3, the potential of the CS line CSLp+2 with which the sub-pixel PAp+3 is capacitor-coupled is constant (COM), the potential written during an active period of a gate line GLp+3 is retained. In a sub-pixel PBp+3, when the potential of the gate line GLp+3 rises at a time t2+3H, a data signal at a positive side (with a plus polarity) is supplied, so that the potential of the sub-pixel PBp+3 has a plus polarity. When the potential of the gate line GLp+3 falls at a time t2+5H, the sub-pixel PBp+3 is put in a floating state, and thereafter the potential of a gate line GLp+6 rises and the potential of the CS line CSLp+3 changes to a high potential Vcsh, so that the potential of the sub-pixel PBp+3 rises in a positive direction. Consequently, the sub-pixel PAp+3 serves as a dark sub-pixel and the sub-pixel PBp+3 serves as a bright sub-pixel.

In a sub-pixel PAp+4 in the pixel Pp+4, when the potential of the gate line GLp+4 rises at a time t2+4H, a data signal at a positive side (with a plus polarity) is supplied, so that the potential of the sub-pixel PAp+4 has a plus polarity. When the potential of the gate line GLp+4 falls at a time t2+6H, the sub-pixel PAp+4 is put in a floating state, and thereafter the potential of the gate line GLp+6 rises and the potential of the CS line CSLp+3 with which the sub-pixel PAp+4 is capacitor-coupled changes to a high potential Vcsh, so that the potential of the sub-pixel PAp+4 rises in a positive direction. In a sub-pixel PBp+4, the potential of the CS line CSLp+4 is constant, so that the potential of the sub-pixel PBp+4 written during an active period of the gate line GLp+4 is retained. Consequently, the sub-pixel PAp+4 serves as a bright sub-pixel and the sub-pixel PBp+4 serves as a dark sub-pixel.

Therefore, also with the Configuration Example 3, the circuit and the lines for supplying a CS signal to a CS line can be produced while the circuit and the lines occupy only small areas, so that narrowing of the frame of the liquid crystal panel and the liquid crystal display device including the liquid crystal panel is not disturbed. That is, a liquid crystal display device based on a capacitive-coupling pixel-division system can have a narrower frame.

The CS driver 51 of the Configuration Example 3 is designed to include a plurality of retention circuits provided with respect to every four CS lines, and one retention circuit is connected with two CS lines. However, the present invention is not limited to this, and one retention circuit may be connected with more than two CS lines in the CS driver 51.

The CS driver 51 of the Configuration Example 3 is formed integrally (monolithically) on the glass substrate 1. Alternatively, as Modification Example 1, on a semiconductor substrate etc. where a gate driver is to be formed, the CS driver 51 is formed integrally with the gate driver, and the integrated gate/CS driver may be mounted on a polyimide film.

Figure 25:
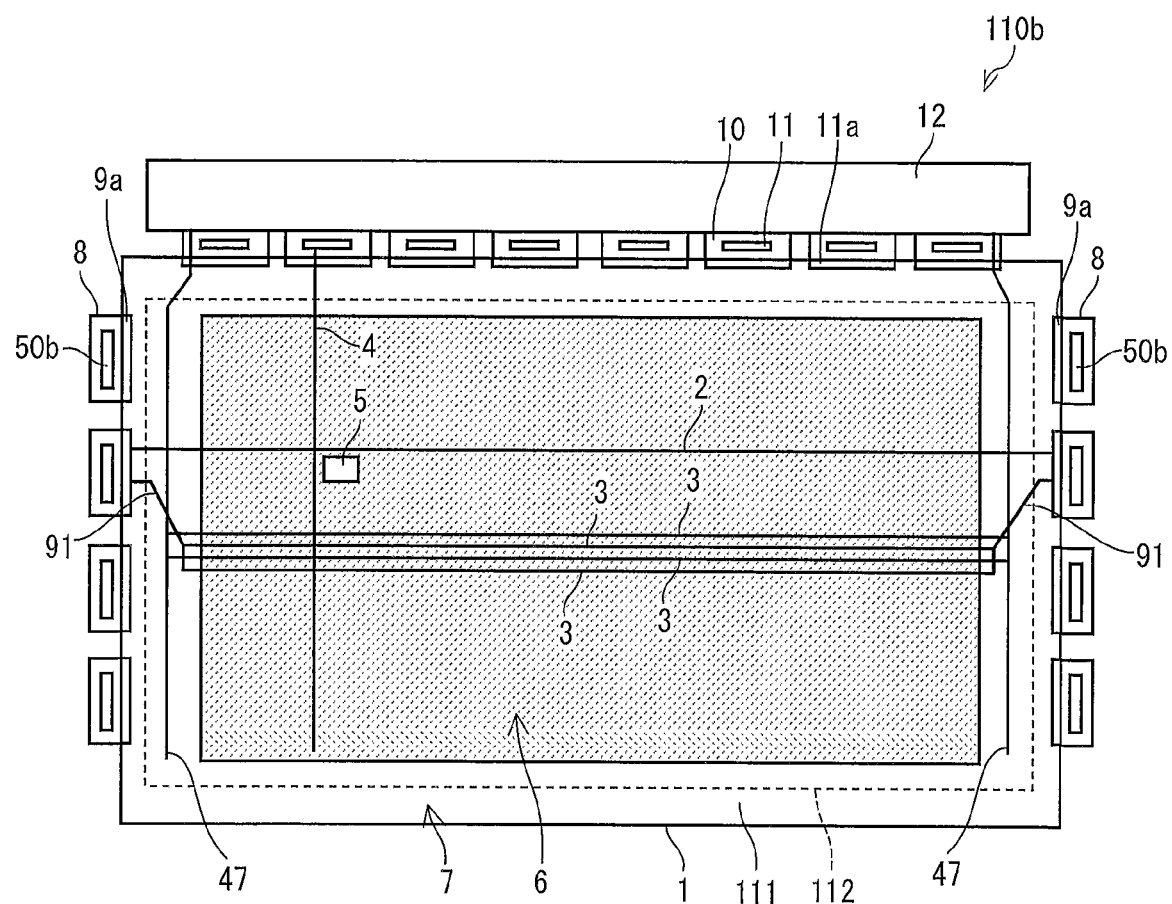
FIG. 25 is a plan view schematically showing a liquid crystal display device in accordance with an embodiment of the present invention.

FIG. 25 shows an embodiment of a liquid crystal display device 110b of the Modification Example 1 of the Configuration Example 3. As shown in the drawing, gate/CS drivers 50b are formed integrally (monolithically) on the same semiconductor substrate and are mounted on polyimide films 8. An output terminal (not shown) of a CS driver 51b in each gate/CS driver 50b is connected with a plurality of retention capacitor lines 3 via a drawing wiring 91 having branches. This branching is made at a peripheral region 7 which is in the vicinity of a display region 6. Since the drawing wiring 91 has branches, the number of the drawing wiring 91 can be reduced, so that the frame of the liquid crystal display device 110b can be narrowed effectively. Since the yield of the gate/CS driver 50b using a semiconductor process is high, it is possible to increase the yield of a liquid crystal display device compared with a case where a CS driver is formed on a glass substrate.

As described above, the Modification Example 1 of the Configuration Example 3 enables a liquid crystal display device based on a capacitive-coupling pixel-division system to achieve both narrowing of the frame and increase in the yield of the liquid crystal display device, and so is particularly advantageous. In the liquid crystal display device 110b of the present invention, the gate/CS driver 50b may be provided at one end portion of the liquid crystal display device 110b (one of right and left ends of the sheet of FIG. 25).

Configuration Example 4 of CS Driver

Figure 26:
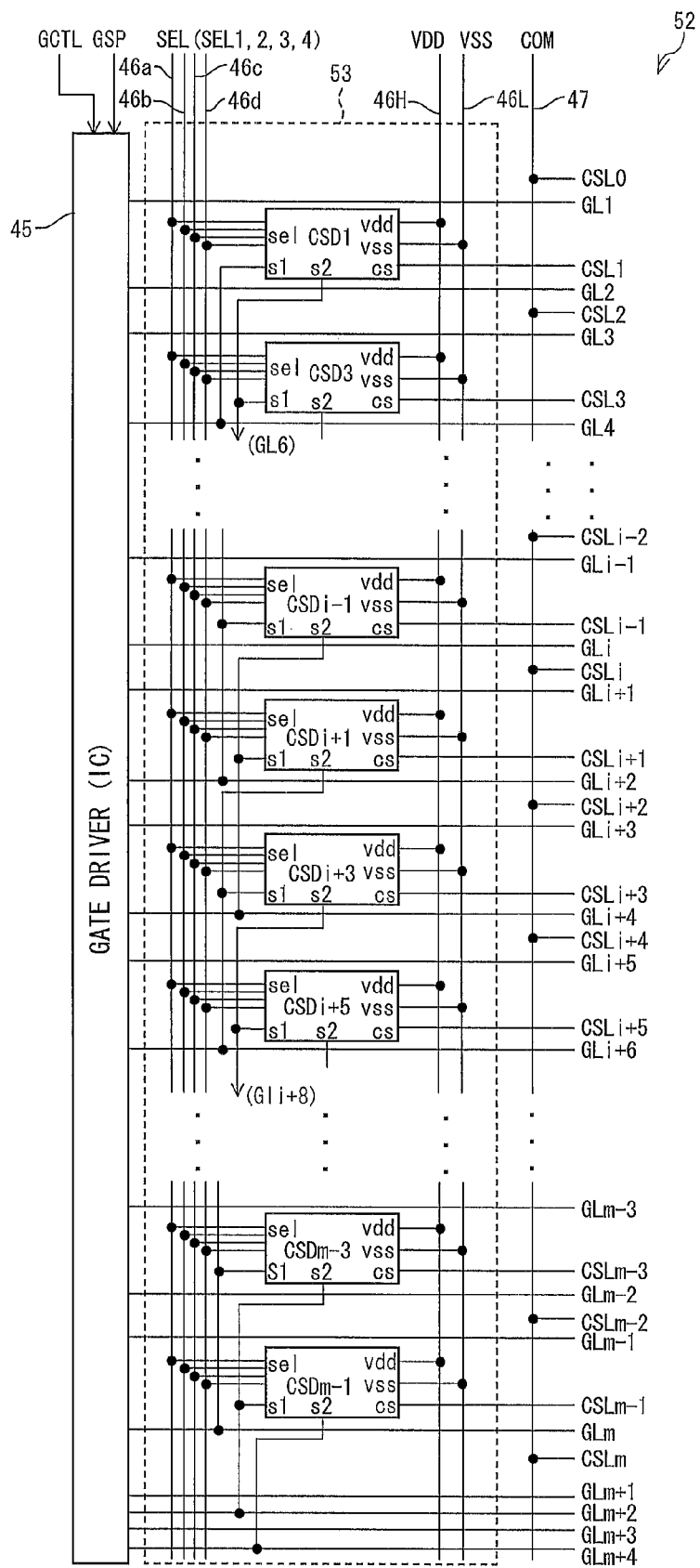
FIG. 26 is a circuit diagram illustrating Configuration Example 4 of a gate/CS driver in a liquid crystal display device of the present invention.

FIG. 26 is a circuit diagram illustrating Configuration Example 4 of a gate/CS driver 52 in a liquid crystal display device 110 of the present invention. For convenience of explanation, the same members as those in Configuration Example 1 are given the same reference signs and explanations thereof are omitted here. A gate driver 45 is mounted on a polyimide film by an SOF (System On Film) technique. The polyimide film is connected to a glass substrate 1 (see FIG. 8) by an ACF (anisotropic conducting film), and wires (not shown) in the polyimide film are connected to gate terminals (not shown) on the glass substrate 1. The gate driver 45 includes a gate driver IC (not shown), and can consist of a plurality of gate drivers mounted on respective polyimide films (see FIG. 8). A CS driver 53 is provided on the glass substrate 1 so as to be integral with the glass substrate 1. That is, the CS driver 53 is formed monolithically on an active matrix substrate 111 whose transistors are made from amorphous silicon (see FIG. 8).

As is the case with the Configuration Example 1, it is assumed in FIG. 26 that i is an even number. Even-numbered CS lines such as CSL0, CSL2, CSLi and CSLm are supplied with a signal COM, which is supplied from a capacitor main line 47 via branched lines. Odd-numbered CS lines such as CSL1, CSL3, CSLi−1 and CSLm+1 are supplied with output signals, which are supplied from internal circuits (retention capacitor line driving internal circuits; hereinafter may be referred to as "retention circuits") constituting the CS driver 53. The internal circuits are indicated as CSD1, CSD3, CSDi−1 and CSDm-1 etc. That is, a retention circuit is provided with respect to every two of all the CS lines (each odd-numbered CS line). Note however that, alternatively, a retention circuit can be provided with respect to every two of all the CS lines (each even-numbered CS line). In the following description, a retention circuit CSDi−1 etc. is taken as an example as a typical retention circuit of the present invention. Note, however, that the following descriptions apply also to the retention circuits at the other stages.

The CS driver 53 includes a plurality of retention circuits, and includes terminals for receiving external signals SEL1, SEL2, SEL3, SEL4, VDD, and VSS. The CS driver 53 receives these signals via a selection line 46a, a selection line 46b, a selection line 46c, a selection line 46d, a high-potential-side power line 46H and a low-potential-side power line 46L, and receives outputs from the gate driver 45 (gate signals). For example, the retention circuit CSDi−1 includes terminals sel 1 to se14, vdd and vss for receiving external signals SEL1 to SEL4 (in FIG. 26, collectively referred to as SEL), VDD, and VSS, and receives these signals via the selection line 46a, the selection line 46b, the selection line 46c, the selection line 46d, the high-potential-side power line 46H and the low-potential-side power line 46L. The retention circuit CSDi−1 further includes input terminals 1 and s2. The input terminal s1 is connected to the gate line GLi+2 and receives an output (gate signal) from the gate driver 45. The input terminal s2 is connected to the gate line GLi+4, and receives an output (gate signal) from the gate driver 45. An output (CS signal) from the retention circuit CSDi−1 is supplied to the CS line CSLi−1 via an output terminal cs.

Figure 27:
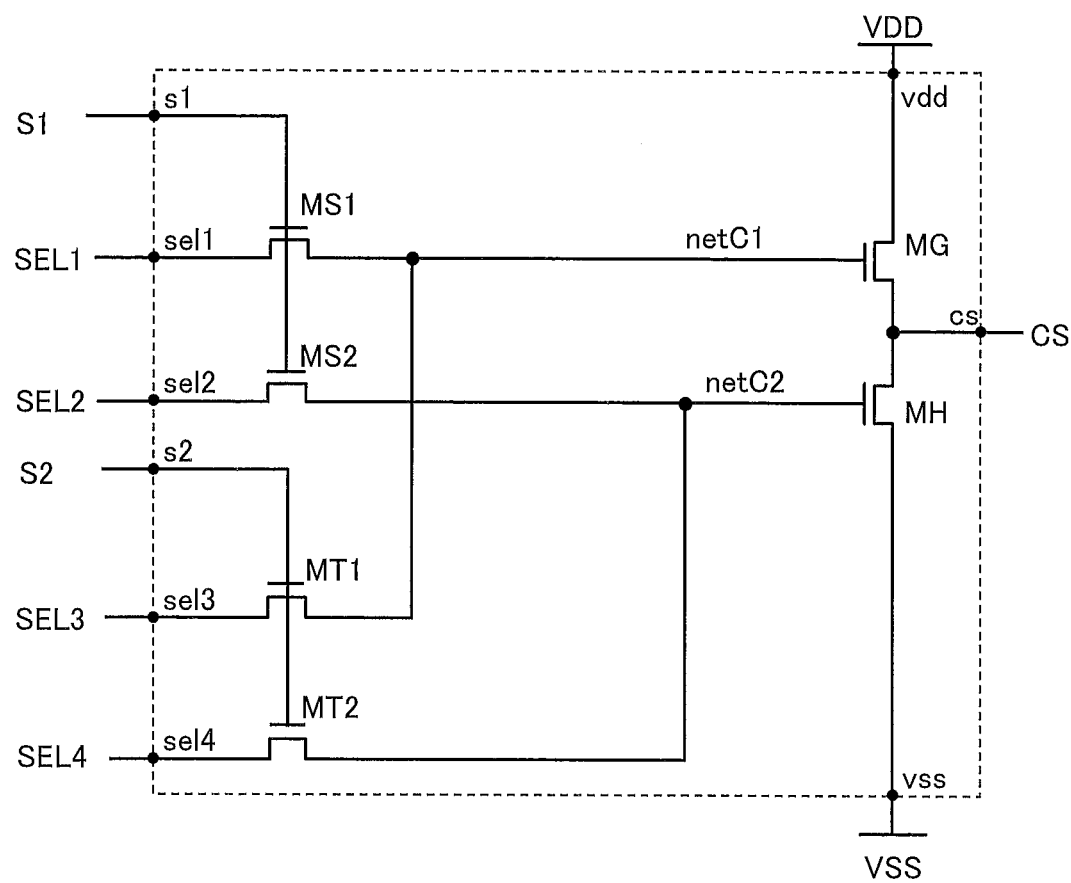
FIG. 27 is a circuit diagram illustrating a specific example of a retention circuit which constitutes a CS driver of Configuration Example 4 shown in FIG. 26.

FIG. 27 is a circuit diagram illustrating a specific example of the retention circuits which constitute the CS driver 53 of Configuration Example 4. The retention circuit CSDi−1, which is an example of the retention circuits, is constituted by six transistors MS1, MS2, MT1, MT2, MG, and MH. Note here that the transistors are amorphous silicon TFTs provided on a glass substrate.

The retention circuit CSDi−1 receives external signals 51, S2, SEL1 (retention target signal), SEL2 (retention target signal), SEL3 (second retention target signal), SEL4 (second retention target signal), VDD, and VSS via a terminal s1 (first input section), s2, sel1 (second input section), sel2 (third input section), sel3 (fourth input section), sel4 (fifth input section), vdd, and vss, and outputs a CS signal via a terminal cs.

The transistor MS1 has a gate electrode connected to the terminal s1 of the retention circuit CSDi−1, a source electrode connected to the terminal sel1 of the retention circuit CSDi−1, and a drain electrode connected to a node netC1. The transistor MG has a gate electrode connected to the node netC1, a source electrode connected to the terminal vdd, and a drain electrode connected to the output terminal cs.

The transistor MS2 has a gate electrode connected to the terminal s1 of the retention circuit CSDi−1, a source electrode connected to the terminal sel2 of the retention circuit CSDi−1, and a drain electrode connected to a node netC2. The transistor MH has a gate electrode connected to the node netC2, a source electrode connected to the output terminal cs, and a drain electrode connected to the terminal vss.

The transistor MT1 has a gate electrode connected to the terminal s2 of the retention circuit CSDi−1, a source electrode connected to the terminal sel3 of the retention circuit CSDi−1, and a drain electrode connected to the node netC1. The transistor MT2 has a gate electrode connected to the terminal s2 of the retention circuit CSDi−1, a source electrode connected to the terminal sel4 of the retention circuit CSDi−1, and a drain electrode connected to the node netC2.

Figure 28:
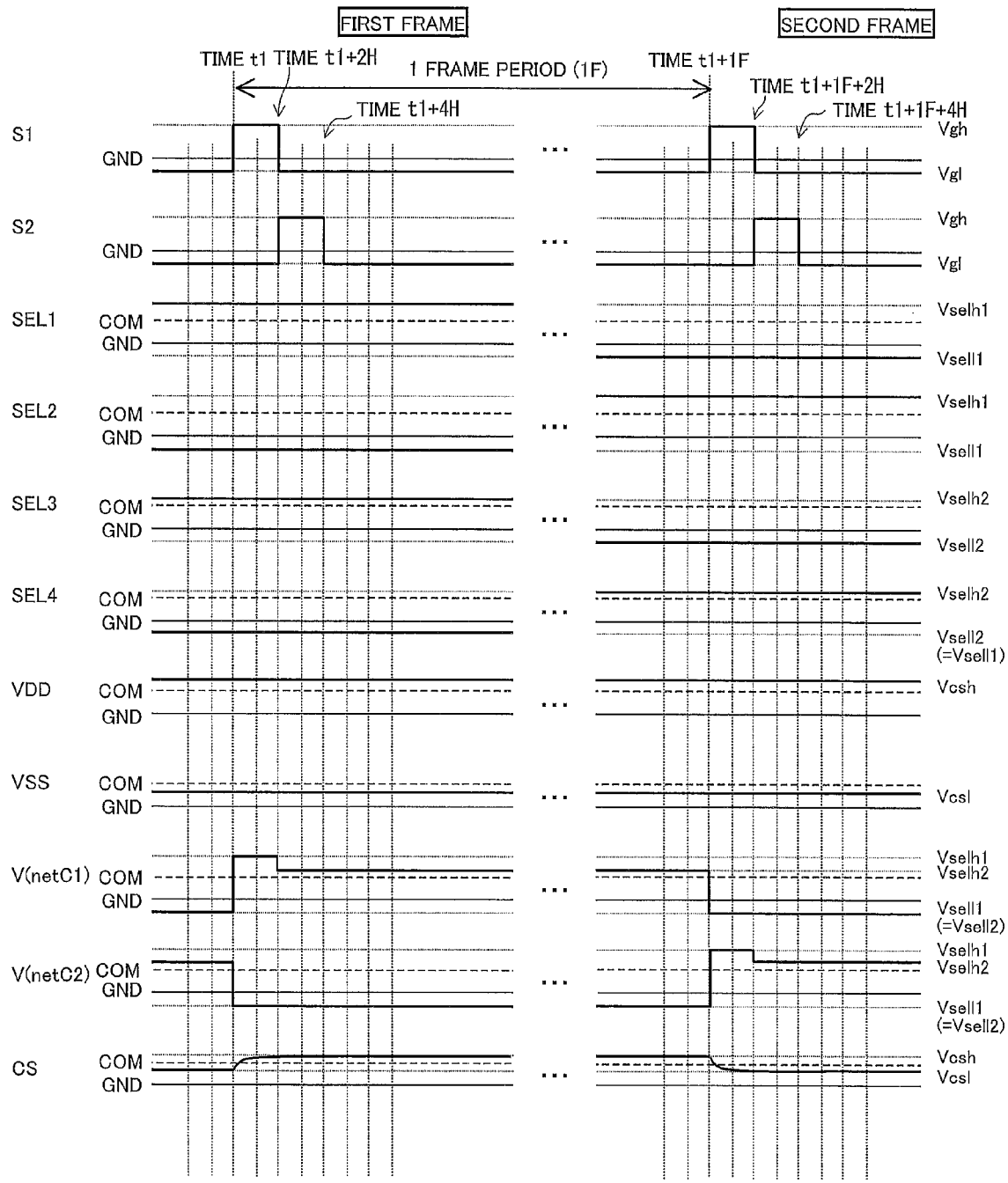
FIG. 28 is a timing chart showing various signals inputted to and outputted from a retention circuit CSDi-1 shown in FIG. 26.

FIG. 28 is a timing chart showing various signals inputted to and outputted from the retention circuit CSDi−1. The following description mainly discusses the differences between FIG. 28 and FIG. 12 that was explained in Configuration Example 1.

In FIG. 28, S2 is a signal that lags S1 by 2H. Further, input signals SEL3 and SEL4, which are employed in Configuration Example 4, are in phase with the signals SEL1 and SEL2, respectively, and have high and low potentials alternately for each frame. The SEL3 and SEL4 are set so that Vselh1>Vselh2 and Vsell1=Vsell2 are satisfied, wherein Vselh1 is the high potential of SEL1 and SEL2 and Vsell1 is the low potential of SEL1 and SEL2 whereas Vselh2 is the high potential of SEL3 and SEL4 and Vsell2 is the low potential of SEL3 and SEL4. That is, SEL3 and SEL4 are different from SEL1 and SEL2 only in their higher potentials. It is desirable, although not shown, that the potentials of SEL3 and SEL4 be changed during a blanking period during which no potential is written to pixel electrodes.

Schematically, in the retention circuit of Configuration Example 4, S2 goes into a high-potential state 2H after 51 has gone into a high-potential state. This causes the transistors MT1 and MT2 to be turned on, thereby reducing the potentials of the nodes netC1 and netC2 to potentials of SEL3 and SEL4, respectively.

Specifically, consider consecutive first and second frames. In the first frame, at time t1, the potential of S1 changes from Vgl to Vgh. In response to this, the transistors MS1 and MS2 are turned on, so that the potentials of the nodes netC1 and netC2 change to Vselh1 (high potential) and Vsell1 (low potential), respectively. After the high and low potentials have been reached, the potentials are retained. Next, at time t1+2H, the potential of S1 changes to Vgl and the potential of S2 changes to Vgh. In response to this, the transistors MS1 and MS2 are turned off, and the transistors MT1 and MT2 are turned on, so that the signals SEL3 and SEL4 are supplied to the nodes netC1 and netC2. This reduces the potential of the node netC1 from Vselh1 to Vselh2, and the Vselh2 is retained.

In the second frame, at time t1+1F, the potential of S1 changes from Vgl to Vgh. In response to this, the transistors MS1 and MS2 are turned on, so that the potentials of the nodes netC1 and netC2 change to Vsell1 (low potential) and Vselh1 (high potential), respectively. After the high and low potentials have been reached, the potentials are retained. Next, at time t1+1F+2H, the potential of S1 changes to Vgl and the potential of S2 changes to Vgh. In response to this, the transistors MS1 and MS2 are turned off, and the transistors MT1 and MT2 are turned on, so that the signals SEL3 and SEL4 are supplied to the nodes netC1 and netC2. This reduces the potential of the node netC2 from Vselh1 to Vselh2, and the potential Vselh2 is retained.

The potentials of the nodes netC1 and netC2 are changed as above for operation reliability (threshold stability) of transistors in a CS driver.

Figure 30:
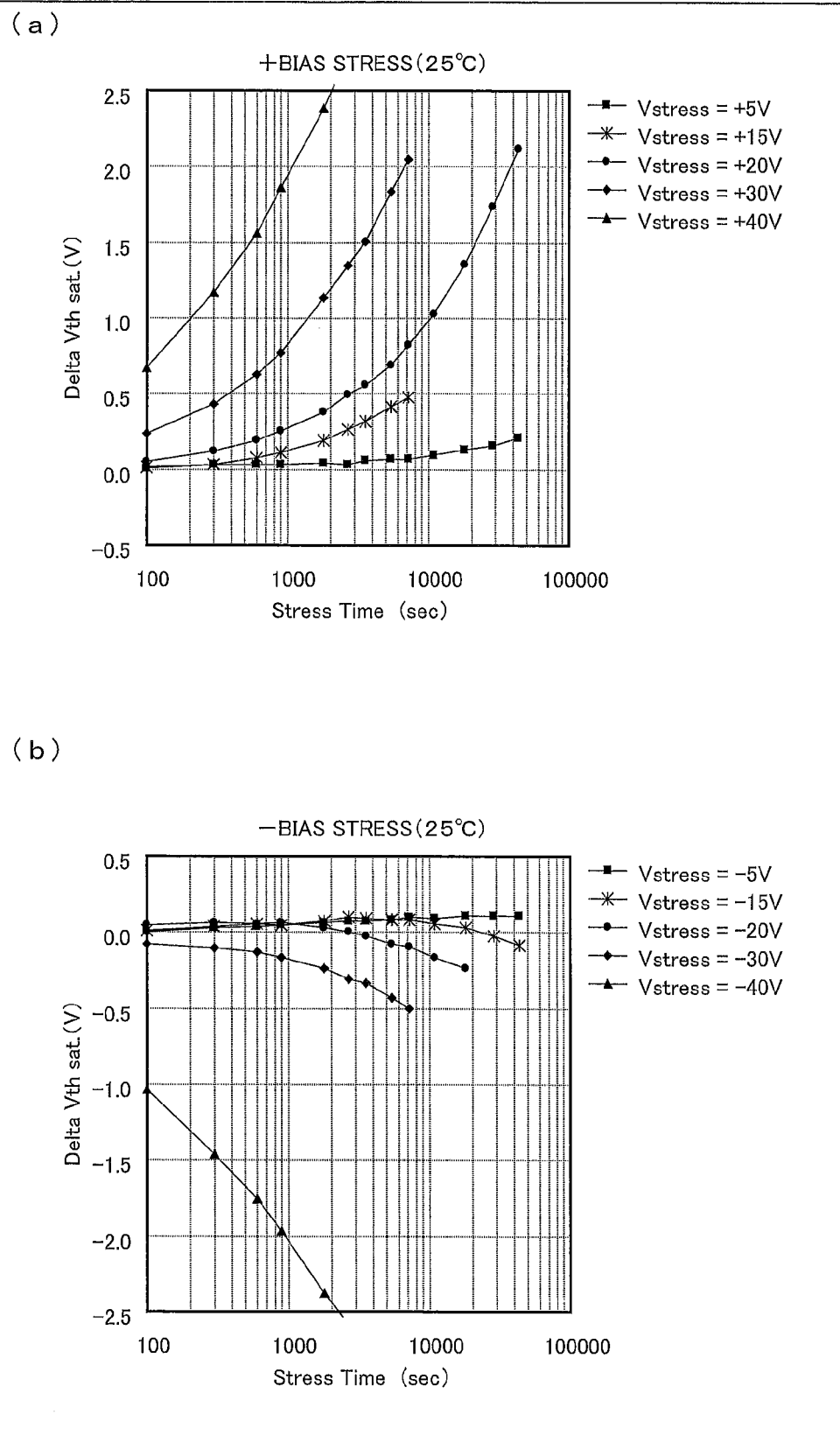
FIG. 30 (a) and (b) of FIG. 30 are graphs showing operation reliability of an amorphous silicon TFT (a-Si TFT) used in the present embodiment.

FIG. 30 is a graph showing operation reliability of an amorphous silicon TFT (a-SiTFT) used in the present embodiment. Generally, the test method used here is sometimes called a bias thermal stress test (BTS test) of a transistor. The test was conducted by, at a predetermined ambient temperature, alternately carrying out a long-time stress application and a short-time characteristics measurement. The stress application was carried out by applying, under the condition where a stress voltage applied to a gate electrode G of a transistor was DC (direct current) and the drain electrode D was 0 V (GND), a voltage of 0.1 V to a source electrode S and a voltage of Vstress to the gate electrode (see (a) of FIG. 29). The characteristics measurement was carried out by, under the condition where the drain electrode D was 0 V (GND), applying a voltage of 10 V to the source electrode S and sweeping the voltage Vg of the gate electrode G from −20 V to 30 V (see (b) of FIG. 29). Both the stress application and characteristics measurement were carried out at an ambient temperature of 25° C. in a dark room.

FIG. 30 shows the results obtained by testing shifting of the threshold of a transistor, which shifting is particularly noticeable in the case of an amorphous silicon TFT. (a) of FIG. 30 shows the results obtained in a case of positive bias stress (positive bias is applied to the gate electrode). (b) of FIG. 30 shows the results obtained in the case of negative bias stress (negative bias is applied to the gate electrode). In both (a) and (b) of FIG. 30, the horizontal axis indicates stress time (second(s): sec), and the vertical axis indicates the shift amount (V) (amount of change) by which a threshold differs before and after stress is applied. The threshold shifts by a considerable amount especially when positive bias stress is applied. Although the shift amount is relatively small when Vstress is +5 V, the shift amount increases as Vstress increases. The larger the amount by which the threshold shifts, the lower the operation reliability. Therefore, the above results show that suppressing the average voltage applied to the gate electrode of the transistor improves the operation reliability of the transistor. On the other hand, in the case of negative bias stress, the threshold shifts in a direction opposite to that in the case of the positive bias stress, and the shift amounts are much smaller than those in the case of the positive bias stress. This shows that the operation reliability of an amorphous silicon TFT (a-SiTFT) more readily decreases by application of a positive bias than by application of a negative bias.

In Configuration Examples 1 to 3, the gate electrodes of the transistors MG and MH in a retention circuit of the CS driver are connected to the nodes netC1 and netC2, respectively, and a certain high-potential state (positive bias state) and a certain low-potential state (negative bias state) are repeated alternately for every 1F (frame period). Since the CS drivers of Configuration Examples 1 to 3 and the CS driver of Configuration Example 4 each employ amorphous silicon TFTs as transistors, it is necessary to take into consideration the operation reliability particularly in view of the potentials of the nodes netC1 and netC2.

The results shown in FIG. 30 show the following. Under the positive bias state, the smaller the potentials of the gate electrodes of the transistors MG and MH, i.e., the smaller the potentials of the nodes netC1 and netC2, the better the operation reliability of the CS driver. Note however that, in such a case, more time is required for the output signal CS to reach a predetermined voltage (Vcsh or Vcsl). This may affect display quality. That is, the operation reliability of the CS driver and display quality are in a trade-off relationship.

In the CS driver 53 of Configuration Example 4, the nodes netC1 and netC2 in their respective positive bias states each have a two-level potential. That is, the potential of each of the nodes netC1 and netC2 is reduced in the middle of the positive bias state. By reducing the potential in the middle of the positive bias state when the output (CS signal) from the retention circuit has reached a predetermined voltage to a certain extent, it is possible to reduce the average potentials of the nodes netC1 and netC2 in their respective positive bias states and to increase the operation reliability of the CS driver. This was analyzed by a circuit simulation (SPICE simulation) using a computer.

Figure 31:
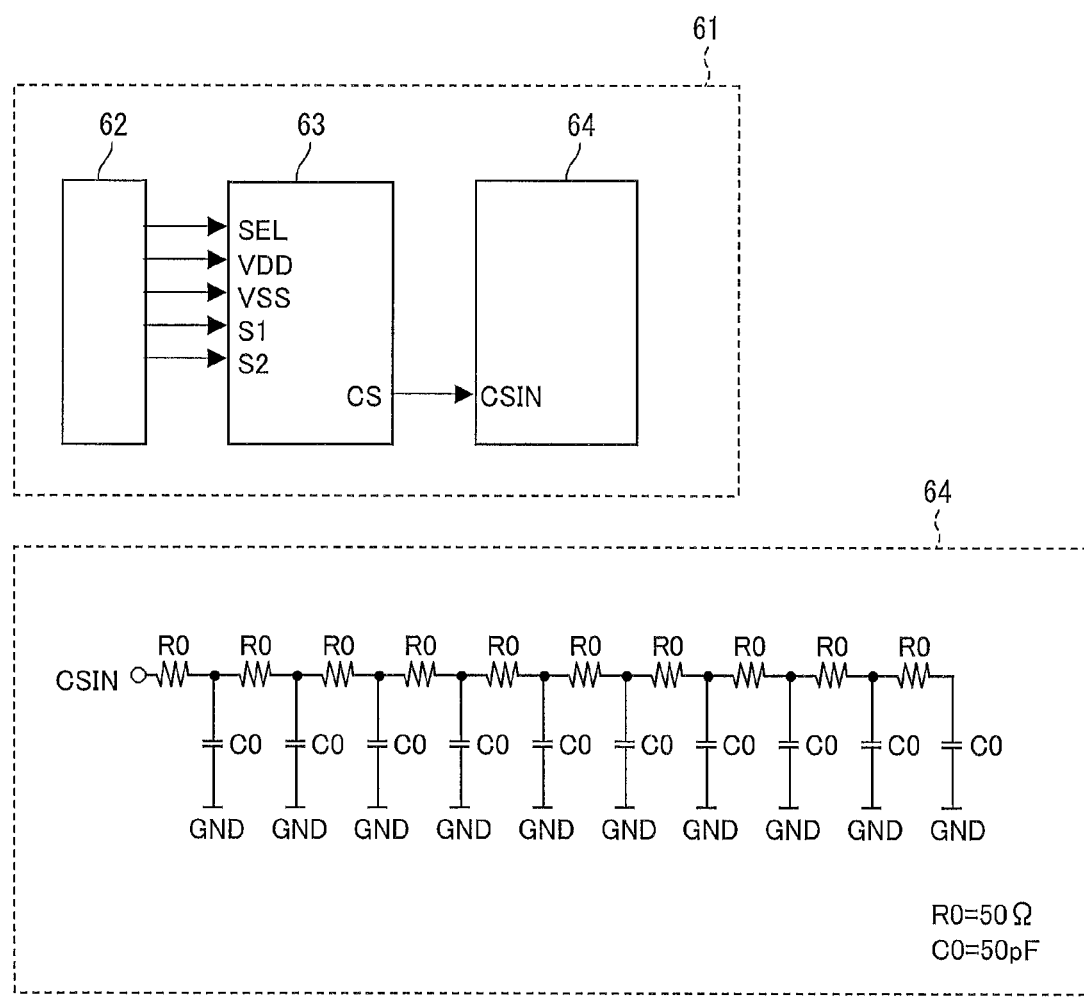
FIG. 31 is a view for schematically explaining a simulation circuit for verifying operation reliability of a CS driver in a liquid crystal display device of the present invention.

FIG. 31 is a view schematically showing a simulation circuit. A simulation circuit 61 includes a circuit section 62 which generates voltages and signals, a retention circuit section 63, and a load section 64. The load section 64 includes ten sequential stages of 50-Ω resistances R0 and 50-pF capacitors C0 as shown in FIG. 31. These values are intended for CS lines included in a large liquid crystal display device. Note that this simulation uses only a single retention circuit section, and directly corresponds to the case where a retention circuit section is provided on one side of an actual liquid crystal display device. Note however that, since the simulation relatively evaluates operation reliability of various retention circuits under the same setting conditions, the simulation is applicable also to the case where retention circuit sections are provided on both sides of the liquid crystal display device.

It is assumed that waveforms of S1 and S2, which are input waveforms, take time to change, and that the input waveforms linearly change from 0% to 100% or from 100% to 0% in 1 μs as shown in FIG. 32. Other main conditions for the simulation are stated below. The same values are used also for the simulation of Configuration Example 1 serving as a reference (REF). TFT characteristics used here are obtained by SPICE modeling of the characteristics of an amorphous silicon TFT produced by the method shown in Configuration Example 1 of the present invention. Note that the saturation mobility of the amorphous silicon TFT used here is approximately 0.4 $cm^2/Vs$.

<Conditions for Simulation of Configuration Example 4>
  1H (horizontal scanning period): 7.4 μs
  1F (frame): 8.3 ms
  Channel length L of each of the transistors MG, MH, MS1, MS2, MT1 and MT2: 4 μm
  Channel width of each of the transistors MG and MH: 7000 μm
  Channel width of each of the transistors MS1 and MS2: 50 μm
  Channel width of each of the transistors MT1 and MT2: 50 μm
  Vselh1: 35 V
  Vsell1: −6 V
  Vselh2: Varied (this affects the average potentials of the nodes netC1 and netC2)
  Vsell2: −6 V
  Vgh: 35 V
  Vgl: −6 V
  Vcsh: 9.7 V
  Vcsl: 5.7 V
  COM (potential of counter electrode): 7.7 V <Conditions for Simulation of REF (Configuration Example 1)>
  Vselh: Varied (this affects the average potentials of the nodes netC1 and netC2)
  Vsell: −6 V
  Vselh1, Vsell1, Vselh2 and Vsell2 are not used
  The other conditions are the same as those for Configuration Example 4

Simulation of Configuration Example 4 was carried out with varying Vselh2, and simulation of REF (Configuration Example 1) was carried out with varying Vselh. The results thereof are shown in Table 1.

TABLE 1

| REF (Configuration Example 1) <netC1> | | |
|---|---|---|
| Vselh (V) | Time Required for Reaching 99% (μs) | Average Potential of netC1 (V) |
| 35 | 107.5 | 24.7 |
| 30 | 110.4 | 24.1 |
| 27.5 | 114.6 | 23.4 |
| 25 | 121.5 | 22.3 |
| 22.5 | 135.1 | 20.9 |
| 20 | 155.7 | 19.2 |
| 19.5 | 161.8 | 18.9 |
| 19 | 167.9 | 18.5 |
| 18.5 | 174.8 | 18.2 |
| 18 | 183.0 | 17.8 |
| 17.5 | 191.7 | 17.5 |
| 17 | 201.7 | 17.1 |
| 16.5 | 213.3 | 16.7 |
| 16 | 226.7 | 16.4 |
| 15.5 | 241.7 | 16.0 |
| 15 | 259.8 | 15.6 |
| 14.5 | 281.0 | 15.3 |
| 14 | 307.0 | 14.9 |
| 13.5 | 338.9 | 14.5 |
| 13 | 379.6 | 14.1 |
| 12.5 | 431.9 | 13.7 |
| 12 | 504.4 | 13.3 |

TABLE 1-continued

<netC2>

| Vselh (V) | Time Required for Reaching 99% (μs) | Average Potential of netC2 (V) |
|---|---|---|
| 35 | 101.6 | 22.1 |
| 30 | 105.5 | 21.3 |
| 27.5 | 108.5 | 20.7 |
| 25 | 114.6 | 19.5 |
| 22.5 | 125.7 | 18.0 |
| 20 | 143.9 | 16.2 |
| 19.5 | 148.9 | 15.8 |
| 19 | 154.7 | 15.4 |
| 18.5 | 160.5 | 15.0 |
| 18 | 167.9 | 14.6 |
| 17.5 | 175.6 | 14.2 |
| 17 | 184.5 | 13.8 |
| 16.5 | 194.7 | 13.4 |
| 16 | 206.7 | 13.0 |
| 15.5 | 220.7 | 12.6 |
| 15 | 237.3 | 12.2 |
| 14.5 | 257.0 | 11.8 |
| 14 | 280.8 | 11.3 |
| 13.5 | 310.2 | 10.9 |
| 13 | 347.9 | 10.5 |
| 12.5 | 396.2 | 10.1 |
| 12 | 462.5 | 9.6 |
| 11.5 | 557.8 | 9.2 |

Configuration Example 4
<netC1>

| Vselh1 (V) | Vselh2 (V) | Time Required for Reaching 99% (μs) | Average Potential of netC1 (V) |
|---|---|---|---|
| 35 | 35 | 99.6 | 26.8 |
| 35 | 30 | 100.8 | 26.4 |
| 35 | 27.5 | 102.8 | 25.5 |
| 35 | 25 | 107.1 | 24.5 |
| 35 | 22.5 | 112.3 | 23.1 |
| 35 | 20 | 123.2 | 21.1 |
| 35 | 19.5 | 127.2 | 20.7 |
| 35 | 19 | 130.8 | 20.2 |
| 35 | 18.5 | 134.9 | 19.8 |
| 35 | 18 | 140.1 | 19.3 |
| 35 | 17.5 | 145.6 | 18.8 |
| 35 | 17 | 152.1 | 18.3 |
| 35 | 16.5 | 160.1 | 17.8 |
| 35 | 16 | 169.3 | 17.3 |
| 35 | 15.5 | 180.3 | 16.8 |
| 35 | 15 | 193.3 | 16.3 |
| 35 | 14.5 | 209.9 | 15.8 |
| 35 | 14 | 230.5 | 15.3 |
| 35 | 13.5 | 257.2 | 14.7 |
| 35 | 13 | 292.3 | 14.2 |
| 35 | 12.5 | 341.7 | 13.6 |
| 35 | 12 | 416.0 | 13.1 |
| 35 | 11.5 | 541.0 | 12.5 |

<netC2>

| Vselh1 (V) | Vselh2 (V) | Time Required for Reaching 99% (μs) | Average Potential of netC2 (V) |
|---|---|---|---|
| 35 | 35 | 93.0 | 25.4 |
| 35 | 30 | 94.0 | 24.9 |
| 35 | 27.5 | 95.6 | 24.1 |
| 35 | 25 | 98.7 | 22.9 |
| 35 | 22.5 | 102.0 | 21.6 |
| 35 | 20 | 108.5 | 19.9 |
| 35 | 19.5 | 110.0 | 19.5 |
| 35 | 19 | 111.5 | 19.1 |
| 35 | 18.5 | 113.0 | 18.6 |
| 35 | 18 | 115.9 | 18.2 |
| 35 | 17.5 | 118.8 | 17.7 |
| 35 | 17 | 121.5 | 17.3 |
| 35 | 16.5 | 124.8 | 16.8 |
| 35 | 16 | 129.1 | 16.3 |
| 35 | 15.5 | 133.0 | 15.8 |
| 35 | 15 | 138.7 | 15.3 |
| 35 | 14.5 | 144.3 | 14.8 |
| 35 | 14 | 151.5 | 14.3 |
| 35 | 13.5 | 159.8 | 13.8 |
| 35 | 13 | 169.4 | 13.2 |
| 35 | 12.5 | 181.3 | 12.7 |
| 35 | 12 | 195.7 | 12.2 |
| 35 | 11.5 | 213.5 | 11.6 |
| 35 | 11 | 236.3 | 11.1 |
| 35 | 10.5 | 266.2 | 10.5 |
| 35 | 10 | 306.3 | 10.0 |
| 35 | 9.5 | 357.1 | 9.5 |
| 35 | 9 | 427.5 | 8.9 |
| 35 | 8.5 | 558.5 | 8.4 |

Figure 33:
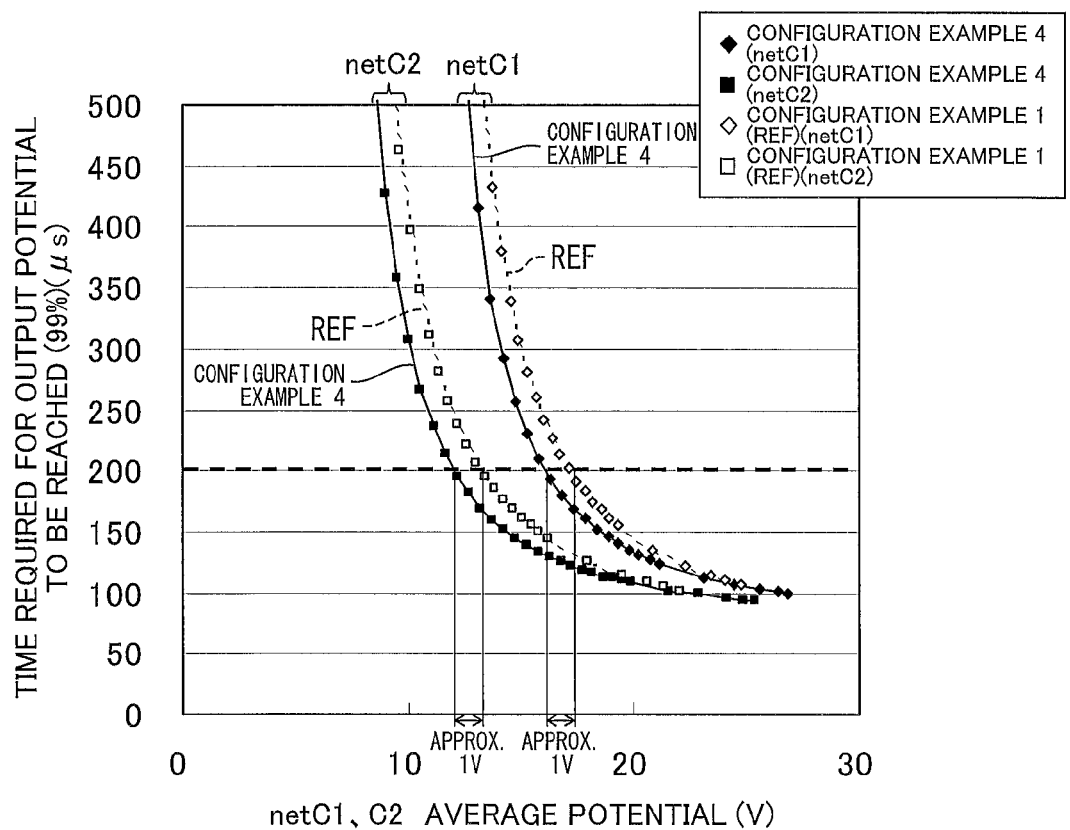
FIG. 33 shows relationships between average potentials of nodes netC1 and netC2 in the retention circuit shown in FIG. 27 and a time required for an output potential to be reached.

FIG. 33 shows a relationship between the average potentials of the nodes netC1 and netC2 and the time required for the output potential to be reached, which relationship is based on the results shown in Table 1. The changes in potentials of the nodes netC1 and netC2 are out of phase by 180 degrees from each other, and alternately switch between the positive bias state and the negative bias state for every 1F (frame period).

FIG. 33 shows a relationship between the average potentials of the nodes netC1 and netC2 and the time required for the output potential to be reached, which average potentials are obtained when the nodes netC1 and netC2 are in their positive bias states. Note here that an average potential is found by averaging the potential of the node netC1 or netC2 over a time during which a positive bias is applied to the node netC1 or the netC2 (approximately 1 frame period). The time required for the output potential to be reached is defined as a time required for an output signal CS to change from COM (potential of counter electrode) to 99% of the output potential. That is, the time required for the output potential to be reached is defined as a time required for the following to be reached:

$$(Vcsh-Vcom) \times 0.99 + Vcom \text{ (netC1)}$$

or $$(Vcsl-Vcom) \times 0.99 + Vcom \text{ (netC2)}.$$

Since the output signal CS increases in potential when the node netC1 is in the positive bias state and decreases in potential when the node netC2 is in the positive bias state, the set potentials are different between the nodes netC1 and netC2. Vcom is COM (potential of counter electrode). Further, the CS signal is monitored at the time when it has just been outputted from the retention circuit section 63 shown in FIG. 31.

FIG. 33 shows relationships between the average potentials of the nodes netC1 and netC2 and the time required for the output potential to be reached in each of Configuration Examples 4 and 1. In either case of the node netC1 and the node netC2, the relationship is plotted to the left more in the case of Configuration Example 4 than in the case of Configuration Example 1. This means that the average voltage of the node netC1 or the node netC2 against a certain required time is smaller in Configuration Example 4. For example, in a case where the output potential is to be reached in 200 μs, the necessary average voltage of the node netC1 or the node netC2 is lower in the case of Configuration Example 4 by approximately 1 V than in the case of Configuration Example 1.

The reason why the average voltages of the nodes netC1 and netC2 were able to be made smaller in Configuration Example 4 as above is that the potentials of the nodes netC1 and netC2 in their respective positive bias states were reduced in the middle of the positive bias states. By (i) applying a relatively high potential to the node netC1 or netC2 to quickly change the CS signal immediately after the node netC1 or netC2 has gone into the positive bias state and (ii) applying a relatively low potential to the node netC1 or netC2 after the change of the potential of the CS signal has become moderate to some extent, it is possible to efficiently shorten the time required for the output potential to be reached. Accordingly, while achieving the same time required for the output potential to be reached, it is possible to reduce the average potentials of the nodes netC1 and netC2 in their respective positive bias states, and thus possible to improve operation reliability of the retention circuit and the CS driver. This indicates that it is possible to improve operation reliability of the CS driver of Configuration Example 4. As such, even in a case where the transistors used are amorphous silicon TFTs, it is possible to improve operation reliability and possible to narrow a frame in a liquid crystal display device employing a capacitive-coupling pixel-division system.

Configuration Example 5 of CS Driver

Figure 34:
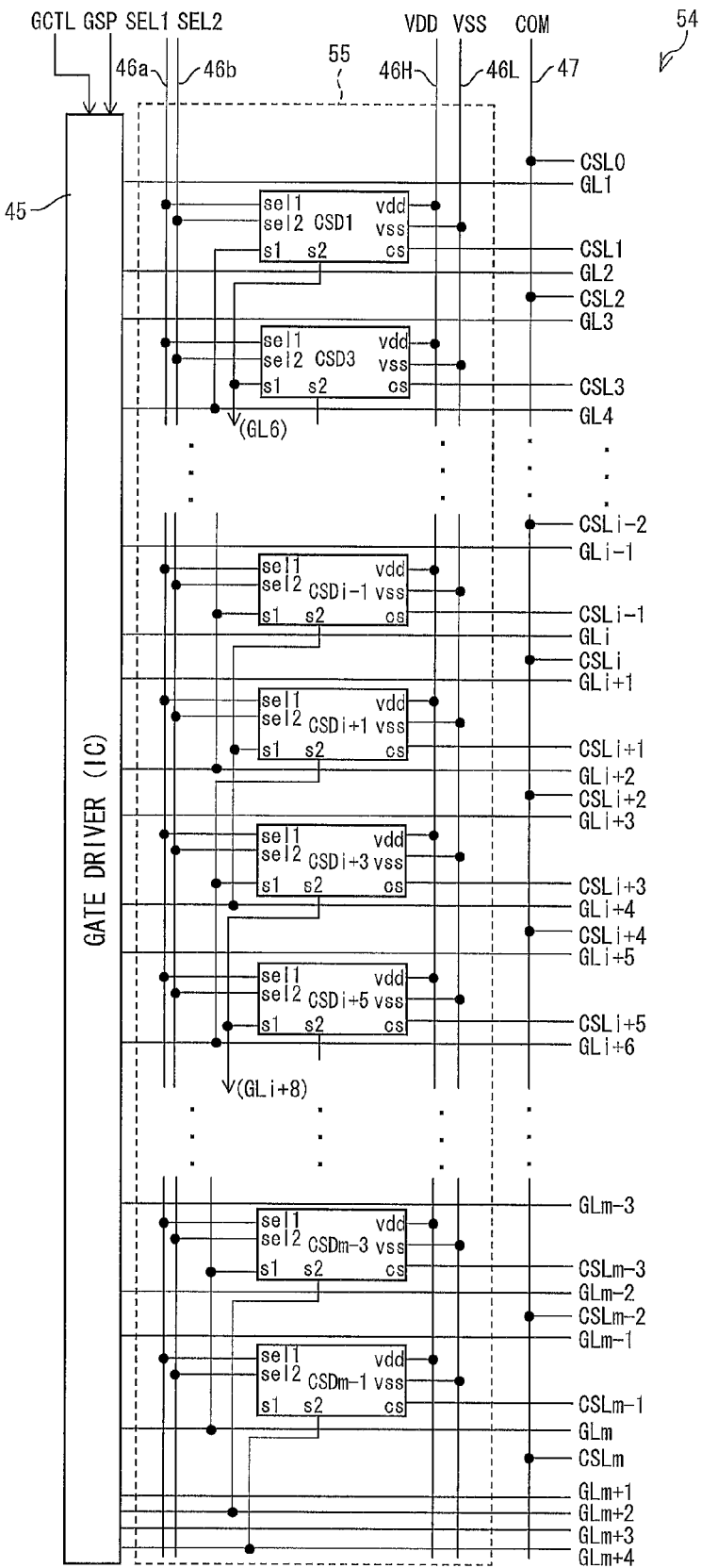
FIG. 34 is a circuit diagram illustrating Configuration Example 5 of a gate/CS driver of a liquid crystal display device of the present invention.

FIG. 34 is a circuit diagram illustrating Configuration Example 5 of a gate/CS driver 54 of the liquid crystal display device 110 of the present invention. Configuration Example 5 is different from Configuration Example 4 in the mechanism for reducing the potentials of the nodes netC1 and netC2 in their respective positive bias states. For convenience of explanation, the same members as those in Configuration Examples 1 to 4 are assigned identical reference signs, and their explanations are omitted here. A gate driver 45 is mounted on a polyimide film by an SOF (system on film) technique. The polyimide film is connected to a glass substrate 1 (see FIG. 8) by an ACF (anisotropic conducting film), and wires (not shown) in the polyimide film are connected to gate terminals (not shown) on the glass substrate 1. The gate driver 45 includes a gate driver IC (not shown), and can consist of a plurality of gate drivers mounted on respective polyimide films (see FIG. 8). A CS driver 55 is provided on the glass substrate 1 so as to be integral with the glass substrate 1. That is, the CS driver 55 is formed monolithically on an active matrix substrate 111 whose transistors are made from amorphous silicon (see FIG. 8)

The CS driver 55 includes a plurality of retention circuits provided with respect to every two lines (each even-numbered line or each odd-numbered line), and includes terminals for receiving external signals SEL1, SEL2, VDD, and VSS. The CS driver 55 receives these signals via a selection line 46a, a selection line 46b, a high-potential-side power line 46H, and a low-potential-side power line 46L. For example, the retention circuit CSDi-1 includes terminals sel1, sel2, vdd, and vss for receiving external signals SEL1, SEL2, VDD, and VSS, and receives these signals via the selection line 46a, the selection line 46b, the high-potential-side power line 46H, and the low-potential-side power line 46L. The retention circuit CSDi-1 further includes input terminals 1 and s2. The input terminal s1 is connected to the gate line GLi+2 and receives an output (gate signal) from the gate driver 45. The input terminal s2 is connected to the gate line GLi+4, and receives an output (gate signal) from the gate driver 45. An output (CS signal) from the retention circuit CSDi-1 is supplied to the CS line CSLi-1 via an output terminal cs.

Figure 35:
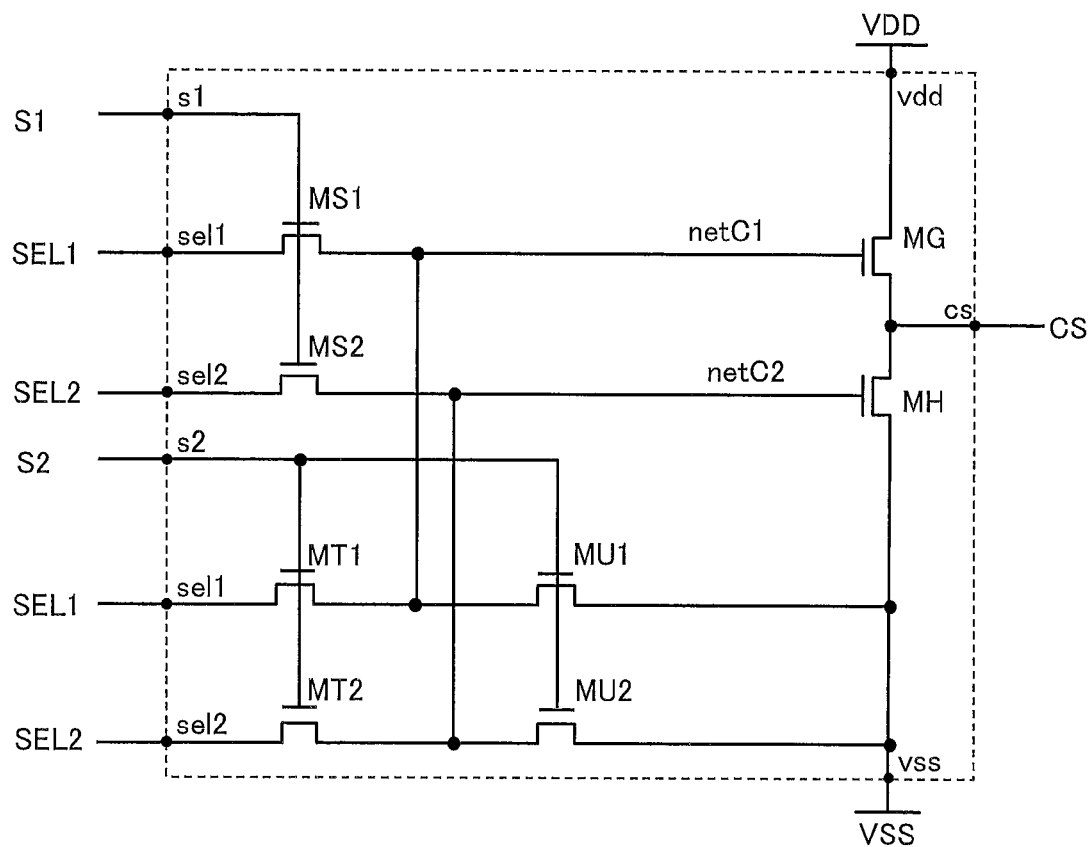
FIG. 35 is a circuit diagram illustrating a specific example of a retention circuit which constitutes a CS driver of Configuration Example 5 shown in FIG. 34.

FIG. 35 is a circuit diagram illustrating a specific example of the retention circuits which constitute the CS driver 55 of Configuration Example 5. The retention circuit CSDi-1, which is an example of the retention circuits, is constituted by eight transistors MS1, MS2, MG, MH, MT1, MT2, MU1 and MU2. Note here that the transistors are amorphous silicon TFTs provided on a glass substrate.

The retention circuit CSDi-1 receives external signals 51, S2, SEL1 (retention target signal), SEL2 (retention target signal), VDD, and VSS via a terminal s1 (first input section), s2, sel1 (second input section), sel2 (third input section), vdd, and vss, and outputs a CS signal via the terminal cs.

The transistor MS1 has a gate electrode connected to the terminal s1 of the retention circuit CSDi-1, a source electrode connected to the terminal sel1 of the retention circuit CSDi-1, and a drain electrode connected to the node netC1. The transistor MG has a gate electrode connected to the node netC1, a source electrode connected to vdd, and a drain electrode connected to the output terminal cs.

The transistor MS2 has a gate electrode connected to the terminal s1 of the retention circuit CSDi-1, a source electrode connected to the terminal sel2 of the retention circuit CSDi-1, and a drain electrode connected to the node netC2. The transistor MH has a gate electrode connected to the node netC2, a source electrode connected to the output terminal cs, and a drain electrode connected to the terminal vss.

The transistor MT1 has a gate electrode connected to the terminal s2 of the retention circuit CSDi-1, a source electrode connected to the terminal sel1 of the retention circuit CSDi-1, and a drain electrode connected to the node netC1 and a source electrode of the transistor MU1.

The transistor MT2 has a gate electrode connected to the terminal s2 of the retention circuit CSDi-1, a source electrode connected to the terminal sel2 of the retention circuit CSDi-1, and a drain electrode connected to the node netC2 and a source electrode of the transistor MU2.

The transistor MU1 has a gate electrode connected to the terminal s2 of the retention circuit CSDi-1, the source electrode connected to the drain electrode of the transistor MT1 and the node netC1, and a drain electrode connected to the drain electrode of the transistor MH and the terminal vss.

The transistor MU2 has a gate electrode connected to the terminal s2 of the retention circuit CSDi-1, the source electrode connected to the drain electrode of the transistor MT2 and the node netC2, and a drain electrode connected to the drain electrode of the transistor MH and the terminal vss.

Figure 36:
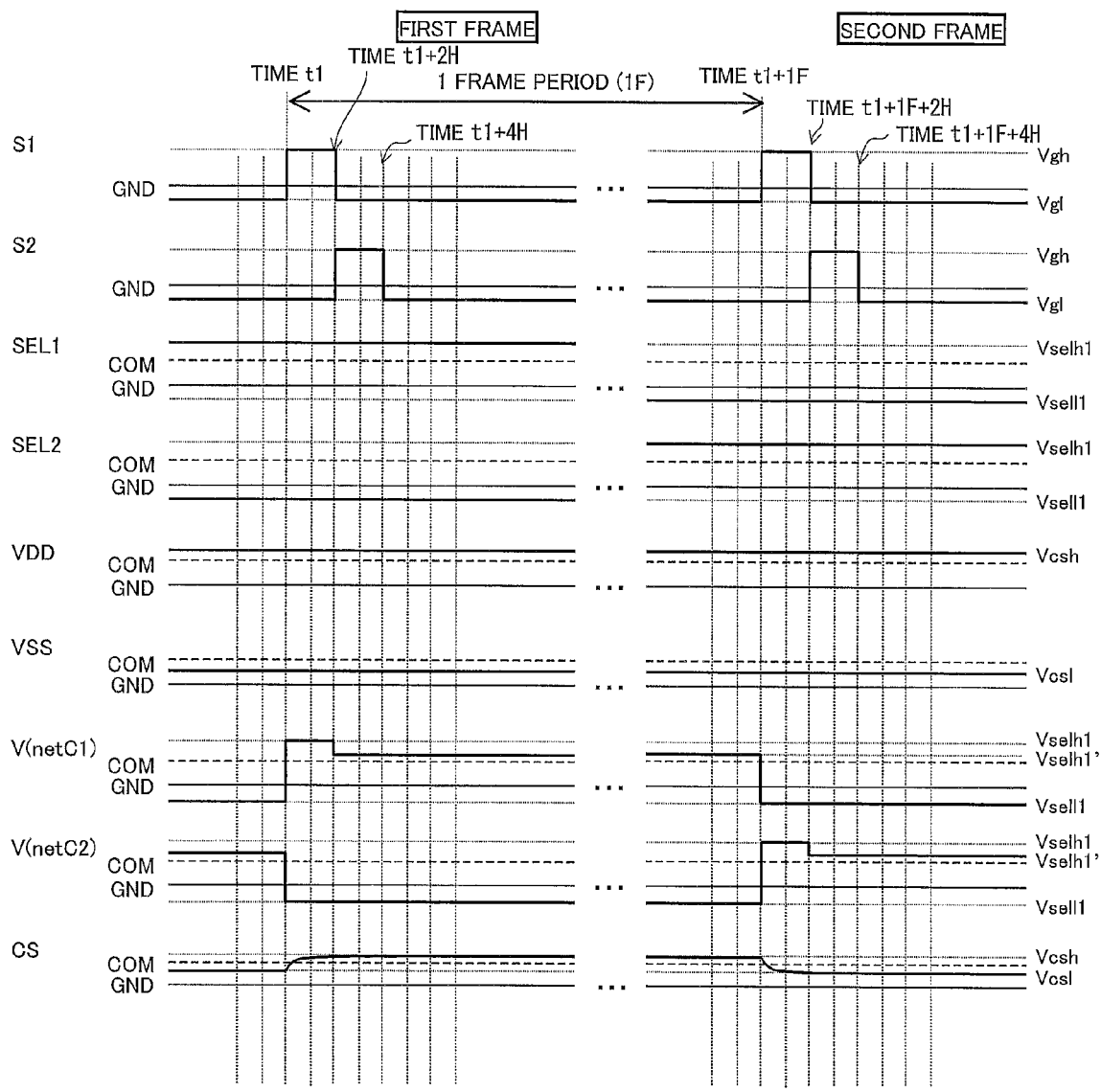
FIG. 36 is a timing chart showing various signals inputted to and outputted from a retention circuit CSDi-1 shown in FIG. 34.

FIG. 36 is a timing chart showing various signals inputted to and outputted from the retention circuit CSDi-1. The following description mainly discusses the differences between FIG. 36 and FIG. 12 that was explained in Configuration Example 1.

Schematically, in the retention circuit of Configuration Example 5, S2 goes into a high-potential state 2H after 51 has gone into a high-potential state. This causes the transistors MT1, MT2, MU1, and MU2 to be turned on, thereby reducing the potentials of the nodes netC1 and netC2.

Specifically, consider consecutive first and second frames. In the first frame, at time t1, the potential of S1 changes from Vgl to Vgh. In response to this, the transistors MS1 and MS2 are turned on, so that the potentials of the nodes netC1 and netC2 change to Vselh1 (high potential) and Vsell1 (low potential), respectively. After the high and low potentials have been reached, the potentials are retained. Next, at time t1+2H, the potential of S2 changes to Vgh. In response to this, the transistors MT1, MT2, MU1, and MU2 are turned on, so that the nodes netC1 and netC2 get conducted with VSS. This reduces the potential of the node netC1 from Vselh1 to Vselh1', and the Vselh1' is retained.

In the second frame, at time t1+1F, the potential of S1 changes from Vgl to Vgh. In response to this, the transistors MS1 and MS2 are turned on, so that the potentials of the nodes netC1 and netC2 change to Vsell1 (low potential) and Vselh1 (high potential), respectively. After the high and low potentials have been reached, the potentials are retained. Next, at time t1+1F+2H, the potential of S2 becomes Vgh. In response to this, the transistors MT1, MT2, MU1, and MU2 are turned on, so that the nodes netC1 and netC2 get conducted with VSS. This reduces the potential of the node netC2 from Vselh1 to Vselh1', and the potential Vselh1' is retained.

The simulation of Configuration Example 5 was carried out in the same manner as in Configuration Example 4. The conditions for the simulation of Configuration Example 5 are as follows.

<Conditions for Simulation of Configuration Example 5>
  1H (horizontal scanning period): 7.4 μs
  1F (frame): 8.3 ms
  Channel length L of each of the transistors MG, MH, MS1, MS2, MT1, MT2, MU1, and MU2: 4 μm
  Channel width of each of the transistors MG and MH: 7000 μm
  Channel width of each of the transistors MS1 and MS2: 50 μm
  Channel width of each of the transistors MT1 and MT2: Varied (this affects the average potentials of the nodes netC1 and netC2)
  Channel width of each of the transistors MU1 and MU2: Varied (this affects the average potentials of the nodes netC1 and netC2)
  Vselh1: 35 V
  Vsell1: −6 V
  Vgh: 35 V
  Vgl: −6 V
  Vcsh: 9.7 V
  Vcsl: 5.7 V
  COM (potential of counter electrode): 7.7 V <Conditions for Simulation of REF (Configuration Example 1)>
  Vselh: Varied (this affects the average potentials of the nodes netC1 and netC2)
  Vsell: −6 V
  Vselh1, Vsell1, Vselh2, and Vsell2 are not used
  The other conditions are the same as those for REF (Configuration Example 1) described in Configuration Example 4

Simulation was carried out with varying channel widths of the transistors MT1 and MT2 and varying channel widths of the transistors MU1 and MU2. The results thereof are shown in Table 2.

TABLE 2

| Configuration Example 5 | | | |
| --- | --- | --- | --- |
| <netC1> | | | |
| W_MT (μm) | W_MU (μm) | Time Required for Reaching 99% (μs) | Average Potential of netC1 (V) |
| 95 | 5 | 106.9 | 24.2 |
| 90 | 10 | 118.1 | 21.9 |
| 85 | 15 | 130.7 | 20.1 |
| 80 | 20 | 145.0 | 18.8 |
| 75 | 25 | 161.7 | 17.7 |
| 70 | 30 | 181.5 | 16.8 |
| 65 | 35 | 205.0 | 16.0 |
| 60 | 40 | 235.1 | 15.2 |
| 55 | 45 | 274.1 | 14.5 |
| 50 | 50 | 328.9 | 13.9 |
| 45 | 55 | 412.6 | 13.2 |
| 40 | 60 | 561.1 | 12.5 |

TABLE 2-continued

| Configuration Example 5 | | | |
| --- | --- | --- | --- |
| <netC2> | | | |
| W_MT (μm) | W_MU (μm) | Time Required for Reaching 99% (μs) | Average Potential of netC2 (V) |
| 95 | 5 | 96.0 | 23.5 |
| 90 | 10 | 102.3 | 21.2 |
| 85 | 15 | 109.3 | 19.6 |
| 80 | 20 | 115.7 | 18.2 |
| 75 | 25 | 122.7 | 17.1 |
| 70 | 30 | 131.1 | 16.2 |
| 65 | 35 | 140.3 | 15.3 |
| 60 | 40 | 150.7 | 14.5 |
| 55 | 45 | 162.9 | 13.8 |
| 50 | 50 | 177.5 | 13.1 |
| 45 | 55 | 195.5 | 12.4 |
| 40 | 60 | 219.2 | 11.7 |
| 35 | 65 | 250.9 | 11.0 |
| 30 | 70 | 297.3 | 10.3 |
| 25 | 75 | 370.3 | 9.6 |
| 20 | 80 | 492.3 | 8.9 |

Note:
W_MT represents channel width of each of the transistors MT1 and MT2.
Note:
W_MU represents channel width of each of the transistors MU1 and MU2.

Figure 37:
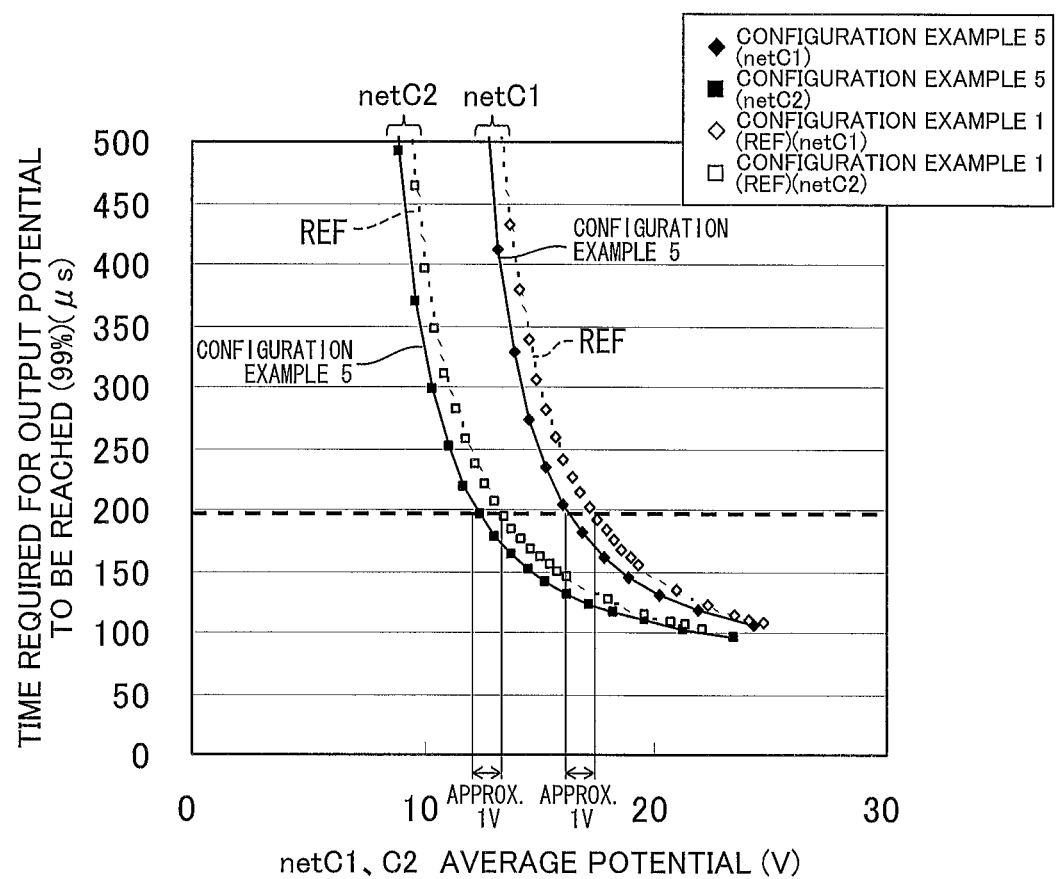
FIG. 37 shows relationships between average potentials of nodes netC1 and netC2 in the retention circuit shown in FIG. 35 and a time required for an output potential to be reached.

Similarly to FIG. 33, FIG. 37 shows relationships between the average potentials of the nodes netC1 and netC2 and the time required for the output potential to be reached, which relationships are based on the results shown in Table 2.

FIG. 37 shows relationships between the average potentials of the nodes netC1 and netC2 and the time required for the output potential to be reached in Configuration Example 5 and REF (Configuration Example 1). In either case of the node netC1 and netC2, the relationship is plotted to the left more in the case of Configuration Example 5 than in the case of Configuration Example 1. This means that the average voltage of the node netC1 or the node netC2 against a given required time is smaller in the case of Configuration Example 5. For example, in a case where the output potential is to be reached in 200 μs, the necessary average voltage of the node netC1 or the node netC2 is lower in the case of Configuration Example 5 by approximately 1 V than in the case of Configuration Example 1.

As shown in FIG. 37, according to Configuration Example 5, it is possible to improve operation reliability of the CS driver in the similar manner to Configuration Example 4 described earlier. Further, since the signals SEL3 and SEL4 to be supplied to the retention circuit are not necessary in Configuration Example 5 unlike Configuration Example 4, it is possible to further narrow a frame in a liquid crystal display device. As such, even in a case where the transistors used are amorphous silicon TFTs, it is possible to improve operation reliability and possible to narrow a frame in a liquid crystal display device employing a capacitive-coupling pixel-division system.

Configuration Example 6 of CS Driver

Figure 38:
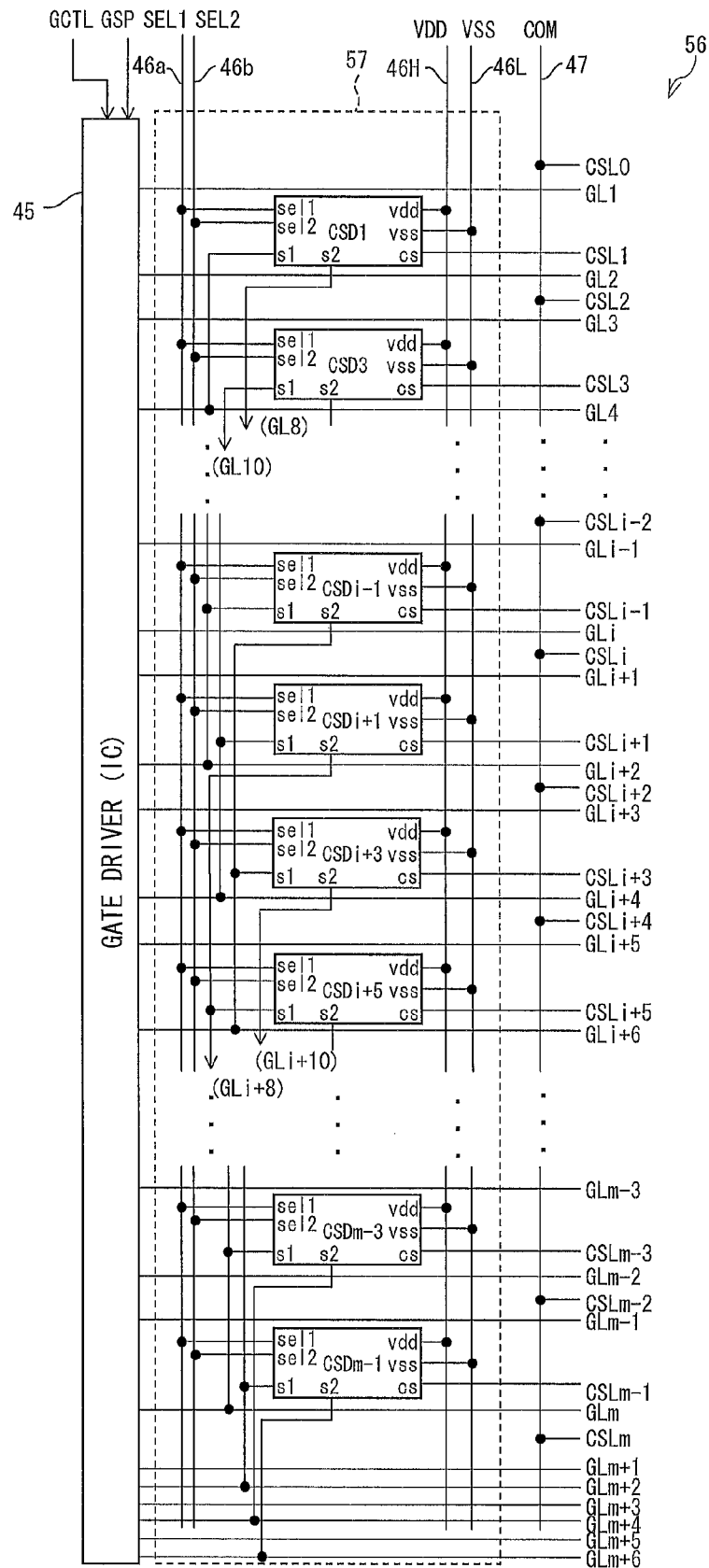
FIG. 38 is a circuit diagram illustrating Configuration Example 6 of a gate/CS driver of a liquid crystal display device of the present invention.

FIG. 38 is a circuit diagram illustrating Configuration Example 6 of a gate/CS driver 56 of the liquid crystal display device 110 of the present invention. Configuration Example 6 is different from Configuration Example 5 in the timings with which the potentials of the nodes netC2 and netC2 in their positive bias states are reduced. For convenience of explanation, the same members as those in Configuration Examples 1 to 5 are assigned identical reference signs, and their explanations are omitted here. A gate driver 45 is mounted on a polyimide film by an SOF (system on film) technique. The polyimide film is connected to a glass substrate 1 (see FIG. 8) by an ACF (anisotropic conducting film), and wires (not shown) in the polyimide film are connected to gate terminals (not shown) on the glass substrate 1. The gate driver 45 includes a gate driver IC (not shown), and can consist of a plurality of gate drivers mounted on respective polyimide films (see FIG. 8). A CS driver 57 is provided on the glass substrate 1 so as to be integral with the glass substrate 1. That is, the CS driver 57 is formed monolithically on an active matrix substrate 111 whose transistors are made from amorphous silicon (see FIG. 8).

The CS driver 57 includes a plurality of retention circuits provided with respect to every two lines (each even-numbered line or each odd-numbered line), and includes terminals for receiving external signals SEL1, SEL2, VDD, and VSS. The CS driver 57 receives these signals via a selection line 46*a*, a selection line 46*b*, a high-potential-side power line 46H, and a low-potential-side power line 46L. For example, the retention circuit CSDi−1 includes terminals sel1, se12, vdd, and vss for receiving the external signals SEL1, SEL2, VDD, and VSS, and receives these signals via the selection line 46*a*, the selection line 46*b*, the high-potential-side power line 46H, and the low-potential-side power line 46L. The retention circuit CSDi−1 further includes input terminals s1 and s2. The input terminal s1 is connected to the gate line GLi+2 and receives an output (gate signal) from the gate driver 45. The input terminal s2 is connected to the gate line GLi+6, and receives an output (gate signal) from the gate driver 45. An output (CS signal) from the retention circuit CSDi−1 is supplied to the CS line CSLi−1 via an output terminal cs.

Figure 39:
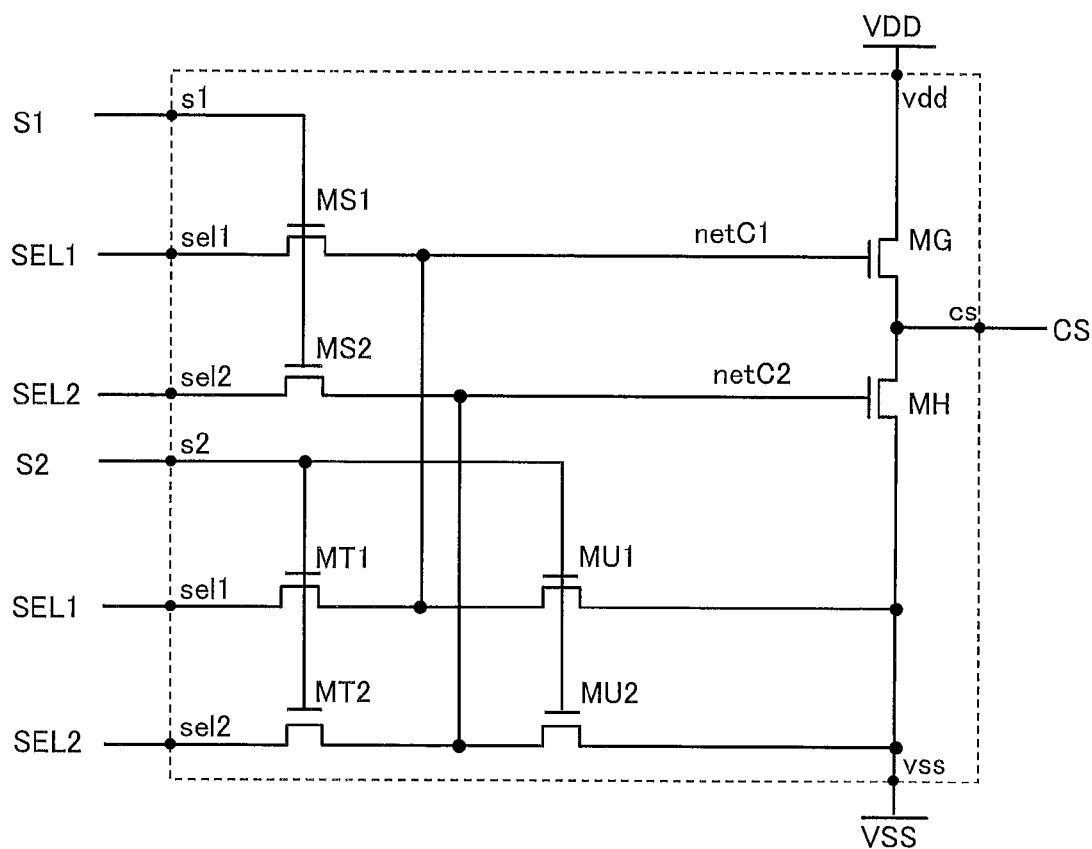
FIG. 39 is a circuit diagram illustrating a specific example of a retention circuit which constitutes a CS driver of Configuration Example 6 shown in FIG. 38.

FIG. 39 is a circuit diagram illustrating a specific example of the retention circuits which constitute the CS driver 57 of Configuration Example 6. The retention circuit CSDi−1, which is an example of the retention circuits, is constituted by eight transistors MS1, MS2, MG, MH, MT1, MT2, M111, and MU2. Note here that the transistors are amorphous silicon TFTs provided on a glass substrate.

The retention circuit CSDi−1 receives external signals S1, S2, SEL1 (retention target signal), SEL2 (retention target signal), VDD, and VSS via a terminal s1 (first input section), s2, sel1 (second input section), sel2 (third input section), vdd, and vss, and outputs a CS signal via the terminal cs.

The transistor MS1 has a gate electrode connected to the terminal s1 of the retention circuit CSDi−1, a source electrode connected to the terminal sel1 of the retention circuit CSDi−1, and a drain electrode connected to the node netC1. The transistor MG has a gate electrode connected to the node netC1, a source electrode connected to vdd, and a drain electrode connected to the output terminal cs.

The transistor MS2 has a gate electrode connected to the terminal s1 of the retention circuit CSDi−1, a source electrode connected to the terminal sel2 of the retention circuit CSDi−1, and a drain electrode connected to the node netC2. The transistor MH has a gate electrode connected to the node netC2, a source electrode connected to the output terminal cs, and a drain electrode connected to the terminal vss.

The transistor MT1 has a gate electrode connected to the terminal s2 of the retention circuit CSDi−1, a source electrode connected to the terminal sel1 of the retention circuit CSDi−1, and a drain electrode connected to the node netC1 and a source electrode of the transistor MU1.

The transistor MT2 has a gate electrode connected to the terminal s2 of the retention circuit CSDi−1, a source electrode connected to the terminal sel2 of the retention circuit CSDi−1, and a drain electrode connected to the node netC2 and a source electrode of the transistor MU2.

The transistor MU1 has a gate electrode connected to the terminal s2 of the retention circuit CSDi−1, the source electrode connected to the drain electrode of the transistor MT1 and the node netC1, and a drain electrode connected to the drain electrode of the transistor MH and the terminal vss.

The transistor MU2 has a gate electrode connected to the terminal s2 of the retention circuit CSDi−1, the source electrode connected to the drain electrode of the transistor MT2 and the node netC2, and a drain electrode connected to the drain electrode of the transistor MH and the terminal vss.

Figure 40:
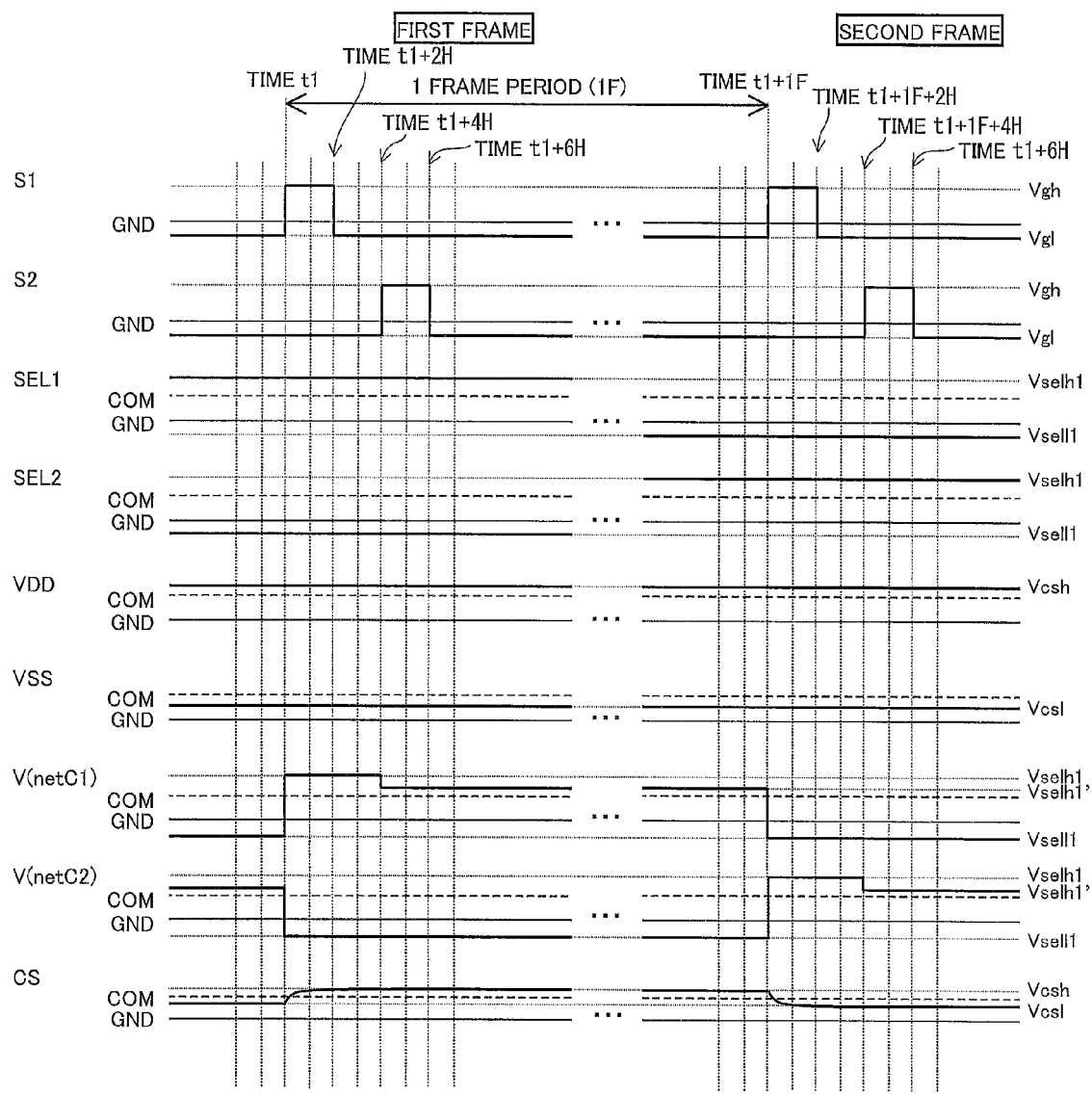
FIG. 40 is a timing chart showing various signals inputted to and outputted from a retention circuit CSDi-1 shown in FIG. 38.

FIG. 40 is a timing chart showing various signals inputted to and outputted from the retention circuit CSDi−1. The following description mainly discusses the differences between FIG. 40 and FIG. 12 that was explained in Configuration Example 1.

Schematically, in the retention circuit of Configuration Example 6, S2 goes into a high-potential state 2H after S1 has gone into a high-potential state. This causes the transistors MT1, MT2, MU1, and MU2 to be turned on, thereby reducing the potentials of the nodes netC1 and netC2.

Specifically, consider consecutive first and second frames. In the first frame, at time t1, the potential of S1 changes from Vgl to Vgh. In response to this, the transistors MS1 and MS2 are turned on, so that the potentials of the nodes netC1 and netC2 change to Vselh1 (high potential) and Vsell1 (low potential), respectively. After the high and low potentials have been reached, the potentials are retained. Next, at time t1+4H, the potential of S2 changes from Vgl to Vgh. In response to this, the transistors MT1, MT2, M111, and MU2 are turned on, so that the nodes netC1 and netC2 get conducted with VSS. This reduces the potential of the node netC1 from Vselh1 to Vselh1', and the Vselh1' is retained.

In the second frame, at time t1+1F, the potential of S1 changes from Vgl to Vgh. In response to this, the transistors MS1 and MS2 are turned on, so that the potentials of the nodes netC1 and netC2 change to Vsell1 (low potential) and Vselh1 (high potential), respectively. After the high and low potentials have been reached, the potentials are retained. Next, at time t1+1F+4H, the potential of S2 changes from Vgl to Vgh. In response to this, the transistors MT1, MT2, MU1, and MU2 are turned on, so that the nodes netC1 and netC2 get conducted with VSS. This reduces the potential of the node netC2 from Vselh1 to Vselh1', and the potential Vselh1' is retained.

Simulation was carried out with varying channel widths of the transistors MT1 and MT2 and varying channel widths of the transistors MU1 and MU2. The results thereof are shown in Table 3.

TABLE 3

Configuration Example 6

<netC1>

| W_MT (μm) | W_MU (μm) | Time Required for Reaching 99% (μs) | Average Potential of netC1 (V) |
|---|---|---|---|
| 95 | 5 | 107.8 | 24.0 |
| 90 | 10 | 115.9 | 21.7 |
| 85 | 15 | 125.1 | 19.9 |
| 80 | 20 | 136.2 | 18.6 |
| 75 | 25 | 149.0 | 17.5 |
| 70 | 30 | 164.6 | 16.5 |
| 65 | 35 | 184.0 | 15.7 |
| 60 | 40 | 208.9 | 14.9 |
| 55 | 45 | 243.3 | 14.2 |

TABLE 3-continued

| Configuration Example 6 | | | |
|---|---|---|---|
| 50 | 50 | 294.5 | 13.5 |
| 45 | 55 | 380.7 | 12.8 |
| 40 | 60 | 560.4 | 12.1 |

| <netC2> | | | |
|---|---|---|---|
| W_MT (μm) | W_MU (μm) | Time Required for Reaching 99% (μs) | Average Potential of netC2 (V) |
| 95 | 5 | 98.4 | 23.6 |
| 90 | 10 | 101.8 | 21.4 |
| 85 | 15 | 105.3 | 19.7 |
| 80 | 20 | 109.5 | 18.4 |
| 75 | 25 | 113.1 | 17.3 |
| 70 | 30 | 118.1 | 16.4 |
| 65 | 35 | 122.6 | 15.5 |
| 60 | 40 | 128.9 | 14.8 |
| 55 | 45 | 135.5 | 14.0 |
| 50 | 50 | 143.2 | 13.4 |
| 45 | 55 | 153.2 | 12.7 |
| 40 | 60 | 165.7 | 12.0 |
| 35 | 65 | 182.0 | 11.4 |
| 30 | 70 | 205.3 | 10.7 |
| 25 | 75 | 238.5 | 10.0 |
| 20 | 80 | 298.7 | 9.2 |
| 15 | 85 | 453.5 | 8.4 |

Note:
W_MT represents channel width of each of the transistors MT1 and MT2.
Note:
W_MU represents channel width of each of the transistors MU1 and MT2.

Figure 41:
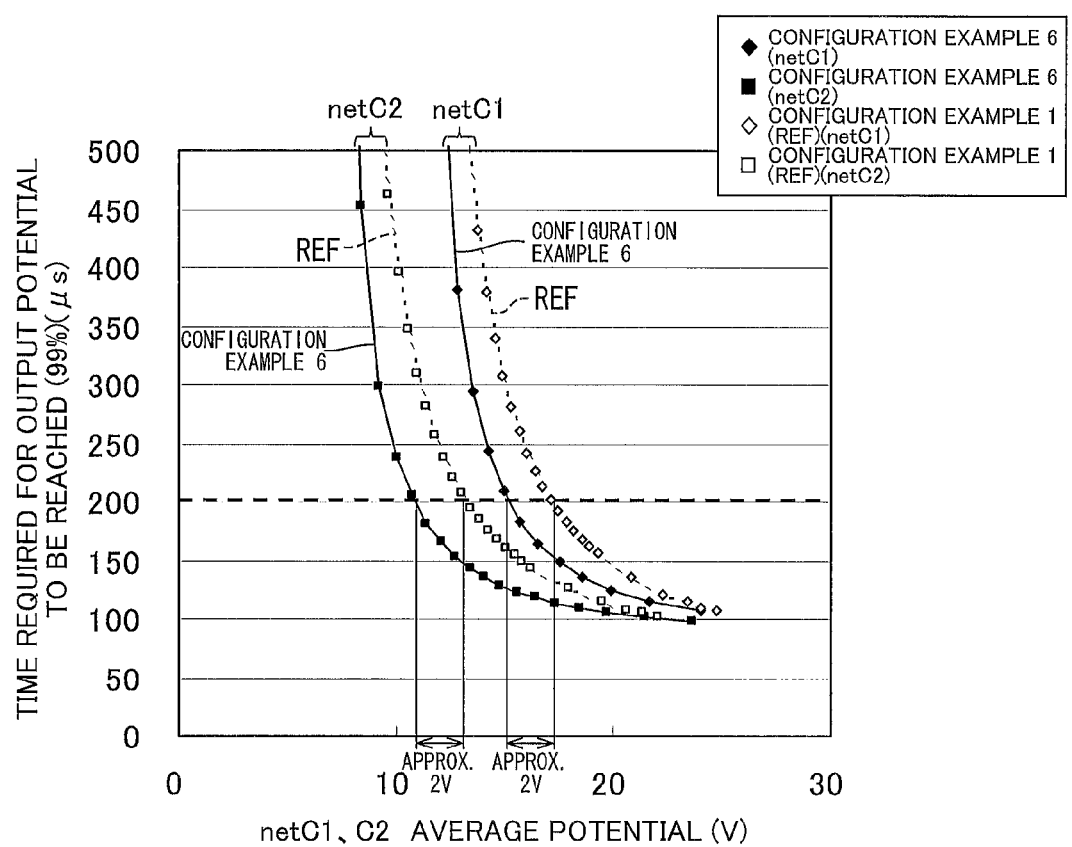
FIG. 41 shows relationships between average potentials of nodes netC1 and netC2 in the retention circuit shown in FIG. 39 and a time required for an output potential to be reached.

Similarly to FIG. 33, FIG. 41 shows relationships between the average potentials of the nodes netC1 and netC2 and the time required for the output potential to be reached, which relationships are based on the results shown in Table 3. The conditions for the simulation of Configuration Example 6 are the same as those for Configuration Example 5.

FIG. 41 shows relationships between the average potentials of the nodes netC1 and netC2 and the time required for the output potential to be reached in Configuration Example 6 and REF (Configuration Example 1). In either case of the nodes netC1 and netC2, the relationship is plotted to the left more in the case of Configuration Example 6 than in the case of Configuration Example 1. This means that the average voltage of the node netC1 or the node netC2 against a given required time is smaller in the case of Configuration Example 6. For example, in a case where the output potential is to be reached in 200 μs, the necessary average voltage of the node netC1 or the node netC2 is lower in the case of Configuration Example 6 by approximately 2 V than in the case of Configuration Example 1.

As shown in FIG. 41, according to Configuration Example 6, it is possible to improve operation reliability of the CS driver in the similar manner to Configuration Examples 4 and 5 described earlier. Further, Configuration Example 6 is capable of reducing, as compared to Configuration Examples 4 and 5, the average voltage of the node netC1 or netC2 while achieving the same time required for the output potential to be reached. This further improves the operation reliability of the CS driver.

The reason therefor is that, in Configuration Example 6, the timing with which the potentials of the nodes netC1 and netC2 are reduced is delayed by 2H from those in Configuration Example 5. This increases the length of time during which the nodes netC1 and netC2 have high potentials, which time is immediately after the nodes netC1 and netC2 have gone into the positive bias states. Accordingly, the output potential is reached in a shorter time. On the other hand, as to the impact on the average potential here, the average potential only slightly increases because the length of a single frame period is extremely long. Therefore, it is possible to achieve, with the lower average potentials, the same time required for the output potential to be reached. As such, according to Configuration Example 6, it is possible to improve the operation reliability of the CS driver as compared to Configuration Example 5. For this reason, even in a case where the transistors used are amorphous silicon TFTs, it is possible to improve operation reliability and thus possible to narrow a frame in a liquid crystal display device employing a capacitive-coupling pixel-division system.

As described in Configuration Example 6, the timings with which the potentials of the nodes netC1 and netC2 in their positive bias states are reduced are arbitrary and can be determined as appropriate.

Note that the following variation of Configuration Examples 4 to 6 is also available. That is, the potentials of the nodes netC1 and netC2 in their positive bias states can be reduced in multiple steps or in a continuous manner instead of being reduced in two steps. This makes it possible to further efficiently improve operation reliability of the retention circuit and the CS driver.

Meanwhile, the configuration of each of the foregoing CS drivers (Configuration Examples 1 to 6) is not only applicable to the liquid crystal panel (Configuration Example 1) as shown in FIGS. 1 and 2 but also to various forms of liquid crystal panels. The following description discusses other examples (Configuration Examples 7 and 8) of a configuration of the liquid crystal panel.

Configuration Example 7 of Liquid Crystal Panel

Figure 42:
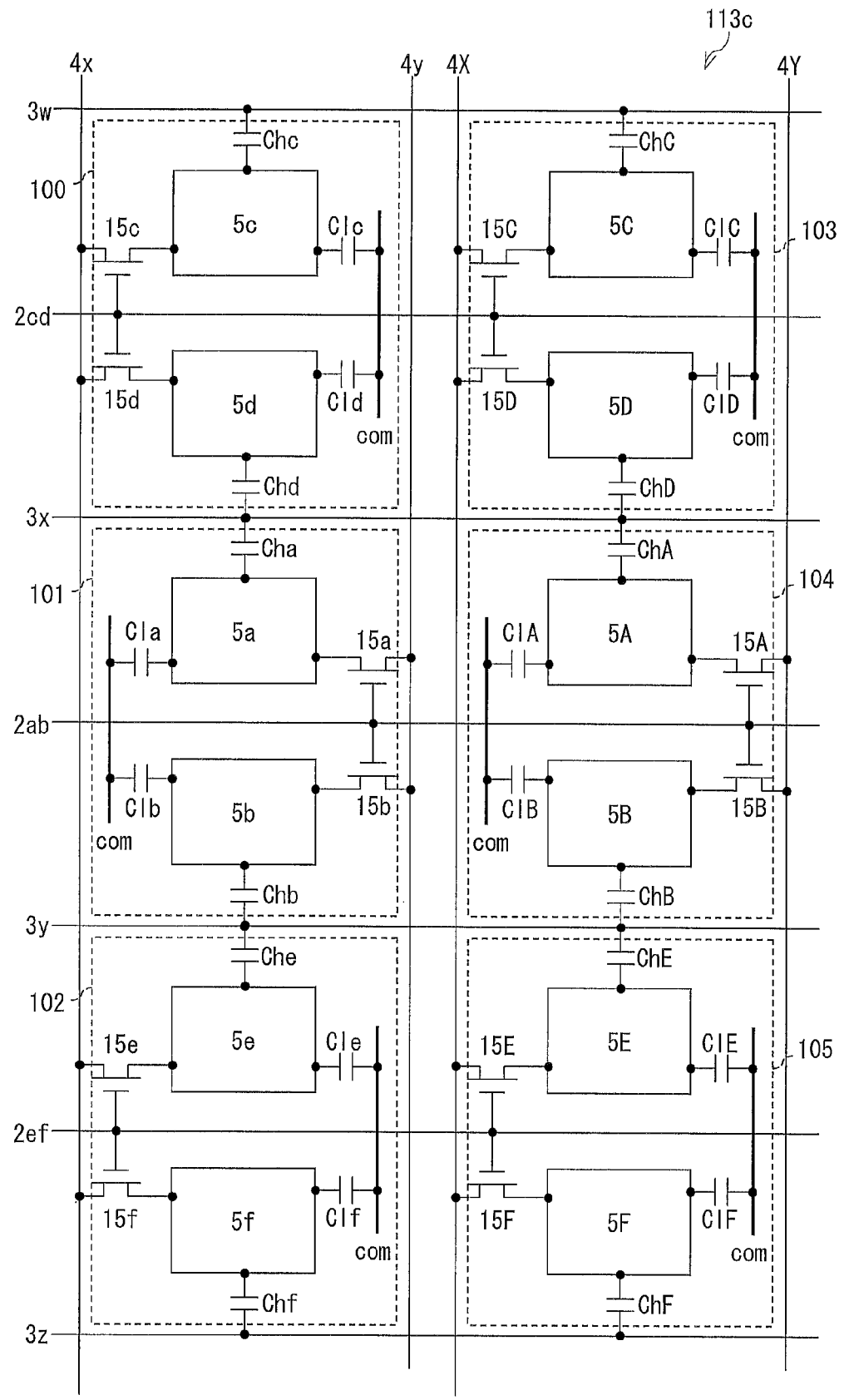
FIG. 42 is an equivalent circuit diagram illustrating a part of Configuration Example 7 of a liquid crystal panel of the present invention.

FIG. 42 is an equivalent circuit diagram illustrating a part of a liquid crystal panel 113c of Configuration Example 7 of the liquid crystal panel of the present invention. The liquid crystal panel 113c shown in FIG. 42 is the same as the liquid crystal panel 113a shown in FIG. 1 except that (i) two data signal lines are provided in such a way as to correspond to a single column of pixels and (ii) pixels adjacent to each other in the column direction are connected to respective different data signal lines. Further, in the liquid crystal panel 113c, one single data signal line and one single scanning signal line are provided in such a way as to correspond to one pixel, and a retention capacitor line is shared by pixels adjacent to each other in the column direction.

The configuration of each pixel is described first taking a pixel 101 as an example.

The pixel 101 is configured such that (i) a pixel electrode 5a (first pixel electrode) is connected to a data signal line 4y (second data signal line) via a transistor 15a (first transistor) that is connected to a scanning signal line 2ab, (ii) a pixel electrode 5b (second pixel electrode) is connected to the data signal line 4y (second data signal line) via a transistor 15b (second transistor) that is connected to the scanning signal line 2ab, (iii) a retention capacitor Cha is formed between the pixel electrode 5a and a retention capacitor line 3x, (iv) a retention capacitor Chb is formed between the pixel electrode 5b and a retention capacitor line 3y, (v) a liquid crystal capacitor Cla is formed between the pixel electrode 5a and a common electrode com and (vi) a liquid crystal capacitor Clb is formed between the pixel electrode 5b and the common electrode com.

The following description discusses pixels 100 and 102 which are adjacent to the pixel 101 in the column direction (in an up and down direction of the sheet). The retention capacitors and liquid crystal capacitors are formed in the same manner as in the pixel 101. Pixel electrodes 5c, 5d, 5e, and 5f of the pixels 100 and 102 are connected to a data signal line 4x (first data signal line) via their corresponding transistors 15c, 15d, 15e, and 15f. In this way, pixels adjacent to each other in the column direction are connected alternately to different data signal lines.

Further, the pixel electrodes 5a and 5b of the pixel 101 form the retention capacitors Cha and Chb with the respective different retention capacitor lines 3x and 3y. Therefore, for example, by writing data signals in the pixel electrodes 5a and 5b and then supplying different retention capacitor line signals to the respective retention capacitor lines 3x and 3y to increase or reduce the pixel electrode potentials (pixel potentials) through capacitive coupling, it is possible to cause the pixel potentials (effective voltages) of the respective pixel electrodes 5a and 5b to differ from each other. With this method, it is possible to cause for example (i) a sub-pixel including the pixel electrode 5a to serve as a bright sub-pixel having a positive polarity and (ii) a sub-pixel including the pixel electrode 5b to serve as a dark sub-pixel having a negative polarity. This makes it possible to realize a liquid crystal display device employing a pixel-division system.

Note that signals supplied to adjacent data signal lines can be such that (i) the polarity of a data signal supplied to a data signal line is reversed for every 1 frame period and (ii) in a single horizontal scanning period, data signals having opposite polarities are supplied to two data signal lines 4x and 4y corresponding to an identical column of pixels, and data signals having opposite polarities are supplied also to two adjacent data signal lines 4y and 4X. With this, pixels adjacent to each other in the column direction (in the up and down direction of the sheet) have opposite polarities, and pixels adjacent to each other in the row direction (in the horizontal direction of the sheet) have opposite polarities. Accordingly, a so-called dot-inversion driving is achieved, and display quality is improved. Note however that, in the present embodiment, basically, the polarities of the signals supplied to the data signal lines can be distributed in any manner.

Figure 43:
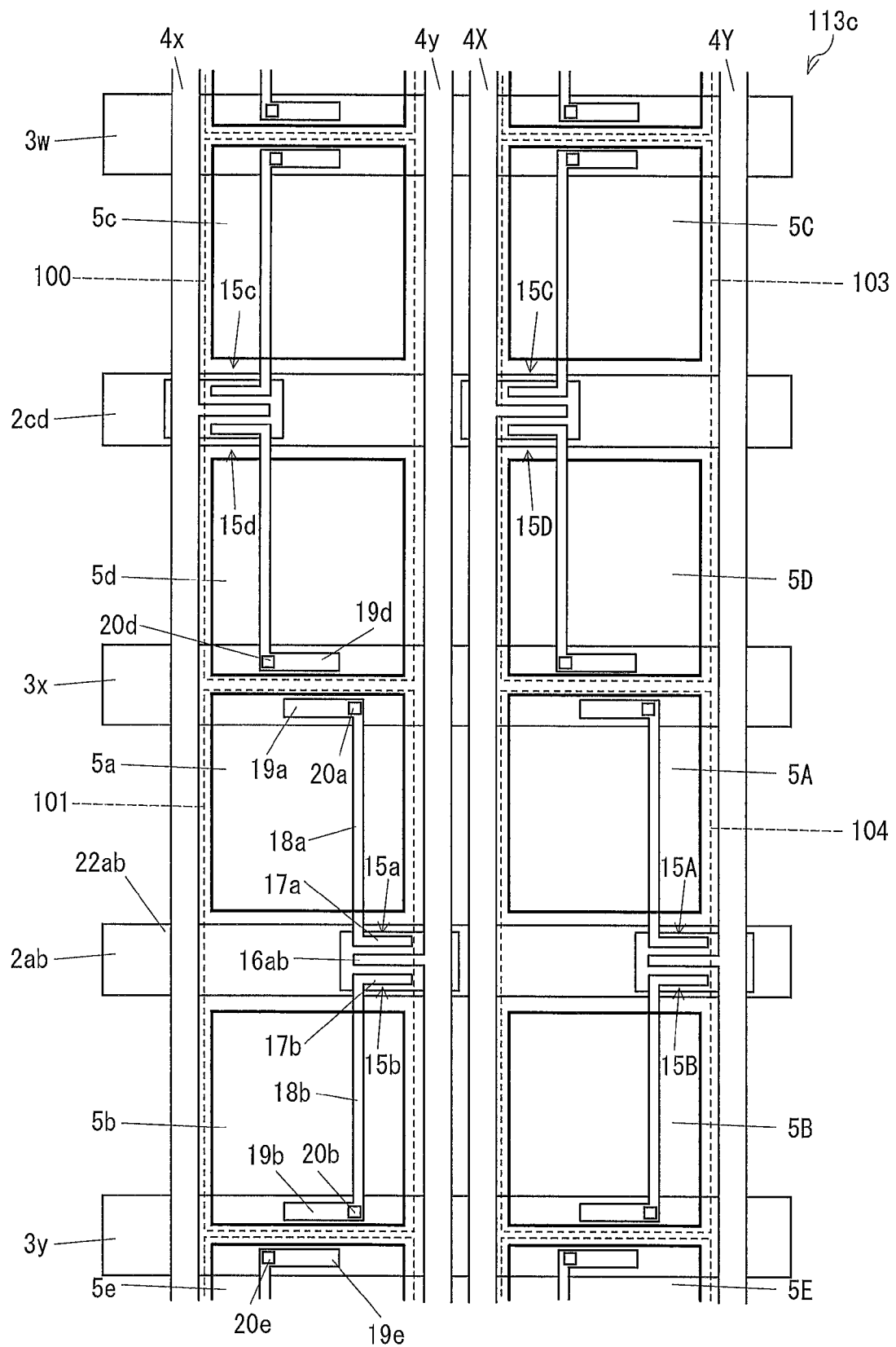
FIG. 43 is a plan view illustrating Configuration Example 7 of a liquid crystal panel of the present invention.

FIG. 43 illustrates a specific configuration of the liquid crystal panel 113c of Configuration Example 7. FIG. 43 is a plan view illustrating Configuration Example 7 of the liquid crystal panel 113c. The liquid crystal panel 113c shown in FIG. 43 is configured such that (i) the data signal lines 4x and 4y are provided so as to extend along the right and left sides of the pixels 100 and 101, (ii) the data signal lines 4X and 4Y are provided so as to extend along the right and left sides of the pixels 103 and 104, (iii) a retention capacitor line 3w is provided so as to overlap one edge portions of the pixels 100 and 103, (iv) the retention capacitor line 3x is provided so as to overlap the other edge portions of the pixels 100 and 103 and one edge portions of the pixels 101 and 104, and (v) the retention capacitor line 3y is provided so as to overlap the other edge portions of the pixels 101 and 104. Further, a scanning signal line 2cd is provided so as to pass through the central portion of each of the pixels 100 and 103, and the scanning signal line 2ab is provided so as to pass through the central portion of each of the pixels 101 and 104.

Further, on a plan view, the pixel 100 is configured such that the pixel electrodes 5c and 5d are arranged in the column direction between the retention capacitor lines 3w and 3x, the pixel 101 is configured such that the pixel electrodes 5a and 5b are arranged in the column direction between the retention capacitor lines 3x and 3y, the pixel 103 is configured such that the pixel electrodes 5C and 5D are arranged in the column direction between the retention capacitor lines 3w and 3x, and the pixel 104 is configured such that the pixel electrodes 5A and 5B are arranged in the column direction between the retention capacitor lines 3x and 3y.

In the pixel 101, a source electrode 16ab and a drain electrode 17a of the transistor 15a and a source electrode 16ab and a drain electrode 17b of the transistor 15b are provided on the scanning signal line 2ab. In this way, the source electrode 16ab serves as both the source electrodes of the transistors 15a and 15b, and is connected to the data signal line 4y. The drain electrode 17a is connected to a drain drawing wire 18a, the drain drawing wire 18a is connected to a capacitor electrode 19a, and the capacitor electrode 19a is connected to the pixel electrode 5a through a contact hole 20a. The drain electrode 17b is connected to a drain drawing wire 18b, the drain drawing wire 18b is connected to a capacitor electrode 19b, and the capacitor electrode 19b is connected to the pixel electrode 5b through a contact hole 20b.

Note here that the capacitor electrode 19a overlaps the retention capacitor line 3x via a gate insulating film, and the pixel electrode 5a overlaps the retention capacitor line 3x via the gate insulating film and an interlayer insulating film. Both of these overlappings make up the retention capacitor Cha (see FIG. 42). Similarly, the capacitor electrode 19b overlaps the retention capacitor line 3y via the gate insulating film, and the pixel electrode 5b overlaps the retention capacitor line 3y via the gate insulating film and the interlayer insulating film. Both of these overlappings make up the retention capacitor Chb (see FIG. 42).

The other pixels each have the same configuration (the shape of each member, and arrangement and connection of members) as the pixel 101. Note however that, as described earlier, each pixel electrode is connected to either a data signal line on the right side or that on the left side.

In the present embodiment, the CS driver and the retention circuit can be any of the CS drivers and the retention circuits of Configuration Examples 1 to 6 described above.

The liquid crystal panel 113c is suitable for a high-speed drive panel driven at a frame rate of 240 Hz (quad speed drive) or 360 Hz (six speed drive) etc., and is also suitable for a 3-D liquid crystal display device which includes the panel and displays 3-D (three dimensional) images.

It has been known that, in the arrangement of pixel electrodes and data signal lines as shown in FIG. 42 or FIG. 43, i.e., in the arrangement in which (i) two data signal lines are provided in such a way as to correspond to a single column of pixels arranged in the column direction and (ii) pixels adjacent to each other in the column direction receive data signals from respective data signal lines on their right and left sides, by selecting two scanning signal lines at a time to carry out sequential scanning during driving, it is possible to secure a twice longer time to charge each pixel electrode to the potential of a data signal line compared with the case of sequentially scanning the scanning signal lines one at a time. This makes it possible to prevent pixels from not being charged sufficiently. Therefore, such an arrangement of pixel electrodes and data signal lines is suitable for the foregoing high-speed drive panel.

If such an arrangement is applied to a liquid crystal panel employing a conventional capacitive-dividing pixel-division system to carry out high-speed driving, the size of a frame is dramatically increased for the following reason. In a conventional capacitive-dividing pixel-division system, a retention capacitor main line is connected with a large number of retention capacitor lines and transmits AC (alternate current) signals therethrough. Therefore, signal delay is likely to occur in the retention capacitor main line, which has an adverse effect on a display. Under such circumstances, if further speed-up is attempted, the line width of the retention capacitor main line is necessarily increased.

In this regard, in a case where a liquid crystal panel employing a capacitive-dividing pixel-division system is produced with use of a CS driver including a plurality of retention circuits as described in Configuration Example 7, the retention capacitor main line which transmits AC (alternate current) signals therethrough is not necessary, so that a frame is hardly required to be larger in size. As such, Configuration Example 7 is highly effective particularly in narrowing a frame of a high-speed drive panel.

Configuration Example 8 of Liquid Crystal Panel

Figure 44:
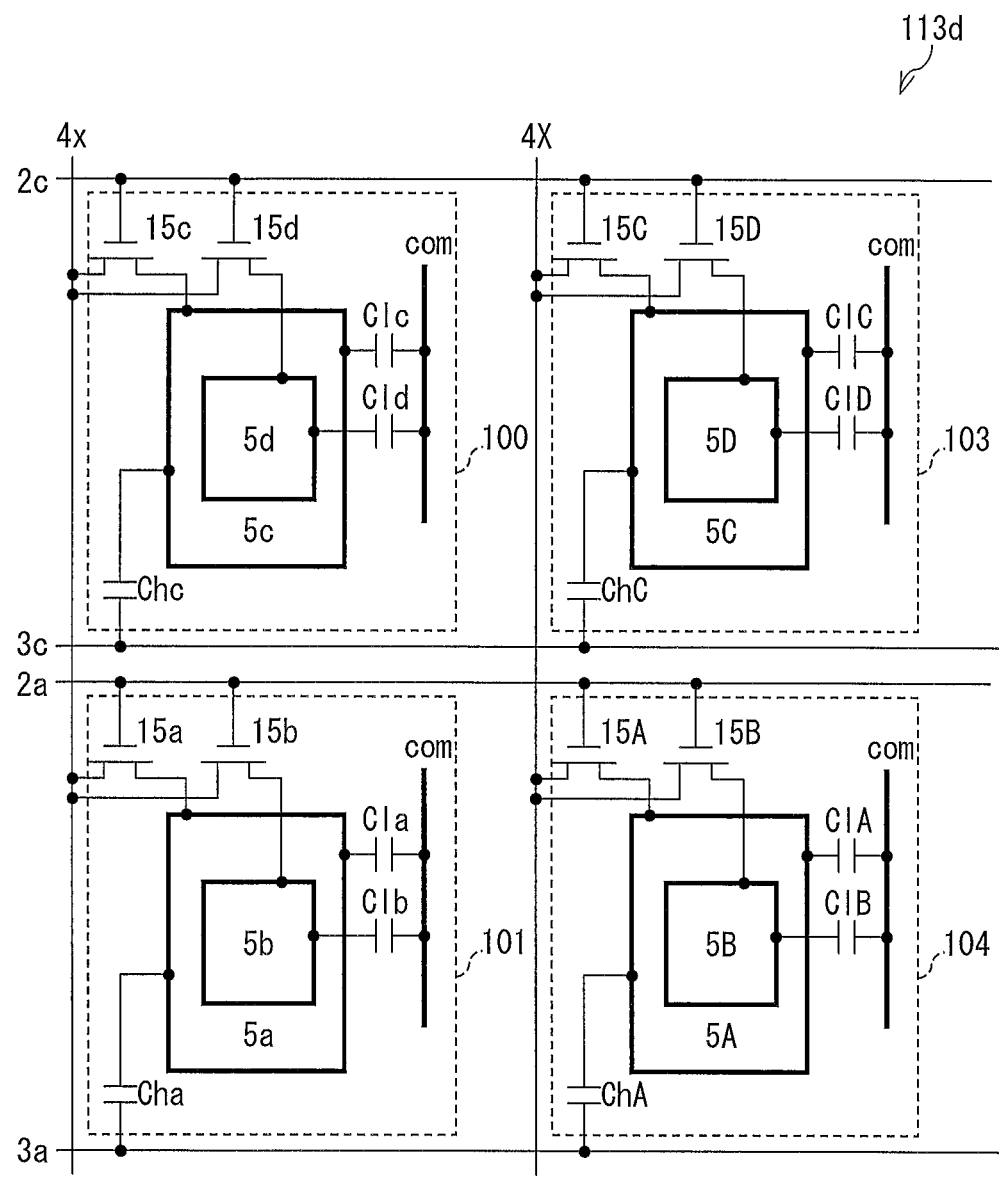
FIG. 44 is an equivalent circuit diagram illustrating a part of Configuration Example 8 of a liquid crystal panel of the present invention.

FIG. 44 is an equivalent circuit diagram illustrating a part of a liquid crystal panel 113d of Configuration Example 8 of the liquid crystal panel of the present invention. As shown in FIG. 44, the liquid crystal panel 113d includes (i) data signal lines 4x and 4X that extent in the column direction (in the longitudinal direction of FIG. 44), (ii) scanning signal lines 2c and 2a that extend in the row direction (in the lateral direction of FIG. 44), (iii) pixels 100, 101, 103 and 104 which are arranged in the row and column directions, (iv) retention capacitor lines 3a and 3c, and (iv) a common electrode (counter electrode) com. The pixels have the same configurations.

In the liquid crystal panel 113d, one data signal line, one scanning signal line, and one retention capacitor line are provided in such a way as to correspond to one pixel. Further, in each pixel, two pixel electrodes are provided such that one of the pixel electrodes surrounds the other. In the pixel 100, a pixel electrode 5d and a pixel electrode 5c that surrounds the pixel electrode 5d are provided. In the pixel 101, a pixel electrode 5b and a pixel electrode 5a that surrounds the pixel electrode 5b are provided. In the pixel 103, a pixel electrode 5D and a pixel electrode 5C that surrounds the pixel electrode 5D are provided. In the pixel 104, a pixel electrode 5B and a pixel electrode 5A that surrounds the pixel electrode 5B are provided.

Since the pixels have the same configuration, the following description is based mainly on the pixel 101 serving as an example.

The pixel 101 is configured such that (i) the pixel electrode 5a is connected to the data signal line 4x via a transistor 15a that is connected to the scanning signal line 2a, (ii) the pixel electrode 5b is connected to the data signal line 4x via a transistor 15b that is connected to the scanning signal line 2a, (iii) a retention capacitor Cha is formed between the pixel electrode 5a and the retention capacitor line 3a, (iv) a liquid crystal capacitor Cla is formed between the pixel electrode 5a and the common electrode com, and (v) a liquid crystal capacitor Clb is formed between the pixel electrode 5b and the common electrode com.

As described above, the pixel electrodes 5a and 5b are connected to an identical data signal line 4x via the respective transistors 15a and 15b which are connected to an identical scanning signal line 2ab. Therefore, it is possible to directly supply an identical signal potential (data signal) to the pixel electrodes 5a and 5b via the respective transistors 15a and 15b. Further, the pixel electrode 5a forms the retention capacitor Cha with the retention capacitor line 3a. Therefore, for example, by writing data signals to the pixel electrodes 5a and 5b and then changing the retention capacitor line signal to increase or reduce the pixel electrode potential (pixel potential) through capacitive coupling, it is possible to cause the pixel potentials of the respective pixel electrodes 5a and 5b to differ from each other. With such a method, it is possible to cause for example (i) a sub-pixel including the pixel electrode 5a to serve as a dark sub-pixel and (ii) a sub-pixel including the pixel electrode 5b to serve as a bright sub-pixel. This makes it possible to realize a liquid crystal display device employing a pixel-division system.

Figure 45:
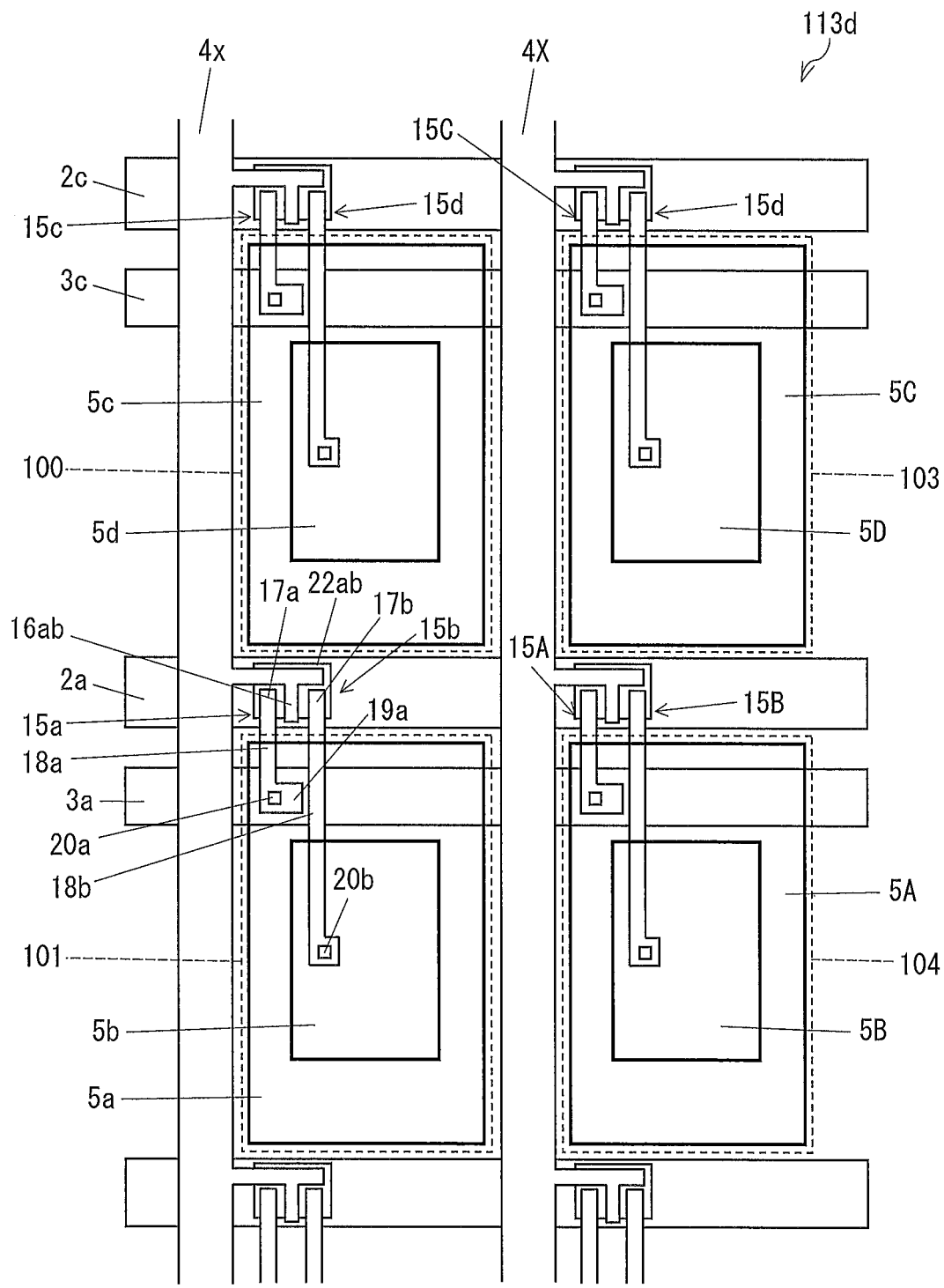
FIG. 45 is a plan view illustrating Configuration Example 8 of a liquid crystal panel of the present invention.

FIG. 45 illustrates a specific configuration of the liquid crystal panel 113d of Configuration Example 8. FIG. 45 is a plan view illustrating Configuration Example 8 of the liquid crystal panel 113d. The liquid crystal panel 113d is configured such that (i) the transistors 15a and 15b are provided in the vicinity of the intersection of the data signal line 4x and the scanning signal line 2a, (ii) the rectangular pixel electrode 5b and the rectangular pixel electrode 5a which surrounds the pixel electrode 5b are provided in a pixel region defined by the data signal lines 4x and 4X, and (iii) the retention capacitor line 3a extends in the row direction across the pixel electrode 5a. The shape of each of the pixel electrodes 5a and 5b is not particularly limited provided that one of the pixel electrodes surrounds the other.

In the pixel 101, a source electrode 16ab and a drain electrode 17a of the transistor 15a and a source electrode 16ab and a drain electrode 17b of the transistor 15b are provided on the scanning signal line 2a. In this way, the source electrode 16ab serves as both the source electrodes of the transistors 15a and 15b, and is connected to the data signal line 4x. The drain electrode 17a is connected to a drain drawing wire 18a, the drain drawing line 18a is connected to a capacitor electrode 19a, and the capacitor electrode 19a is connected to the pixel electrode 5a through a contact hole 20a. The drain electrode 17b is connected to a drain drawing wire 18b, and the drain drawing wire 18b is connected to the pixel electrode 5b through a contact hole 20b.

Note here that the capacitor electrode 19a overlaps the retention capacitor line 3a via a gate insulating film, and the pixel electrode 5a overlaps the retention capacitor line 3a via the gate insulating film and an interlayer insulating film. Both of these overlappings make up the retention capacitor Cha (see FIG. 44).

On the other hand, the pixel electrode 5b is not provided with a capacitor electrode and a retention capacitor line, and therefore is not provided with a retention capacitor formed with the retention capacitor line. Since the pixel electrode 5b serves as a bright pixel, in view of the V-T curve (a curve of voltage applied to liquid crystal versus transmittance) of a liquid crystal panel, display luminance is not readily changed even if the potential of the pixel electrode 5b somewhat differs between frames. Further, according to Configuration Example 8, one of the sub-pixels is not provided with a retention capacitor formed with a retention capacitor line. Therefore, it is possible to reduce the number of outputs (CS signals) of the CS driver and thus possible to simplify the configuration of the CS driver. This is more advantageous in narrowing a frame.

Note that the other pixels each have the same configuration (shape of each member, and arrangement and connection of members) as the pixel 101.

Meanwhile, each of the liquid crystal panels described in Configuration Examples 1 to 7 is configured such that each of the pixel electrodes provided in a single pixel region forms a retention capacitor with a retention capacitor line. Note, however, that the present invention is not limited to this configuration, provided that, as described in Configuration Example 8, at least one pixel electrode in a single pixel electrode forms a retention capacitor with a retention capacitor line. An example of such a configuration is one in which (i) two pixel electrodes (5a and 5b) are provided in a single pixel region and (ii) only one pixel electrode (5a) forms a retention capacitor with a retention capacitor line. Also in this configuration, by writing a data signal to the one pixel electrode (5a) and then supplying a retention capacitor line signal to a retention capacitor lines to increase or reduce the pixel electrode potential (pixel potential) through capacitive coupling, it is possible to change the pixel potential of the pixel electrode (5a). Since a single pixel can be constituted by a bright sub-pixel and a dark sub-pixel, it is possible to realize a liquid crystal display device employing a pixel-division system.

As used in the subject application, the "polarity of potential" indicates that the potential is higher (i.e., positive) or lower (i.e., negative) than a potential serving as a reference. The potential serving as a reference can be Vcom (common potential) which is the potential of the common electrode (counter electrode) or any other potential. In each of the liquid crystal panels described in Configuration Examples 1 to 8, the polarities of a number of data signal lines can be distributed in any way. Every adjacent data signal lines can have either opposite polarities or the same polarity. The polarities of the data signal lines can be reversed every two lines. The effect of the present invention is brought about regardless of how the polarities of the data signal lines are distributed.

Further, in each of the liquid crystal panels of the present invention described in Configuration Examples 1 to 7, a retention capacitor line is provided between pixels adjacent to each other in the column direction, which retention capacitor line is shared by these pixels. Note, however, that the present embodiment is not limited to this configuration. In any of the liquid crystal panels of the present invention described in Configuration Examples 1 to 7, a retention capacitor line can be provided between pixels adjacent to each other in the column direction, which retention capacitor line is substantially shared by these pixels. That is, the present invention is not limited to the above configuration provided that there is a retention capacitor line that corresponds to pixels adjacent to each other in the column direction and that is substantially shared by these pixels so that an identical signal is supplied to these pixels. The retention capacitor line can consist of a plurality of retention capacitor lines.

Configuration Example of Television Receiver

Figure 46:
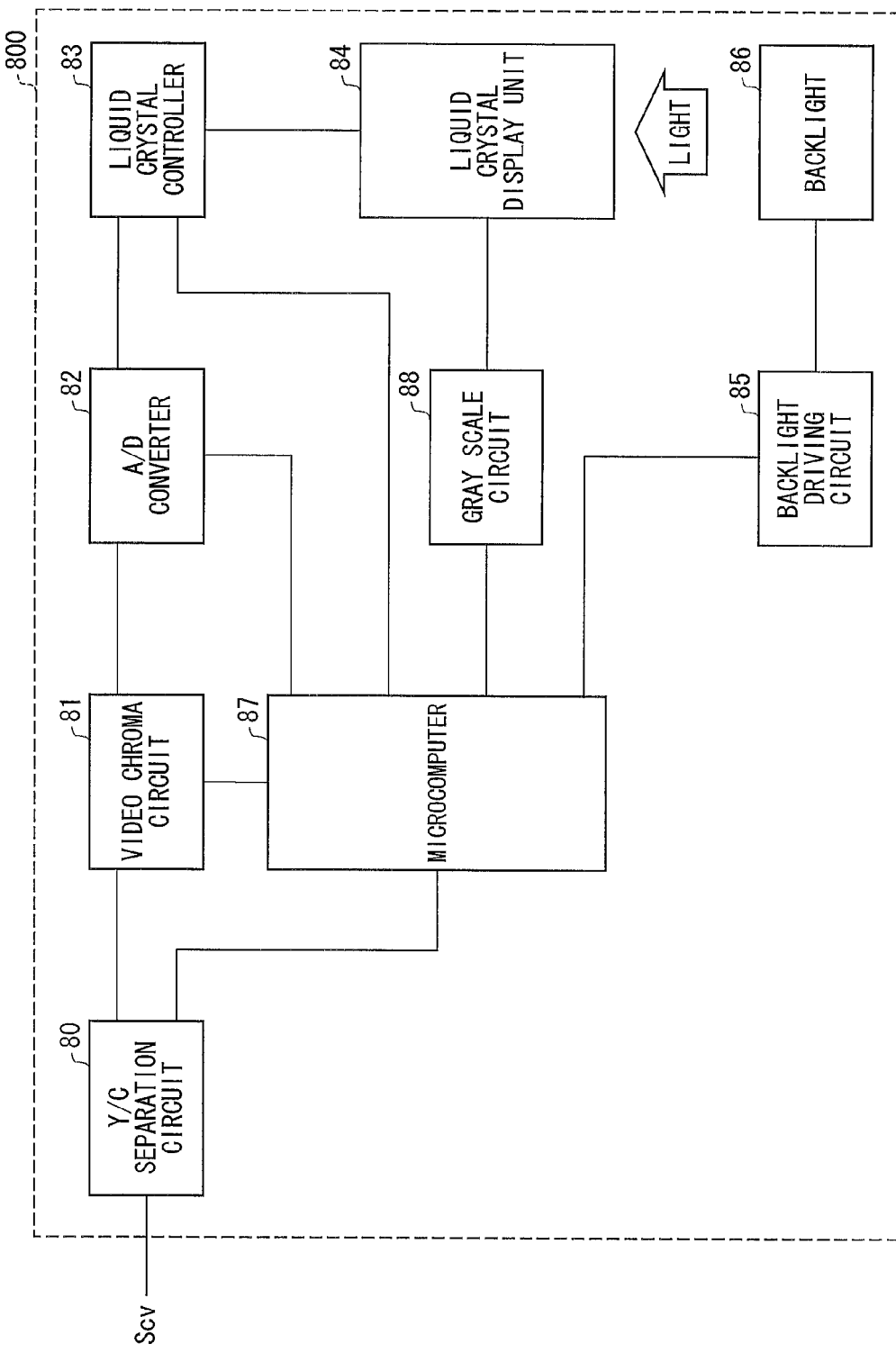
FIG. 46 is a block diagram for explaining a function of a liquid crystal display device of the present invention.

Lastly, the following description discusses an example of a configuration of a television receiver of the present invention. In the following example, a liquid crystal display device of the present invention is applied to a television receiver. Note here that each of the liquid crystal display devices 110 and 110b is referred to as a liquid crystal display device 800. FIG. 46 is a block diagram illustrating a configuration of the liquid crystal display device 800 for a television receiver. The liquid crystal display device 800 includes: a liquid crystal display unit 84; a Y/C separation circuit 80; a video chroma circuit 81; an A/D converter 82; a liquid crystal controller 83; a backlight driving circuit 85; a backlight 86; a microcomputer 87; and a gray scale circuit 88. The liquid crystal display unit 84 is constituted by: a liquid crystal panel; and a source driver and a gate driver for driving the liquid crystal panel.

According to the liquid crystal display device 800 configured as above, first, a composite color video signal Scv, serving as a television signal, is externally supplied to the Y/C separation circuit 80. Then, the Y/C separation circuit 80 separates the composite color video signal Scv to a luminance signal and a color signal. The luminance signal and the color signal are converted, by the video chroma circuit 81, to an analog RGB signal corresponding to three primary colors of light. The analog RGB signal is further converted to a digital RGB signal by the A/D converter 82. The digital RGB signal is then supplied to the liquid crystal controller 83. Meanwhile, the Y/C separation circuit 80 extracts horizontal and vertical sync signals from the composite color video signal Scv which is externally supplied. The horizontal and vertical sync signals are also supplied to the liquid crystal controller 83 via the microcomputer 87.

The liquid crystal controller 83 supplies digital RGB signals to the liquid crystal display unit 84 together with the timing control signals based on the foregoing sync signals, at predetermined timings. The gray scale circuit 88 generates gray scale potentials for the respective three primary colors R, G, B of a color display, and then supplies the gray scale potentials to the liquid crystal display unit 84. The liquid crystal display unit 84 causes (i) the source driver and the gate driver etc. to generate drive signals (a data signal=signal potential, scanning signal, etc.), in response to the RGB signals, the timing signals, and the gray scale potentials and (ii) the liquid crystal panel to display a color image in response to the drive signals. In order for the liquid crystal display unit 84 to display an image, the liquid crystal panel in the liquid crystal display unit has to be backlit. According to the liquid crystal display device 800, the microcomputer 87 controls the backlight driving circuit 85 to drive the backlight 86 so that a back surface of the liquid crystal panel is irradiated with light. The microcomputer 87 carries out not only the above processes but also the control of an entire system. In addition, the video signal (composite color video signal) which is externally supplied is not limited to a video signal of television broadcasting, and can therefore be a video signal such as a video signal taken with a camera or a video signal supplied over the Internet. The liquid crystal display device 800 is thus capable of displaying images based on a variety of video signals.

Figure 47:
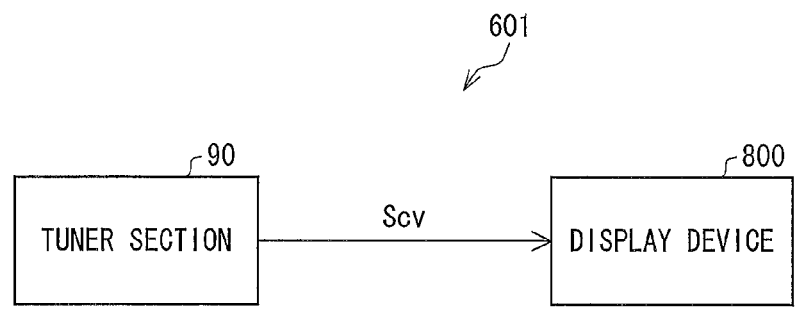
FIG. 47 is a block diagram for explaining a function of a television receiver of the present invention.

In a case where the liquid crystal display device 800 displays an image based on the television broadcasting, the liquid crystal display device 800 is connected with a tuner section 90 (see FIG. 47) to configure a television receiver 601 of the present invention. The tuner section 90 extracts, from a wave (a high-frequency signal) received via an antenna (not shown), a signal of a channel to be received. The tuner section 90 then converts the signal to an intermediate frequency signal. Then, the tuner section 90 detects the intermediate frequency signal so as to extract the composite color video signal Scv serving as the television signal. The composite color video signal Scv is supplied to the liquid crystal display device 800 as described earlier. The liquid crystal display device 800 then displays an image based on the composite color video signal Scv.

Figure 48:
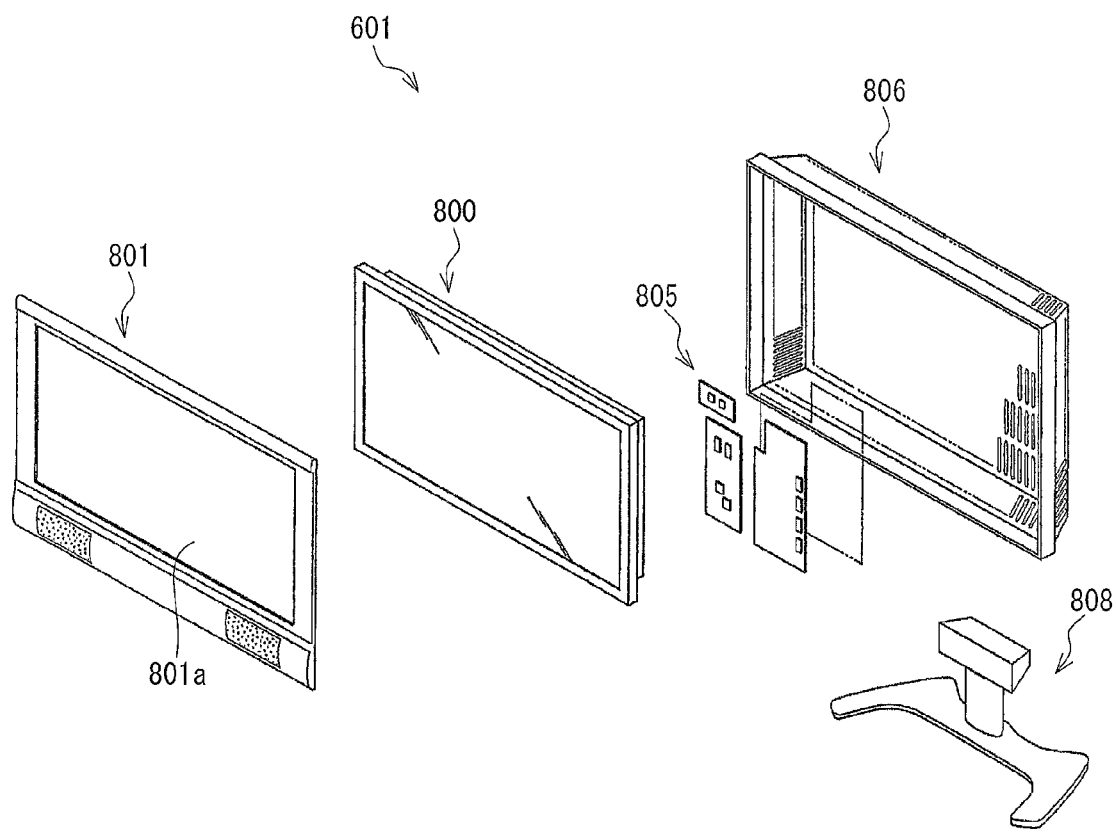
FIG. 48 is an exploded perspective view illustrating a configuration of a television receiver of the present invention.
Figure 49:
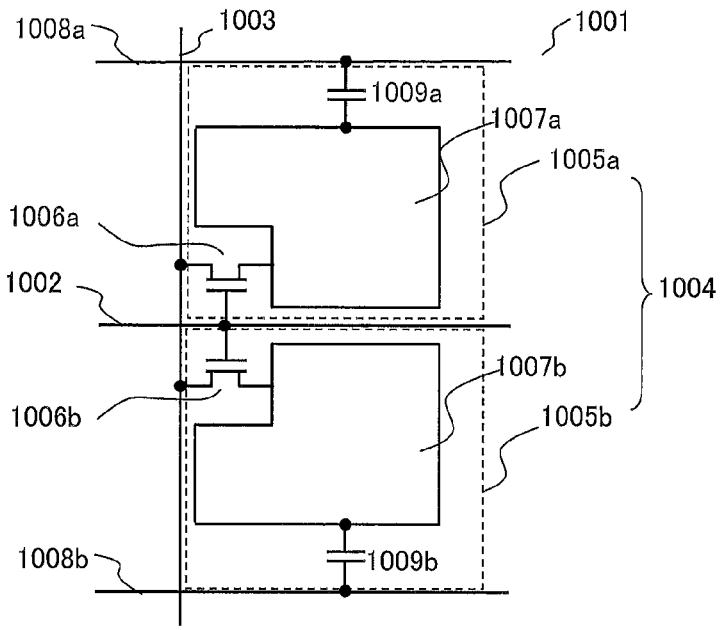
FIG. 49 is a schematic view showing an example of a pixel structure of a liquid crystal display device of Patent Literature 1.
Figure 50:
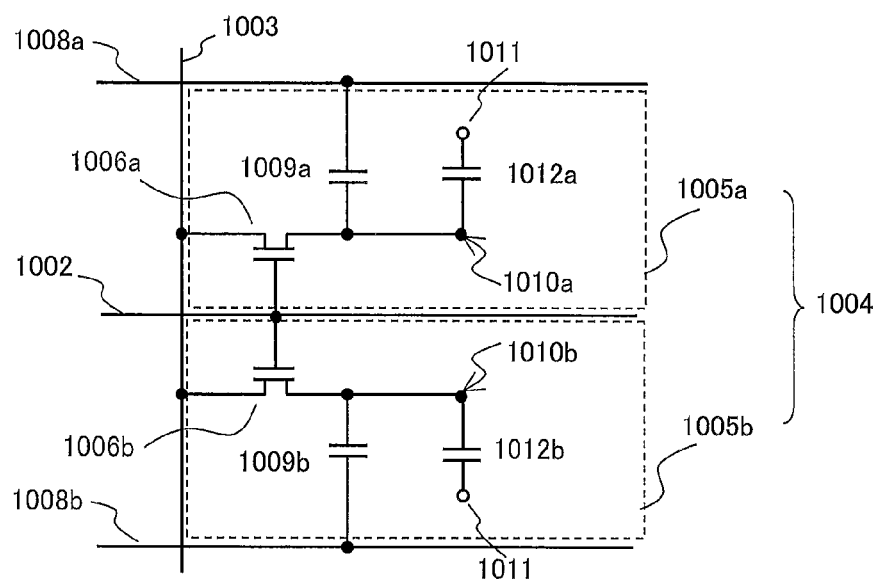
FIG. 50 is a drawing showing an electrically equivalent circuit corresponding to the pixel structure shown in FIG. 49 of the liquid crystal display device.

FIG. 48 is an exploded perspective view illustrating an example of a configuration of the television receiver. As shown in FIG. 48, the television receiver 601 is constituted by the liquid crystal display device 800, a first housing 801, and a second housing 806. The liquid crystal display device 800 is arranged so as to be sandwiched between and held by the first housing 801 and the second housing 806. The first housing 801 has an opening 801a for transmitting an image to be displayed on the liquid crystal display device 800. The second housing 806 covers a backside of the liquid crystal display device 800, and includes an operation circuit 805 for handling the liquid crystal display device 800. Further, the second housing 806 is supported on a support member 808 at the bottom.

The present invention is not limited to the description of the embodiments and examples above. Proper variations and combinations of the embodiments and examples in view of general technical knowledge are encompassed in the technical scope of the present invention.

INDUSTRIAL APPLICABILITY

An active matrix substrate of the present invention and a liquid crystal panel including the active matrix substrate are suitable for liquid crystal televisions, for example.

REFERENCE SIGNS LIST 5, 5a-5f, 5A-5F pixel electrode
6 display region
7 peripheral region
9, 9a, 45 gate driver (scanning signal line driving circuit)
11, 43 source driver (data signal line driving circuit)
13, 46, 49, 51, 53, 55, 57 CS driver (retention capacitor line driving circuit)
44, 48, 50, 52, 54, 56 Gate/CS driver (scanning signal line driving circuit, retention capacitor line driving circuit)
41 display section
42 display control circuit
CSD retention circuit (retention capacitor line driving internal circuit)
15a-15f, 15A-12F transistor
4, 4x, 4X, 4y, 4Y source line (data signal line)
4x, 4X source line (first data signal line)
4y, 4Y source line (second data signal line)
2, 2ab, 2cd, 2ef, 2a, 2c gate line (scanning signal line)
3, 3w, 3x, 3y, 3z, 3a, 3b, 3c, 3d CS line (retention capacitor line)
111 Active matrix substrate
112 Counter substrate (color filter substrate)
113a, 113b, 113c, 113d liquid crystal panel
100-105 pixel
110 liquid crystal display device
601 television receiver
VDD signal
VSS signal
COM common electrode potential (retention capacitor line signal, second retention capacitor line signal)
s, s1 terminal (first input section)
sel1 terminal (second input section)
sel2 terminal (third input section)
sel3 terminal (fourth input section)
sel4 terminal (fifth input section)
SEL, SEL1, SEL2 signal (retention target signal)
SEL3, SEL4 signal (second retention target signal)
CS CS signal (retention capacitor line signal, first retention capacitor line signal)

The invention claimed is:

1. An active matrix substrate, comprising: data signal lines; scanning signal lines; transistors connected with the data signal lines and the scanning signal lines; and retention capacitor lines,
one pixel region including a plurality of pixel electrodes,
the active matrix substrate further comprising a retention capacitor line driving circuit configured to output a retention capacitor line signal to drive the retention capacitor lines, the retention capacitor line driving circuit being defined by a single monolithic member, and
in one pixel region, at least one pixel electrode of the plurality of pixel electrodes and a retention capacitor line corresponding to said at least one pixel electrode defining a retention capacitor therebetween, wherein
the retention capacitor line driving circuit includes a plurality of retention capacitor line driving internal circuits each supplying the retention capacitor line signal to the retention capacitor line,
each of the plurality of retention capacitor line driving internal circuits is respectively provided to every other one of the retention capacitor lines, and
one of two adjacent ones of the plurality of retention capacitor lines receives the retention capacitor line signal from the retention capacitor line driving internal circuit, and another one of the two adjacent ones of the plurality of retention capacitor lines receives a signal from a signal source provided outside the retention capacitor line driving internal circuit.

2. The active matrix substrate as set forth in claim 1, wherein the retention capacitor line driving circuit is defined monolithically on a glass substrate.

3. The active matrix substrate as set forth in claim 1, wherein the retention capacitor line driving circuit and a scanning signal line driving circuit are defined monolithically.

4. The active matrix substrate as set forth in claim 1, wherein the retention capacitor line driving circuit supplies the retention capacitor line signal to the retention capacitor line which defines a retention capacitor with the pixel electrode, so that a pixel potential written in the pixel electrode from the data signal line is changed in a direction corresponding to a polarity of the pixel potential.

5. The active matrix substrate as set forth in claim 1, wherein in one pixel region, the plurality of pixel electrodes and retention capacitor lines respectively corresponding to the plurality of pixel electrodes define different retention capacitors therebetween.

6. The active matrix substrate as set forth in claim 1, wherein
one pixel region includes a first pixel electrode, a second pixel electrode, a first transistor, and a second transistor, the first transistor and the second transistor being connected with the scanning signal line, and
the first pixel electrode is connected with the data signal line via the first transistor and defines a first retention capacitor with the retention capacitor line, and the second pixel electrode is connected with the data signal line via the second transistor and defines a second retention capacitor with the retention capacitor line.

7. The active matrix substrate as set forth in claim 1, wherein
a first pixel region and a second pixel region are aligned in this order in a column direction which is a direction in which the data signal lines are extended, and in each of the first pixel region and the second pixel region, a first pixel electrode and a second pixel electrode are aligned in this order in the column direction, and
the second pixel electrode in the first pixel region and the first pixel electrode in the second pixel region are adjacent to each other, and define retention capacitors with a same retention capacitor line.

8. The active matrix substrate as set forth in claim 1, wherein
each of the retention capacitor line driving internal circuits receives a retention target signal,
a retention capacitor line driving internal circuit corresponding to a certain pixel receives and retains the retention target signal when a scanning signal supplied to a scanning signal line corresponding to a pixel positioned posterior to the certain pixel becomes active, and
an output from the retention capacitor line driving internal circuit corresponding to the certain pixel is supplied as the retention capacitor line signal to a retention capacitor line corresponding to the certain pixel.

9. The active matrix substrate as set forth in claim 1, wherein
   each of the retention capacitor line driving internal circuits receives a retention target signal,
   a retention capacitor line driving internal circuit corresponding to a certain pixel receives and retains the retention target signal when a scanning signal supplied to a scanning signal line corresponding to a pixel positioned posterior to the certain pixel becomes active, and
   an output from the retention capacitor line driving internal circuit corresponding to the certain pixel is supplied as the retention capacitor line signal to a retention capacitor line corresponding to the certain pixel and a retention capacitor line corresponding to a pixel positioned anterior to the certain pixel.

10. The active matrix substrate as set forth in claim 9, wherein
   a retention capacitor line signal from a retention capacitor line driving internal circuit at k-stage is supplied to a retention capacitor line in (k−2)-th row and a retention capacitor line in k-th row,
   a signal from an external signal source is supplied to a retention capacitor line in (k−3)-th row and a retention capacitor line in (k−1)-th row, and
   a scanning signal to be supplied to a scanning signal line in (k+3)-th row is inputted to the retention capacitor line driving internal circuit at k-stage.

11. The active matrix substrate as set forth in claim 1, wherein
   each of the retention capacitor line driving internal circuits receives a retention target signal,
   a retention capacitor line driving internal circuit corresponding to a certain pixel includes
      a first input section to which a scanning signal to be supplied to a scanning signal line corresponding to a pixel positioned posterior to the certain pixel is inputted,
      a second input section to which the retention target signal is inputted,
      a third input section to which the retention target signal is inputted, and
      an output section configured to output the retention capacitor line signal,
      in a case where a potential of the retention target signal inputted to the second input section is in a high level when the scanning signal inputted to the first input section becomes active, the retention capacitor line signal with a high level potential is outputted,
      in a case where a potential of the retention target signal inputted to the third input section is in a high level when the scanning signal inputted to the first input section becomes active, the retention capacitor line signal with a low level potential is outputted, and
      while the scanning signal inputted to the first input section is not active, the potential of the retention target signal inputted to the second input section and/or the third input section is retained.

12. The active matrix substrate as set forth in claim 1, wherein
   each of the retention capacitor line driving internal circuits receives a retention target signal,
   a retention capacitor line driving internal circuit corresponding to a certain pixel includes
      a first input section to which a scanning signal to be supplied to a scanning signal line corresponding to a pixel positioned posterior to the certain pixel is inputted,
      a second input section to which the retention target signal is inputted,
      a third input section to which the retention target signal is inputted, and
      an output section configured to output the retention capacitor line signal,
      in a case where a potential of the retention target signal inputted to the second input section is in a high level when the scanning signal inputted to the first input section becomes active, the retention capacitor line signal with a high level potential is outputted,
      in a case where a potential of the retention target signal inputted to the third input section is in a high level when the scanning signal inputted to the first input section becomes active, the retention capacitor line signal with a low level potential is outputted, and
      when the scanning signal inputted to the first input section becomes inactive and when a scanning signal supplied to a scanning signal line corresponding to a pixel positioned posterior to the pixel positioned posterior to the certain pixel becomes active, the potential of the retention target signal inputted to and retained in the second input section and/or the third input section is reduced.

13. The active matrix substrate as set forth in claim 12, further comprising a fourth input section and a fifth input section to each of which a second retention target signal is inputted,
   in a case where a potential of the retention target signal inputted to the second input section is in a high level when the scanning signal inputted to the first input section becomes active, the retention capacitor line signal with a high level potential being outputted,
   in a case where a potential of the retention target signal inputted to the third input section is in a high level when the scanning signal inputted to the first input section becomes active, the retention capacitor line signal with a low level potential being outputted, and
   when the scanning signal inputted to the first input section becomes inactive and when a scanning signal supplied to a scanning signal line corresponding to a pixel positioned posterior to the pixel positioned posterior to the certain pixel becomes active, the second retention target signal is inputted to the fourth input section and/or the fifth input section, so that the potential of the retention target signal inputted to and retained in the second input section and/or the third input section is reduced.

14. The active matrix substrate as set forth in claim 1, wherein
   pixel regions each including a plurality of pixel electrodes are aligned in a column direction which is a direction in which the data signal lines are extended and in a row direction, a first data signal line and a second data signal line are provided for each column of the pixel regions and one scanning signal line is provided for each row of the pixel regions, and
   a data signal line connected via a transistor with the plurality of pixel electrodes in one of two pixel regions adjacent in the column direction is different from a data signal line connected via a transistor with the plurality of pixel electrodes in the other of the two pixel regions.

15. The active matrix substrate as set forth in claim 14, wherein adjacent two scanning signal lines are selected simultaneously.

16. The active matrix substrate as set forth in claim 14, wherein data signals with opposite polarities are supplied to the first data signal line and the second data signal line, respectively.

17. The active matrix substrate as set forth in claim 1, wherein
one pixel region includes two pixel electrodes, and
one of the two pixel electrodes surrounds the other of the two pixel electrodes.

18. The active matrix substrate as set forth in claim 17, wherein
one pixel region includes two sub-pixels, and
a sub-pixel including said one of the two pixel electrodes serves as a dark sub-pixel with relatively low luminance, and a sub-pixel including said the other of the two pixel electrodes serves as a bright sub-pixel with relatively high luminance.

19. The active matrix substrate as set forth in claim 1, wherein the retention capacitor lines include a first retention capacitor line group that is driven in response to a first retention capacitor line signal from the retention capacitor line driving circuit and a second retention capacitor line group that is driven in response to a second retention capacitor line signal from an external signal source.

20. The active matrix substrate as set forth in claim 19, wherein the second retention capacitor line signal is a common electrode potential.

21. The active matrix substrate as set forth in claim 1 wherein the signal from the external signal source is a common electrode potential.

22. A liquid crystal display device, comprising an active matrix substrate as set forth in claim 1,
the retention capacitor line driving circuit supplying the retention capacitor line signal to the retention capacitor lines which define retention capacitors with the pixel electrodes, so as to create display while pixel potentials written in the pixel electrodes from the data signal lines are changed in directions corresponding to polarities of the pixel potentials.

23. A television receiver, comprising a liquid crystal display device as set forth in claim 22 and a tuner section for receiving television broadcasting.

24. A liquid crystal panel, comprising an active matrix substrate as set forth in claim 1.

\* \* \* \* \*